(12) United States Patent
Migliori

(10) Patent No.: US 11,940,999 B2
(45) Date of Patent: Mar. 26, 2024

(54) METADATA-DRIVEN COMPUTING SYSTEM

(71) Applicant: Douglas T. Migliori, Newport Coast, CA (US)

(72) Inventor: Douglas T. Migliori, Newport Coast, CA (US)

( * ) Notice: Subject to any disclaimer, the term of this patent is extended or adjusted under 35 U.S.C. 154(b) by 706 days.

(21) Appl. No.: 17/083,164

(22) Filed: Oct. 28, 2020

(65) Prior Publication Data

US 2021/0042299 A1 Feb. 11, 2021

Related U.S. Application Data

(63) Continuation-in-part of application No. 16/290,755, filed on Mar. 1, 2019, now Pat. No. 10,838,955.
(Continued)

(51) Int. Cl.
*G06F 16/245* (2019.01)
*G06F 7/00* (2006.01)
(Continued)

(52) U.S. Cl.
CPC .......... *G06F 16/245* (2019.01); *G06F 9/4401* (2013.01); *G06F 9/4416* (2013.01);
(Continued)

(58) Field of Classification Search
CPC .. G06F 16/00; G06F 16/2237; G06F 16/2264; G06F 16/245; G06F 7/00;
(Continued)

(56) References Cited

U.S. PATENT DOCUMENTS 6,085,333 A 7/2000 DeKoning et al.
6,393,605 B1 5/2002 Loomans
(Continued)

FOREIGN PATENT DOCUMENTS

WO 2014124243 A2 8/2014

OTHER PUBLICATIONS

Doukas, Building internet of things with the arduino, retrieved from archive.org, 14 pages.
(Continued)

*Primary Examiner* — Terrell S Johnson
(74) *Attorney, Agent, or Firm* — Master Key IP, LLP; Justin G. Sanders

(57) ABSTRACT

Unified management, automation and interoperability of business and device processes utilizing components of a metadata-driven computing system on any device and/or across difference devices. In an embodiment, a I/O processor on a device receives an input dataset, wherein the input dataset may be a messages dataset received from a message broker. The I/O processor accesses one or more instructions datasets nested within a state dataset to process each row in the input dataset. Processing of the input dataset by the I/O processor updates the state of the state dataset and may output one or more datasets, wherein an output dataset may be a messages dataset sent to a message broker to send to a computing system for processing. A messages dataset may comprise one or more messages, wherein a message may comprise one or more events, queries, or query results for processing by a computing system.

12 Claims, 51 Drawing Sheets

Related U.S. Application Data which is a continuation of application No. 15/091,488, filed on Apr. 5, 2016, now Pat. No. 10,223,412, which is a continuation of application No. 13/830,249, filed on Mar. 14, 2013, now Pat. No. 9,336,013.

(60) Provisional application No. 61/783,362, filed on Mar. 14, 2013, provisional application No. 61/762,779, filed on Feb. 8, 2013.

(51) Int. Cl.
  *G06F 9/4401* (2018.01)
  *G06F 16/00* (2019.01)
  *G06F 16/22* (2019.01)

(52) U.S. Cl.
  CPC ...... *G06F 16/2237* (2019.01); *G06F 16/2264* (2019.01); *G06F 7/00* (2013.01); *G06F 16/00* (2019.01)

(58) Field of Classification Search
  CPC ...... G06F 9/4401; G06F 9/4416; G06F 9/546; H04L 67/02; H04L 67/10
  See application file for complete search history.

(56) References Cited

U.S. PATENT DOCUMENTS

| | | |
|---|---|---|
| 6,981,097 B2 | 12/2005 | Martin et al. |
| 7,321,849 B2 | 1/2008 | Brumitt et al. |
| 7,321,894 B2 | 1/2008 | Degtyar et al. |
| 8,572,057 B2 | 10/2013 | Jasik et al. |
| 2005/0160060 A1 | 7/2005 | Swartz et al. |
| 2006/0143193 A1 | 6/2006 | Thakkar et al. |
| 2006/0143238 A1 | 6/2006 | Tamatsu |
| 2007/0143379 A1 | 6/2007 | i Dalfo et al. |
| 2007/0198656 A1 | 8/2007 | Mazzaferri et al. |
| 2007/0283317 A1 | 12/2007 | Sadler et al. |
| 2008/0183726 A1 | 7/2008 | Bruckner et al. |
| 2009/0204629 A1 | 8/2009 | Barrow |
| 2010/0057485 A1 | 3/2010 | Luft |
| 2011/0200052 A1 | 8/2011 | Mungo et al. |
| 2011/0258461 A1 | 10/2011 | Bates |
| 2011/0302573 A1 | 12/2011 | Bubolz et al. |
| 2012/0079221 A1 | 3/2012 | Sivasubramanian et al. |
| 2012/0209762 A1 | 8/2012 | Metaireau et al. |
| 2012/0323848 A1 | 12/2012 | Hildebrand et al. |
| 2013/0094444 A1 | 4/2013 | Lai et al. |
| 2013/0179557 A1 | 7/2013 | Bian et al. |
| 2013/0188515 A1 | 7/2013 | Pinheiro et al. |
| 2013/0232255 A1 | 9/2013 | Fukui et al. |
| 2013/0265937 A1 | 10/2013 | Jain et al. |
| 2013/0324121 A1 | 12/2013 | Kwon et al. |
| 2014/0036728 A1 | 2/2014 | An et al. |
| 2014/0074887 A1 | 3/2014 | Neels et al. |
| 2014/0181085 A1 | 6/2014 | Gokhale et al. |
| 2014/0258363 A1 | 9/2014 | Peco et al. |
| 2014/0324973 A1 | 10/2014 | Goel et al. |
| 2016/0006815 A1 | 1/2016 | Dong et al. |

OTHER PUBLICATIONS

Pfister, Getting started with the internet of things, May 2011, 39 pages.

International Search Report and Written Opinion received in PCT/US2015/025622, dated Jul. 16, 2015.

Han et al., Situational data integration with data services and nested table, SOCA 2013 (Year: 2013).

Koster, Data Models for the Internet of Things, May 2013 (Year: 2013).

International Search Report and Written Opinion, PCT/US2014/015284, dated Nov. 27, 2014.

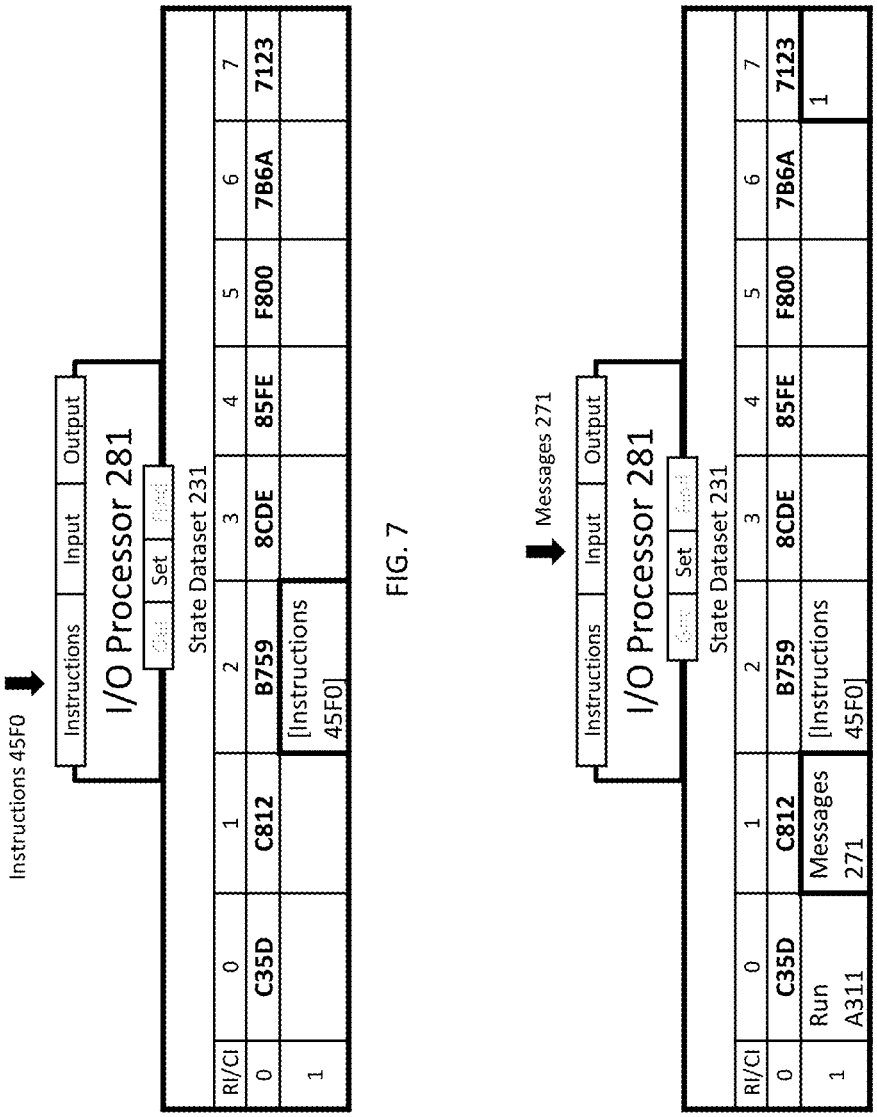

FIG. 10

I/O Processor 281

| Instructions | Input | Output |

Get | Set | Find

State Dataset 231

| RI/CI | 0 | 1 | 2 | 3 | 4 | 5 | 6 | 7 |
|---|---|---|---|---|---|---|---|---|
| 0 | C35D | C812 | B759 | 8CDE | 85FE | F800 | 7B6A | 7123 |
| 1 | Run A311 | [Messages 271] | [Instructions 45F0] | | | | | 3 |
| 2 | | | | | | 1 | [Messages 271] | 1 |
| 3 | Set B4DA | Command C35D | | Run A311 | Process 9D86 | 2 | [Instructions 45F0] | 1 |

FIG. 11

I/O Processor 281

| Instructions | Input | Output |

Get | Set | Find

State Dataset 231

| RI/CI | 0 | 1 | 2 | 3 | 4 | 5 | 6 | 7 |
|---|---|---|---|---|---|---|---|---|
| 0 | C35D | C812 | B759 | 8CDE | 85FE | F800 | 7B6A | 7123 |
| 1 | Run A311 | [Messages 271] | [Instructions 45F0] | | 2 | | | 3 |
| 2 | Run A311 | | | | | 1 | [Messages 271] | 1 |
| 3 | Set B4DA | Command C35D | | Run A311 | Process 9D86 | 2 | [Instructions 45F0] | 1 |

I/O Processor 281 — Instructions | Input | Output — Get | Set | Find

State Dataset 231

| RI/CI | 0 | 1 | 2 | 3 | 4 | 5 | 6 | 7 |
|---|---|---|---|---|---|---|---|---|
| 0 | C35D | C812 | B759 | 8CDE | 85FE | F800 | 7B6A | 7123 |
| 1 | Run A311 | [Messages 271] | [Instructions 45F0] |  |  |  |  | 3 |
| 2 | Run A311 |  |  |  | 2 | 1 | [Messages 271] | 1 |
| 3 | Set B4DA | Param 1 C812 |  | [Input 67EC] |  | 2 | [Instructions 45F0] | 2 |

FIG. 12

I/O Processor 281 — Instructions | Input | Output — Get | Set | Find

State Dataset 231

| RI/CI | 0 | 1 | 2 | 3 | 4 | 5 | 6 | 7 |
|---|---|---|---|---|---|---|---|---|
| 0 | C35D | C812 | B759 | 8CDE | 85FE | F800 | 7B6A | 7123 |
| 1 | Run A311 | [Messages 271] | [Instructions 45F0] |  |  |  |  | 3 |
| 2 | Run A311 | [Input 67EC] |  |  | 2 | 1 | [Messages 271] | 1 |
| 3 | Set B4DA | Param 1 C812 |  | [Input 67EC] |  | 2 | [Instructions 45F0] | 2 |

| RI/CI | 0 | 1 | 2 | 3 | 4 | 5 | 6 | 7 |
|---|---|---|---|---|---|---|---|---|
| | C35D | C812 | B759 | 8CDE | 85FE | F800 | 7B6A | 7123 |
| 0 | | | | | | | | 3 |
| 1 | Run A311 | [Messages 271] | [Instructions 45F0] | | | | | |
| 2 | Run A311 | [Input 67EC] | | | 2 | 1 | [Messages 271] | 1 |
| 3 | Set B4DA | Param 2 B759 | | [Instructions 67EC] | | 2 | [Instructions 45F0] | 3 |

State Dataset 231

I/O Processor 281

FIG. 15

| RI/CI | 0 | 1 | 2 | 3 | 4 | 5 | 6 | 7 |
|---|---|---|---|---|---|---|---|---|
| | C35D | C812 | B759 | 8CDE | 85FE | F800 | 7B6A | 7123 |
| 0 | | | | | | | | 3 |
| 1 | Run A311 | [Messages 271] | [Instructions 45F0] | | | | | |
| 2 | Run A311 | [Input 67EC] | [Instructions 67EC] | | 2 | 1 | [Messages 271] | 1 |
| 3 | Set B4DA | Param 2 B759 | | [Instructions 67EC] | | 2 | [Instructions 45F0] | 3 |

State Dataset 231

I/O Processor 281

FIG. 16

I/O Processor 281
Instructions | Input | Output
Get | Set | Find

State Dataset 231

| RI/CI | 0 | 1 | 2 | 3 | 4 | 5 | 6 | 7 |
|---|---|---|---|---|---|---|---|---|
|  | C35D | C812 | B759 | 8CDE | 85FE | F800 | 7B6A | 7123 |
| 0 | Run A311 | [Messages 271] | [Instructions 45F0] |  |  |  |  | 3 |
| 1 | Run A311 | [Input 67EC] | [Instructions 67EC] |  | 2 | 1 | [Messages 271] | 1 |
| 2 | Compute 0544 |  |  |  |  | 2 | [Instructions 45F0] | 4 |

FIG. 17

I/O Processor 281
Instructions | Input | Output
Get | Set | Find

State Dataset 231

| RI/CI | 0 | 1 | 2 | 3 | 4 | 5 | 6 | 7 |
|---|---|---|---|---|---|---|---|---|
|  | C35D | C812 | B759 | 8CDE | 85FE | F800 | 7B6A | 7123 |
| 0 | Run A311 | [Messages 271] | [Instructions 45F0] |  |  |  |  | 5 |
| 1 | Run A311 | [Input 67EC] | [Instructions 67EC] |  | 2 | 1 | [Messages 271] | 1 |
| 2 | Run A311 | [Input 67EC] |  |  |  | 2 | [Instructions 45F0] | 4 |
| 3 |  |  |  |  |  | 3 | [Input 67EC] | 1 |
| 4 |  |  |  |  |  | 4 | [Instructions 67EC] | 1 |

| Instructions | Input | Output |
|---|---|---|

I/O Processor 281

| Get | Set | Find |
|---|---|---|

State Dataset 231

| RI/CI | 0 | 1 | 2 | 3 | 4 | 5 | 6 | 7 | 10 |
|---|---|---|---|---|---|---|---|---|---|
| 0 | C35D | C812 | B759 | 8CDE | 85FE | F800 | 7B6A | 7123 | 6842 |
| 1 | Run A311 | [Messages 271] | [Instructions 45F0] | | | | | 5 | |
| 2 | Run A311 | [Input 2369] | [Instructions 2369] | | 2 | 1 | [Messages 271] | 1 | |
| 3 | Run A311 | [Input 2369] | [Instructions 2369] | | | 2 | [Instructions 45F0] | 4 | |
| 4 | Set B4DA | Name 6842 | | Con 1 | 6 | 3 | [Input 2369] | 1 | |
| 5 | Set B4DA | Name 6842 | | Con 1 | | 4 | [Instructions 2369] | 5 | |
| 6 | | | | | | | | | Con 1 |

FIG. 19

I/O Processor 281 — State Dataset 231

| RI/CI | 0 | 1 | 2 | 3 | 4 | 5 | 6 | 7 | 10 |
|---|---|---|---|---|---|---|---|---|---|
| 0 | C35D | C812 | B759 | 8CDE | 85FE | F800 | 7B6A | 7123 | 6842 |
| 1 | Run A311 | [Messages 271] | [Instructions 45F0] | | | | | 3 | |
| 2 | Output 8CCE | [Messages 260] | | 2 | | 1 | [Messages 271] | 2 | |
| 3 | Output 8CCE | [Messages 260] | | | | 2 | [Instructions 45F0] | 1 | |
| 4 | | | | | | | | | Con 1 |

FIG. 22

I/O Processor 281 — State Dataset 231

| RI/CI | 0 | 1 | 2 | 3 | 4 | 5 | 6 | 7 | 10 |
|---|---|---|---|---|---|---|---|---|---|
| 0 | C35D | C812 | B759 | 8CDE | 85FE | F800 | 7B6A | 7123 | 6842 |
| 1 | Run A311 | [Messages 271] | [Instructions 45F0] | | | | | 0 | |
| 2 | | | | | | | | | Con 1 |

FIG. 23

| RI/CI | 8 | 9 | 10 | 11 | 12 | 21 | 22 | 23 | 24 | 35 |
|---|---|---|---|---|---|---|---|---|---|---|
| | ID C823 | Class 483A | Name 6842 | System 0BE4 | P. Object 303C | A. Type 18E8 | Address 889B | C. Type 4BBF | Credentials 9A17 | SD 421B |
| 0 | | | | | | | | | | |
| 2 | FC1F | Connection F39A | Con 1 | Sys 283 38AA | Dev 2 E7C9 | I2C 2F9E | Sys 283 | Connection 0F8B | FC1F | [SD 283] |
| 7 | 95E8 | Connection F39A | Con 2 | Sys 282 F5E0 | Dev 2 E7C9 | File B0D0 | Sys 282 | Connection 0F8B | 95E8 | [SD 282] |
| 17 | 6BEF | Connection F39A | Con 3 | | Dev 2 E7C9 | BLE 83AA | MB 310 | Connection 0F8B | 6BEF | |
| 18 | 003A | Connection F39A | Con 3.1 | Sys 1 4C8D | Con 3 6BEF | I2C 2F9E | IOP 381 | Connection 0F8B | 003A | |
| 22 | 4D95 | Connection F39A | Con 3.2 | Sys 2 B232 | Con 3 6BEF | I2C 2F9E | IOP 381 | Connection 0F8B | 4D95 | |

State Dataset 231

FIG. 30

Events 263A

| RI/CI | 0 | 1 | 2 | 3 |
|---|---|---|---|---|
| | 4041 | E82B | 3CC2 | 6111 |
| 1 | Device 4D7A | E7C9 | Temp. CE89 | 76 |
| 2 | Device 4D7A | E7C9 | Illum. D63D | 1 |
| 3 | Element F915 | 9845 | P. Object 303C | |
| 4 | Element F915 | 9845 | Height BD06 | 4 |
| 5 | Element F915 | 9845 | Width 2415 | 4 |
| 6 | Element F915 | 26EE | P. Object 303C | 9845 |
| 7 | Element F915 | 26EE | Class 483A | Element F915 |
| 8 | Element F915 | 26EE | C. Object 48C1 | Name 29C7 |
| 9 | Element F915 | 26EE | Top 4776 | 0 |
| 10 | Element F915 | 26EE | Left 65CD | 2 |

Events 263A (continued)

| RI/CI | 0 | 1 | 2 | 3 |
|---|---|---|---|---|
| | 4041 | E82B | 3CC2 | 6111 |
| 13 | Element F915 | 26EE | Content 8A6D | Dev 2 |
| 14 | Element F915 | 26EE | Width 2415 | 2 |
| 15 | Element F915 | 47A1 | P. Object 303C | 9845 |
| 16 | Element F915 | 47A1 | Class 483A | Element F915 |
| 17 | Element F915 | 47A1 | C. Object 48C1 | Name 29C7 |
| 18 | Element F915 | 47A1 | Top 4776 | 0 |
| 19 | Element F915 | 47A1 | Left 65CD | 2 |
| 20 | Element F915 | 47A1 | Height BD06 | 0.5 |
| 21 | Element F915 | 47A1 | Width 2415 | 2 |
| 22 | Element F915 | 47A1 | Content 8A6D | Temp. |

State Dataset 231

| RI/CI | 0 | 1 | 2 | 3 | 4 | 5 | 6 | 7 |
|---|---|---|---|---|---|---|---|---|
| | C35D | C812 | B759 | 8CDE | 85FE | F800 | 7B6A | 7123 |
| 22 | Set B4DA | | 6111 | Temp. | 22 | 20 | [Events 263A] | 22 |
| 23 | Set B4DA | | 6111 | Temp. | | 22 | [Instructions D9D5] | 4 |

FIG. 32

| | | Instructions | Input | Output | | | | | | | |
|---|---|---|---|---|---|---|---|---|---|---|---|
| | | I/O Processor 281 | | | | | | | | | |
| | | Get \| Set \| Find | | | | | | | | | |
| | | State Dataset 231 | | | | | | | | | |

| RI/CI | 8 | 9 | 12 | 13 | 14 | 16 | 19 | 26 | 27 | 28 | 29 | 30 |
|---|---|---|---|---|---|---|---|---|---|---|---|---|
| 0 | ID<br>C823 | Class<br>483A | P. Object<br>303C | C. Object<br>48C1 | R. Object<br>3B0C | R. Class<br>54C9 | R. Attribute<br>3492 | Top<br>4776 | Left<br>65CD | Height<br>BD06 | Width<br>2415 | Content<br>8A6D |
| 22 | 9845 | Element F915 | | | | | | | | 4 | 4 | |
| 23 | 26EE | Element F915 | 9845 | Name 29C7 | | | | 0 | 2 | 0.5 | 2 | Dev 2 |
| 24 | B240 | Element F915 | 9845 | | | | | 0.5 | 0 | 0.5 | 2 | Temp. |
| 25 | 737C | Element F915 | 9845 | | Dev 2 E7C9 | Device 4D7A | Temp. CE89 | 0.5 | 2 | 0.5 | 2 | 76 |
| 26 | F8CC | Element F915 | 9845 | | | | | 1 | 0 | 0.5 | 2 | Illum. |
| 27 | 5CF8 | Element F915 | 9845 | | Dev 2 E7C9 | Device 4D7A | Illum. D63D | 1 | 2 | 0.5 | 2 | 1 |

FIG. 33

| IOP 281 | | |
|---|---|---|
| PROCESS F743 (input, instructions, SD) | PROCESS F743 (continued) | GET 8EB2 |
| ```
if (inst.length>0) {SD[1][2]=inst;}
if (input.length==0){return;}
SD[1][0]= "A311" //Run
SD[1][1]=input; SD[1][7]=1;
while (SD[1][7]>0) {
  pi2= SD[1][7]; pi1=pi2--;
  if (pi2>1){
    inst=SD[pi2][6]; iRI= SD[pi2][7];
    if (iRI>inst.length) {
      SD[pi1][7]++; SD[pi2][7]=1;
      if (SD[pi2][7]>SD[pi1][6].length){
        SD[1][7]= SD[pi1][5];
        if (SD[1][7]==1){ SD[1][7]=0;}
        SD.splice(pi1,2);
        continue; }
      SD[pi2][0]=inst[iRI][ Command ID];
      SD[pi2][1]=inst[iRI][1];
      SD[pi2][2]=inst[iRI][2];
      SD[pi2][3]=inst[iRI][3];
      SD[pi2][4]=inst[iRI][4];
      SD[pi2][7]++;}
    switch(SD[pi2][4]) {
      case "0EC0": SD[pi1][4]=1; break;
      case "9D86": SD[pi1][4]=pi1; break;
      case "EA8E": SD[pi1][4]=SD[pi1][5];
      break;
      case "7756":
        RI=SD[pi1][5];
        SD[pi1][4]=SD[RI][4];
        break;}
``` | ```
if(SD[pi2][0]=="0544"){// Compute
  SD[pi2][0]=SD[pi1][0];
  SD[PI2R1][1]=SD[pi1][1];
  SD[pi2][2]=SD[pi1][2];
  SD[pi2][3]=SD[pi1][3];}
switch(SD[pi2][0]) {
  case "A311": // RUN
    parentRI= pi2;
    pi1 =SD.length;
    SD.push(Array(8));
    SD[pi1].fill("");
    SD[pi1][5]=parentRI;
    SD[pi1][6]=SD[parentRI][1];
    SD[pi1][7]=1;
    pi2=pi1++; SD.push(Array(8));
    SD[pi2].fill(""); SD[pi2][5]=pi1,
    SD[pi2][6]=SD[parentRI][2];
    SD[pi2][7]=1; break;
    SD[1][7]= pi2;
  case "1A31":
    FIND(); break;
  case "8EB2":
    GET(); break;
  case "B4DA":
    SET(); break;
  case "8CCE":
    OUTPUT=SD[pi2][1]; break;
  case "F743":
    PROCESS(SD[pi2][1],
    SD[pi2][2],SD[pi2][3]);
    break;
...}
``` | ```
att=SD[pi2][1]; RI=SD[pi1][4]; data=SD;
if (SD[pi2][2].length>0) {
  att=SD[pi2][2];RI=SD[RI][7];data=SD[RI][6];}
CI=data[0].indexOf(att);
if (RI>1&&CI>0){SD[pi1][1]=data[RI][CI];}
else {SD[pi1][1]="";}
``` |
| | SET B4DA | FIND 1A31 |
| | ```
att=SD[pi2][1]; RI=SD[pi1][4];
data=SD;
if (SD[pi2][2].length>0) {
  att=SD[pi2][2];
  RI=SD[RI][7];data=SD[RI][6];}
if (data.length==0) {
  data=[];
  data.push(Array(1));
  data[0][0]=att;}
CI=data[0].indexOf(att);
if (CI<0) {
  CI=data[0].length;
  for (x=0;x<data.length;x++) {
    data[x].push("");
  }
  data[0][CI]=att;
}
if (RI.length==0) {
  RI=data.length;
  data.push(Array(data[0].length));
  data[RI].fill("");
  SD[pi1][4]=RI;}
data[RI][CI]= SD[pi2][3];
``` | ```
data=SD[pi2][1]; RIs=SD[pi2][2];
SD[pi1][1]=[];
for (RI=1;RI<=data.length;RI++) {
  oper=data[RI][1]; val2=data[RI][2];
  att2=data[RI][3]; andOr=data[RI][4];
  if (andOr==1&&RIs.length==0){return;}
  oper=data[RI][1];
  for (oRI=0;oRI<SD.length;oRI++) {
    if (andOr==1&&RIs.indexOf(oRI)<0){
      continue;}
    SD[pi1][1]=data[RI][0];
    SD[pi1][2]=""; SD[pi1][4]=oRI;
    GET(); val1=SD[pi1][1];
    if (att2.length > 0) {
      SD[pi2][1]=att2;
      GET(); val2=SD[pi1][1];}
    switch (oper) {
      case "A5F0": //equals
        if (val1 == val2) {
          case "4D3D": //<>
          if (val1 != val2) {
            SD[pi1][1].push(oRI);} break;
      ...}}
``` |

FIG. 43

IOP 281 Instruction Commands and Parameters

| ID | Operation | Parameter 1 | Parameter 2 | Parameter 3 | Process Row |
|---|---|---|---|---|---|
| 8EB2 | Get | X | X |  | X |
| B4DA | Set | X | X | X | X |
| 0544 | Compute |  |  |  | X |
| C4FB | Clear | X |  |  | X |
| 1A31 | Find | X | X |  |  |
| A311 | Run | X | X |  |  |
| 8CCE | Output | X |  |  |  |
| F74E | Process | X | X | X |  |
| CCB7 | Divide | X | X |  |  |
| 73B6 | Multiply | X | X |  |  |
| 977F | Add | X | X |  |  |
| 13F2 | Subtract | X | X |  |  |
| 7B6C | Increment | X |  |  |  |
| 50C3 | Decrement | X |  |  |  |
| EF91 | Random |  |  |  |  |
| AF68 | Round | X |  |  |  |
| 2691 | Concatenate | X | X |  |  |
| D2B0 | Push | X | X |  |  |
| 5708 | Splice | X | X | X |  |
| C462 | Slice | X | X | X |  |
| EFE1 | Stringify | X |  |  |  |
| 4D01 | Parse | X |  |  |  |
| 92E0 | Index Of | X |  |  |  |
| BBCC | Get Date |  |  |  |  |
| E1EC | Format Date | X | X |  |  |
| 14AD | Replace | X | X | X |  |
| 74FF | Substring | X | X |  |  |
| 92C0 | Length | X |  |  |  |
| 7E11 | Uppercase | X |  |  |  |
| 3CF7 | Lowercase | X |  |  |  |
| C505 | Split | X |  |  |  |
| 80EC | Sort | X | X |  |  |
| 86D9 | 2D | X |  |  |  |

FIG. 44

| Message Broker 210 | System 282 |
|---|---|
| RouteMessages 201A | ProcessEvents 282A |
| ```
msgs = JSON.parse(BEAMmessages);
for (RI = 0; RI < msgs.length; RI++) {
  addressType=msgs[RI][1]; address=msgs[RI][2];
  payloadType= msgs[RI][3]; payload= msgs[RI][4];
  if (msgs[RI][3]=="AE2D") { //BEAMmessages
    ProcessMessages(JSON.stringify(payload)); continue;
  }
  switch(addressType) {
    case "E912": //HTTP
      com = new XMLHttpRequest();
      com.open(msgs[RI][3], address, true);
      xhttp.setRequestHeader("Authorization", msgs[RI][7]);
      com.send(msgs[RI]);
      break;
    case "B0D0": //File
      window[address]();
    case "6D3E": //Web Socket
      ...
    case "83AA": //BLE
      ...
  }
}
``` | ```
for (RI = 1; RI <= events.length; RI++) {
  classID = events[RI][events[0].indexOf("4041")];
  objectID = events[RI][events[0].indexOf("E82B")];
  attributeID = events[RI][events[0].indexOf("3CC2")];
  value = events[RI][events[0].indexOf("6111")];
  element = document.getElementById(objectID);
  if (element == null) {
    element = document.createElement(classID);
    element.setAttribute("id", objectID);
  }
  if (attributeID=="303C") { // parent object
    document.getElementById(value).appendChild(element);
    continue;
  }
  element.addEventListener("click", function()
  {EventHandler(classID,objectID,"DD28","4FE2");});
  element.addEventListener("change", function()
  {EventHandler(address,credentials,classID,objectID,"Value",
  document.getElementById(objectID).value);});
  element.style[attributeID]=value;
  element.setAttribute(attributeID, value);
}
``` |
| | EventHandler 282B (address,credentials,class,object,attribute,value) |
| | ```
events=["4041","E82B","3CC2","6111"],[class,object,attribute,value];
msgs=["E2F5","B903","4BBF","85B7","96C6","4F0A"],
["B0D0",address,"0F8B",credentials,"7288",events];
ProcessMessages(JSON.stringify(msgs));
``` |

FIG. 45

| RI/CI | Instructions 45F0 / Process Messages | | | | |
|---|---|---|---|---|---|
| | 0 | 1 | 2 | 3 | 4 |
| | 6B97 | B020 | 6CE7 | 8D04 | 1B74 |
| 1 | Set B4DA | Command C35D | | Run A311 | Process 9D86 |
| 2 | Set B4DA | Param 1 C812 | | [Input 67EC] | |
| 3 | Set B4DA | Param 2 B759 | | [Instruct. 67EC] | |
| 4 | Compute 0544 | | | | |
| 5 | Set B4DA | Param 1 C812 | | [Input 2381] | |
| 6 | Set B4DA | Param 2 B759 | | [Instruct. 2381] | |
| 7 | Compute 0544 | | | | |
| 8 | Set B4DA | Param 1 C812 | | [Input 2369] | |
| 9 | Set B4DA | Param 2 B759 | | [Instruct. 2369] | |
| 10 | Compute 0544 | | | | |

FIG. 47

Instructions 2369 / Process Events

| RI/CI | 0 | 1 | 2 | 3 | 4 |
|---|---|---|---|---|---|
| 0 | 6B97 | B020 | 6CE7 | 8D04 | 1B74 |
| 1 | Set B4DA | Command C35D | | Run A311 | Process 9D86 |
| 2 | Set B4DA | Param 1 C812 | | [Input E549] | |
| 3 | Set B4DA | Param 2 B759 | | [Instruct. E549] | |
| 4 | Compute 0544 | | | | |
| 5 | Set B4DA | Command C35D | | Run A311 | Process 9D86 |
| 6 | Clear C4FB | Param 1 C812 | | | |
| 7 | Set B4DA | Param 2 B759 | | [Instruct. 84AB] | |
| 8 | Compute 0544 | | | | |
| 9 | Set B4DA | P. Row 85FE | | | Parent EA8E |
| 10 | Clear C4FB | Param 2 B759 | | | Process 9D86 |
| 11 | Get 8EB2 | | Object E82B | | |
| 12 | Set B4DA | Param 3 8CDE | | ID C823 | Process 9D86 |
| 13 | Set B4DA | Param 1 C812 | | Set B4DA | |
| 14 | Set B4DA | Command C35D | | | |
| 15 | Compute 0544 | | | | P.P. Row 7756 |

Instructions 2369 / Process Events (continued)

| RI/CI | 0 | 1 | 2 | 3 | 4 |
|---|---|---|---|---|---|
| 0 | 6B97 | B020 | 6CE7 | 8D04 | 1B74 |
| 16 | Get 8EB2 | | Class 4041 | | Process 9D86 |
| 17 | Set B4DA | Param 3 8CDE | | | |
| 18 | Set B4DA | Param 1 C812 | | Class 4041 | |
| 19 | Compute 0544 | | | | P.P. Row 7756 |
| 20 | Get 8EB2 | | Value 6111 | | Process 9D86 |
| 21 | Set B4DA | Param 3 8CDE | | | |
| 22 | Get 8EB2 | | Attribute 3CC2 | | |
| 23 | Compute 0544 | | | | P.P. Row 7756 |
| 24 | Set B4DA | Command C35D | | Run A311 | Process 9D86 |
| 25 | Set B4DA | Param 2 B759 | | [Instruct. BC25] | |
| 26 | Get 8EB2 | Dataset 7B6A | | | |
| 27 | Compute 0544 | | | | |
| 28 | Set B4DA | Param 1 C812 | | [Input E549B] | |
| 29 | Set B4DA | Param 2 B759 | | [Instruct. E549] | |
| 30 | Compute 0544 | | | | |

FIG. 48

| Instructions E549 / Run Processes | | | | | |
|---|---|---|---|---|---|
| RI/CI | 0 6B97 | 1 B020 | 2 6CE7 | 3 8D04 | 4 1B74 |
| 0 | | | | | |
| 1 | Get 8EB2 | | Process C31E | | Process 9D86 |
| 2 | Set B4DA | Process 1580 | | | |
| 3 | Get 8EB2 | | P. Class 924D | | |
| 4 | Set B4DA | P. Class E893 | | | |
| 5 | Set B4DA | P. Conditions E893 | | [Conditions 9A67A] | |
| 6 | Set B4DA | P. Columns 4859 | | [Columns 9A67A] | |
| 7 | Set B4DA | Command C35D | | Run A311 | |
| 8 | Clear C4FB | Param 1 C812 | | [Instruct. 9A67] | |
| 9 | Set B4DA | Param 2 B759 | | | |
| 10 | Compute 0544 | | | | |
| 11 | Set B4DA | Param 3 8CDE | | | |
| 12 | Set B4DA | P. Conditions E893 | | [Conditions 9A67B] | |
| 13 | Set B4DA | P. Columns 4859 | | [Columns 9A67B] | |
| 14 | Clear C4FB | Param 1 C812 | | | |
| 15 | Compute 0544 | | | | |

| Instructions E549 / Run Processes (continued) | | | | | |
|---|---|---|---|---|---|
| RI/CI | 0 6B97 | 1 B020 | 2 6CE7 | 3 8D04 | 4 1B74 |
| 0 | | | | | 1B74 |
| 16 | Set B4DA | P. Columns 4859 | | | |
| 17 | Get 8EB2 | Param 3 8CDE | | | |
| 18 | Set B4DA | P. Conditions E893 | | | |
| 19 | Clear C4FB | Param 1 C812 | | | |
| 20 | Compute 0544 | | | | |
| 21 | Set B4DA | Param 4 D300 | | | |
| 22 | Set B4DA | P. Conditions E893 | | [Conditions 9A67A] | |
| 23 | Set B4DA | P. Columns 4859 | | [Columns 9A67A] | |
| 24 | Set B4DA | Command C35D | | Run A311 | |
| 25 | Clear C4FB | Param 1 C812 | | [Instruct. 9A67] | |
| 26 | Set B4DA | Param 2 B759 | | | |
| 27 | Compute 0544 | | | | |
| 28 | Set B4DA | Param 3 8CDE | | | |
| 29 | Set B4DA | P. Conditions E893 | | [Conditions 9A67B] | |
| 30 | Set B4DA | P. Columns 4859 | | [Columns 9A67B] | |

FIG. 49

| RI/CI | 0 | 1 | 2 | 3 | 4 |
|---|---|---|---|---|---|
| | 6B97 | B020 | 6CE7 | 8D04 | 1B74 |
| 31 | Clear C4FB | Param 1 C812 | | | |
| 32 | Compute 0544 | | | | |
| 33 | Set B4DA | P. Columns 4859 | | | |
| 34 | Get 8EB2 | Param 3 8CDE | | | |
| 35 | Set B4DA | P. Conditions E893 | | | |
| 36 | Clear C4FB | Param 1 C812 | | | |
| 37 | Compute 0544 | | | | |
| 38 | Set B4DA | Param 2 B759 | | | |
| 39 | Get 8EB2 | Param 4 D300 | | | |
| 40 | Compute 0544 | | | | |
| 41 | Set B4DA | Param 2 B759 | | | |
| 42 | Compute 0544 | | | | |

Instructions E549 / Run Processes

| RI/CI | 0 | 1 | 2 | 3 | 4 |
|---|---|---|---|---|---|
| | 6B97 | B020 | 6CE7 | 8D04 | 1B74 |
| 1 | Get 8EB2 | P. Conditions E893 | | | Parent EA8E |
| 2 | Set B4DA | Param 2 B759 | | [Instruct. E507] | Process 9D86 |
| 3 | Set B4DA | Command C35D | | Run A311 | |
| 4 | Compute 0544 | | | | |
| 5 | Set B4DA | Dataset 7B6A | | | |
| 6 | Get 8EB2 | P. Columns 4859 | | | Parent EA8E |
| 7 | Set B4DA | Param 2 B759 | | [Instruct. 6AA6] | Process 9D86 |
| 8 | Compute 0544 | | | | |

Instructions 9A67 / Build Dataset

FIG. 50

| RI/CI | 0<br>6B97 | 1<br>B020 | 2<br>6CE7 | 3<br>8D04 | 4<br>1B74 |
|---|---|---|---|---|---|
| 0 | | | | | |
| 1 | Get<br>8EB2 | Dataset<br>7B6A | | | Process<br>9D86 |
| 2 | Clear | Param 2<br>B759 | | | |
| 3 | Set<br>B4DA | Command<br>C35D | | Find<br>1A31 | |
| 4 | Compute<br>0544 | | | | |
| 5 | 2D<br>86D9 | | | | |
| 6 | Set<br>B4DA | Param 1<br>C812 | | | Parent<br>EA8E |

Instructions E507 / Process Conditions

| RI/CI | 0<br>6B97 | 1<br>B020 | 2<br>6CE7 | 3<br>8D04 | 4<br>1B74 |
|---|---|---|---|---|---|
| 0 | | | | | |
| 1 | Get<br>8EB2 | | | | Parent<br>EA8E |
| 2 | Set<br>B4DA | P. Row<br>85FE | | | |
| 3 | Get<br>8EB2 | | Attribute<br>B9C9 | | Process<br>9D86 |
| 4 | Set<br>B4DA | Command<br>C35D | | Get<br>8EB2 | |
| 5 | Compute<br>0544 | | | | P. P. Row<br>7756 |
| 6 | Set<br>B4DA | Param 3<br>8CDE | | | Process<br>9D86 |
| 7 | Get | | ID<br>0F2B | | |
| 8 | Set | Param 2<br>B759 | | | |
| 9 | Clear | Param 1<br>C812 | | | |
| 10 | Set<br>B4DA | Command<br>C35D | | Set<br>B4DA | |
| 11 | Compute<br>0544 | | | | Parent<br>EA8E |

Instructions 6AA6 / Process Columns

FIG. 51

| | Instructions AA7B / Normalize Event Attribute | | | | |
|---|---|---|---|---|---|
| RI/CI | 0 | 1 | 2 | 3 | 4 |
| | 6B97 | B020 | 6CE7 | 8D04 | 1B74 |
| 0 | Get 8EB2 | | Attribute 4B7C | | |
| 1 | Set B4DA | | Attribute 3CC2 | | Parent EA8E |
| 2 | Get 8EB2 | | Multiplier 85AF | | Process 9D86 |
| 3 | Set B4DA | Param 2 B759 | | | |
| 4 | Get 8EB2 | | Value 6111 | | Parent EA8E |
| 5 | Set B4DA | Command C35D | | Multiply 73B6 | Process 9D86 |
| 6 | Compute 0544 | | | | |
| 7 | Set B4DA | | Value 6111 | | Parent EA8E |

| | Instructions 84AB / Find Event Object | | | | |
|---|---|---|---|---|---|
| RI/CI | 0 | 1 | 2 | 3 | 4 |
| | 6B97 | B020 | 6CE7 | 8D04 | 1B74 |
| 0 | Clear C4FB | D. Row 7123 | | | Process 9D86 |
| 1 | Set B4DA | | Attribute B775 | ID C823 | |
| 2 | Set B4DA | | Operator 9488 | Equals A5F0 | |
| 3 | Get 8EB2 | | Object E82B | | Parent EA8E |
| 4 | Set B4DA | | C. Value 75A3 | | Process 9D86 |
| 5 | Clear C4FB | D. Row 7123 | | | |
| 6 | Set B4DA | | Attribute B775 | Class 483A | |
| 7 | Set B4DA | | Operator 9488 | Equals A5F0 | |
| 8 | Get 8EB2 | | Class 4041 | | Parent EA8E |
| 9 | Set B4DA | Dataset 7B6A | | | Process 9D86 |
| 10 | Clear C4FB | Param 2 B759 | | | |
| 11 | Set B4DA | Command C35D | | Find 1A31 | |
| 12 | Compute 0544 | | | | |
| 13 | Set B4DA | Param 1 C812 | | | Parent EA8E |

FIG. 52

| Instructions BC25 / Send Event Messages ||||||
|---|---|---|---|---|---|
| R/CI | 0 | 1 | 2 | 3 | 4 |
| | 6B97 | B020 | 6CE7 | 8D04 | 1B74 |
| 0 | Set B4DA | Command C35D | | Run A311 | Process 9D86 |
| 1 | Set B4DA | Param 1 C812 | | [Input E507] | |
| 2 | Set B4DA | Param 2 B759 | | [Instruct. E507] | |
| 3 | Compute 0544 | | | | |
| 4 | Set B4DA | Param 2 B759 | | [Instruct. 4294] | |
| 5 | Compute 0544 | | | | |
| 6 | Set B4DA | Command C35D | | Output 8CCE | |
| 7 | Compute 0544 | | | | |

| Instructions 4294 / Create Event Messages ||||||
|---|---|---|---|---|---|
| R/CI | 0 | 1 | 2 | 3 | 4 |
| | 6B97 | B020 | 6CE7 | 8D04 | 1B74 |
| 0 | Get 8EB2 | | 0 | | Process 9D86 |
| 1 | Set B4DA | P. Row 85FE | | | Parent EA8E |
| 2 | Get 8EB2 | A. Type 18E8 | | | Parent P. Row |
| 3 | Set B4DA | | A. Type E2F5 | | Process 9D86 |
| 4 | Get 8EB2 | Address 889B | | | P.P. Row 7756 |
| 5 | Set B4DA | | Address B903 | | Process 9D86 |
| 6 | Get 8EB2 | C. Type 4BBF | | | P.P. Row 7756 |
| 7 | Set B4DA | | C. Type 4BBF | | Process 9D86 |
| 8 | Get 8EB2 | | | | P.P. Row 7756 |
| 9 | Set B4DA | | Credentials 85B7 | | Process 9D86 |
| 10 | Get 8EB2 | | P. Type 96C6 | Events 728B | |
| 11 | Set B4DA | Dataset 7B6A | | | Parent EA8E |
| 12 | Get 8EB2 | | Payload 4F0A | | Process 9D86 |
| 13 | Set B4DA | | | | |

FIG. 53

| Columns 9A67A / Build Dataset | | |
|---|---|---|
| RI/CI | 0 | 2 |
| | ID | R. Attribute |
| | 0F2B | B9C9 |
| 0 | B775 | Attribute 48C1 |
| 1 | 9488 | Operator 99DB |
| 2 | 75A3 | C. Value AEBB |
| 3 | F0ED | C. Attribute 1571 |
| 4 | 2A30 | AndOr E130 |

| Conditions 9A67A / Build Dataset | | | | |
|---|---|---|---|---|
| RI/CI | 0 | 1 | 2 | 3 | 4 |
| | Attribute B775 | Operator 9488 | C. Value 75A3 | C. Attribute F0ED | AndOr 2A30 |
| 0 | P. Object 303C | Equals A5F0 | | Process 1580 | 0 |
| 1 | Class 483A | Equals A5F0 | P. Condition 827F | | 0 |

FIG. 54

| Columns 9A67B / Build Dataset | | | | |
|---|---|---|---|---|
| RI/CI | 0 | 1 | 2 | 3 | 4 |
| | ID<br>0F2B | R. Class<br>4C62 | R. Attribute<br>B9C9 | Sortation<br>B9CB | Hidden<br>B1C9 |
| 0 | 0F2B | | ID<br>C823 | | 0 |
| 1 | 4C62 | | R. Class<br>54C9 | | 0 |
| 2 | B9C9 | | R. Attribute<br>3492 | | 0 |
| 3 | B9CB | | Sortation<br>FB5E | | 0 |
| 4 | B1C9 | | Hidden<br>83CC | | |

| Conditions 9A67B / Build Dataset | | | | |
|---|---|---|---|---|
| RI/CI | 0 | 1 | 2 | 3 | 4 |
| | Attribute<br>B775 | Operator<br>9488 | C. Value<br>75A3 | C. Attribute<br>F0ED | AndOr<br>2A30 |
| 0 | P. Object<br>303C | Equals<br>A5F0 | | Process<br>1580 | 0 |
| 1 | Class<br>483A | Equals<br>A5F0 | P. Column<br>8ECC | | 0 |

FIG. 55

Input E549B / Run Processes

| RI/CI | 0 Process | 1 P. Class | 2 Objects | | | 5 Height | 6 Width |
|---|---|---|---|---|---|---|---|
| 0 | C31E | 924D | 5364 | | | EA8F | 0171 |
| 1 | Control Panel 7FB7 | Device 4D7A | Dev 2 E7C9 | | | 4 | 4 |

Columns 7FB7 / V. Control Panel

| RI/CI | 0 ID 0F2B | | 2 R. Attribute B9C9 |
|---|---|---|---|
| 0 | | | |
| 3 | 29C7 | | Name 6842 |
| 4 | A396 | | Temp. CE89 |
| 5 | 4C70 | | Illum. D63D |

Columns 70C3 / Create View Elements

| RI/CI | 0 ID 0F2B | 1 R. Class 54C9 | 2 R. Attribute B9C9 |
|---|---|---|---|
| 0 | | | |
| 1 | C564 | | P. Object 303C |
| 2 | E0EA | | Class 483A |
| 3 | 3774 | | C. Object 48C1 |
| 4 | 9259 | | Top 4776 |
| 5 | 1763 | | Left 65CD |
| 6 | E724 | | Height BD06 |
| 7 | 4F77 | | Width 2415 |
| 8 | ABAB | | Content 8A6D |

Columns 70C3 / Create View Elements

| RI/CI | 0 Attribute B775 | 1 Operator 9488 | 2 C. Value 75A3 | 3 C. Attribute F0ED |
|---|---|---|---|---|
| 0 | | | | |
| 1 | P. Object 303C | Equals A5F0 | | Process 1580 |
| 2 | Class 483A | Equals A5F0 | Element F915 | |

Input 70C3 / Create View Elements

| RI/CI | 0 P. Object C564 | 1 Class E0EA | 2 C. Object 3774 | 3 Top 9259 | 4 Left 1763 | 5 Height E724 | 6 Width 4F77 | 7 Content ABAB |
|---|---|---|---|---|---|---|---|---|
| 0 | | | | | | | | |
| 1 | 9845 | Element F915 | Name 29C7 | 0 | 2 | 0.5 | 2 | Dev 2 |
| 2 | 9845 | Element F915 | | 0.5 | 0 | 0.5 | 2 | Temp. |
| 3 | 9845 | Element F915 | Temp. A396 | 0.5 | 2 | 0.5 | 2 | 76 |
| 4 | 9845 | Element F915 | | 1 | 0 | 0.5 | 2 | Illum. |
| 5 | 9845 | Element F915 | Illum. 4C70 | 1 | 2 | 0.5 | 2 | 1 |

FIG. 56

Input E549B / Run Processes

| RI/CI | 0 | 1 | 2 | 7 | 8 | 9 |
|---|---|---|---|---|---|---|
| | Process C31E | P. Class 924D | Objects 5364 | Classes 643E | Columns 7B5D | Conditions 8136 |
| 0 | Control Panel 7FB7 | Device 4D7A | Dev 2 E7C9 | [Classes 7FB7] | [Columns 7FB7] | [Conditions 7FB7] |

Classes 7FB7 / View Control Panel

| RI/CI | 0 | 1 | 2 |
|---|---|---|---|
| | Base Class 1DF7 | Class 4DCE | R. Attribute A47A |
| 0 | | | |

Conditions 7FB7 / View Control Panel

| RI/CI | 0 | 1 | 2 | 4 |
|---|---|---|---|---|
| | Attribute B775 | Operator 9488 | C. Value 75A3 | AndOr 2A30 |
| 0 | Class 483A | Equals A5F0 | Device 4D7A | 0 |

Columns 7FB7 / View Control Panel

| RI/CI | 0 | 1 | 2 | 4 |
|---|---|---|---|---|
| | ID 0F2B | R. Class 54C9 | R. Attribute B9C9 | Hidden B1C9 |
| 0 | 35C7 | | ID C823 | 0 |
| 1 | B13D | | Class 483A | 1 |
| 2 | 29C7 | | Name 6842 | 0 |
| 3 | A396 | | Temp. CE89 | 0 |
| 4 | 4C70 | | Illum. D63D | 0 |

Input 7FB7 / View Control Panel

| RI/CI | 0 | 1 | 2 | 3 |
|---|---|---|---|---|
| | ID 35C7 | Name 29C7 | Temperature A396 | Illumination 4C70 |
| 0 | E7C9 | Dev 2 | 76 | 1 |

State Dataset 231

| RI/CI | 8 | 9 | 10 | 25 | 26 |
|---|---|---|---|---|---|
| | ID C823 | Class 483A | Name 6842 | Temp. CE89 | Illum. D63D |
| 0 | E7C9 | Device 4D7A | Dev 2 | 76 | 1 |

FIG. 57

Input E549A / Run Processes

| RI/CI | 0 | 1 | 2 | 7 | 8 | 9 |
|---|---|---|---|---|---|---|
| | Process | P. Class | Objects | Classes | Columns | Conditions |
| | C31E | 924D | 5364 | 643E | 7B5D | 8136 |
| 0 | Normalize... AA7B | | | | | |
| 1 | | S. Attribute A4A9 | | [Classes AA7B] | [Columns AA7B] | [Conditions AA7B] |

Classes AA7B / Normalize Event Attribute

| RI/CI | 0 | 1 | 2 |
|---|---|---|---|
| | Base Class | Class | R. Attribute |
| | 1DF7 | 4DCE | A47A |
| 0 | | | |

Columns AA7B / Normalize Event Attribute

| RI/CI | 0 | 1 | 2 | 4 |
|---|---|---|---|---|
| | ID | R. Class | R. Attribute | Hidden |
| | 0F2B | 54C9 | B9C9 | B1C9 |
| 0 | C4FC | | P. Object 303C | 1 |
| 1 | | | C. Object 48C1 | 0 |
| 2 | 4B7C | | Mapped ID CB3F | 1 |
| 3 | 741F | | Multiplier DA68 | 0 |
| 4 | 85AF | | | |

Conditions AA7B / Normalize Event Attribute

| RI/CI | 0 | 1 | 3 | 4 |
|---|---|---|---|---|
| | Attribute | Operator | C. Attribute | AndOr |
| | B775 | 9488 | F0ED | 2A30 |
| 0 | P. Object 303C | Equals A5F0 | E. System 9F21 | 0 |
| 1 | Mapped ID CB3F | Equals A5F0 | E. Attribute 236E | 0 |
| 2 | | | | |

Input AA7B / Normalize Event Attribute

| RI/CI | 1 | 2 |
|---|---|---|
| | Attribute | Multiplier |
| | 4B7C | 85AF |
| 0 | | |
| 1 | Temperature CE89 | 0.095 |

State Dataset 231

| RI/CI | 12 | 13 | 15 | 17 |
|---|---|---|---|---|
| | P. Object 303C | C. Object 48C1 | Mapped ID CB3F | Multiplier DA68 |
| 0 | Sys 283 38AA | Temp CE89 | Pin 2 | 0.095 |
| 6 | | | | |

FIG. 58

METADATA-DRIVEN COMPUTING SYSTEM

RELATED APPLICATIONS

This is a continuation-in-part application and so claims the benefit pursuant to 35 U.S.C. § 120 of a prior filed and U.S. non-provisional patent application Ser. No. 16/290,755, filed on Mar. 1, 2019, which itself is a continuation of U.S. non-provisional patent application Ser. No. 15/091,488, filed on Apr. 5, 2016 (now U.S. Pat. No. 10,223,412, issued on Mar. 5, 2019), which is a continuation of U.S. non-provisional patent application Ser. No. 13/830,249, filed on Mar. 14, 2013 (now U.S. Pat. No. 9,336,013, issued on May 10, 2016), which claims priority to U.S. provisional patent application Ser. Nos. 61/762,779 and 61/783,362, filed on Feb. 8, 2013 and Mar. 14, 2013, respectively. The contents of the aforementioned applications are incorporated herein by reference.

This application is also related to U.S. non-provisional patent application Ser. No. 16/788,299, filed on Feb. 11, 2020, which itself is a continuation-in-part of U.S. non-provisional patent application Ser. No. 15/466,572, filed on Mar. 22, 2017, which is a continuation-in-part of U.S. non-provisional patent application Ser. No. 15/290,964, filed on Oct. 11, 2016 (now U.S. Pat. No. 10,545,933, issued on Jan. 28, 2020), which is a continuation of U.S. non-provisional patent application Ser. No. 14/685,545, filed on Apr. 13, 2015 (now U.S. Pat. No. 9,495,401, issued on Nov. 15, 2016), which claims priority to each of U.S. provisional application Ser. Nos. 61/978,440, 62/008,311 and 62/130,330, filed on Apr. 11, 2014, Jun. 5, 2014 and Mar. 9, 2015, respectively. The contents of the aforementioned applications are also incorporated herein by reference.

BACKGROUND

Field of the Invention

The embodiments described herein are generally directed to unified management, automation and interoperability of business and device systems, utilizing a computing system on any device and/or across different devices.

Description of the Related Art

Conventionally, in order to execute an application on a device (i.e., machine), it must be specifically designed and implemented for that particular device. For example, different versions of a software application must be created to work on both the Microsoft Windows™ operating system and Mac OS™. Virtual machines have mitigated this issue to an extent. Specifically, a virtual machine is a software simulation of an abstract or real machine that is generally different from the machine on which it is being executed. A virtual machine allows a software application designed for the virtual machine to be run on each machine on which the virtual machine is installed and executed, regardless of the machine's particular architecture. However, currently, there is no simple and scalable way to allow systems and applications to be distributed and continuously refined and updated from machine to machine. In addition, there is currently no simple and scalable way to execute a system or application on any machine, e.g., from an appliance controller (e.g., home thermostat) to a mobile device (e.g., smart phone). For instance, conventional home thermostats cannot act as a virtual machine running a Windows™ application.

Conventionally, data-centric software applications and application platforms have incorporated one or more software architecture patterns and programming paradigms, including service-oriented, client-server, peer-to-peer, event-driven, and object-oriented architectures, and object-oriented programming, object-relational mapping, and entity-relationship modeling.

Conventionally, device to device and human to device communications are managed through one or more communication protocols (e.g., MQTT, XMPP, DDS, AMQP, CoAP, RESTful HTTP).

None of the existing software architecture patterns or communication protocols have abstraction layers capable of effectively supporting the semantic interoperability requirements of the Internet of Things, Edge Computing and Unified Commerce. This leads to fragmented systems with complex and costly integrations between disparate systems.

It would be beneficial to have an architectural pattern and data exchange schema that eliminates fragmentation and provides normalized layers of abstraction that supports universal, semantic interoperability among devices using a computing system, and enables real-time event-driven process orchestration among devices and business.

SUMMARY

Accordingly, systems and methods are disclosed for unified management, automation and interoperability of business and device processes utilizing a computing system on any device and/or across different devices, aspects of which include, in at least one or more embodiment:

1) Distributing and continuously updating systems on any device from any other device;
2) Creating, updating, and deleting digital representations of objects while processing an events dataset;
3) Retrieving a current state of digital representations of objects while processing a queries dataset;
4) Processing a sensor event to trigger an actuator;
5) Displaying or printing a formatted view of digital representations of objects while processing an events dataset;
6) Distributing and synchronizing state across devices supporting a digital twin;
7) Generating an events dataset, queries dataset, and/or messages dataset while processing a messages dataset; and Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The details of the present invention, both as to its structure and operation, may be gleaned in part by study of the accompanying drawings. In such drawings:

FIGS. 5-30 illustrate the creation and provisioning of a state dataset with properties from connected systems, including a display system, a sensor/actuator system, and a remote I/O processor, according to at least one embodiment.

FIGS. 31-42 illustrate embodiments of metadata-driven processing by a I/O processor, in response to input, wherein the output is distributed to connected systems to render a display, control an actuator, and update a digital twin;

FIG. 43 illustrates an I/O processor, wherein the embodiment is a set of JavaScript functions including PROCESS, COMPUTE, RUN, SET, GET, and FIND operations;

FIG. 44 illustrates an embodiment of commands and their identifiers that are incorporated within instructions datasets and executed by a I/O processor;

FIG. 45 illustrates an embodiment of a message broker and UI/HMI system, wherein the embodiment is a set of JavaScript functions;

FIGS. 46-53 illustrate embodiments of instructions datasets processed by the I/O processor, wherein each instructions dataset represents a process, wherein the collective embodiments represent the processes of an application framework; and FIGS. 54-58 illustrate embodiments of input datasets that are created, updated, and/or read by executing one or more rows within its corresponding instructions dataset.

The above described drawing figures illustrate aspects of the invention in at least one of its exemplary embodiments, which are further defined in detail in the following description.

Features, elements, and aspects of the invention that are referenced by the same numerals in different figures represent the same, equivalent, or similar features, elements, or aspects, in accordance with one or more embodiments. Furthermore, FIGS. 1-43 incorporate a numbering scheme, wherein a numeral identifies an element being illustrated (e.g., "281" in IOP 281 in FIG. 1), and wherein the first digit of the identifying numeral (e.g., "2") represents a particular device (e.g., "Device 2"). A purpose of these figures is to simply illustrate how certain data can be changed and synchronized among devices and systems by transporting and processing data in at least one embodiment. The columns and/or rows within an illustrated dataset may represent only a subset of all the data within the dataset on a device in at least one embodiment.

Figure 6:
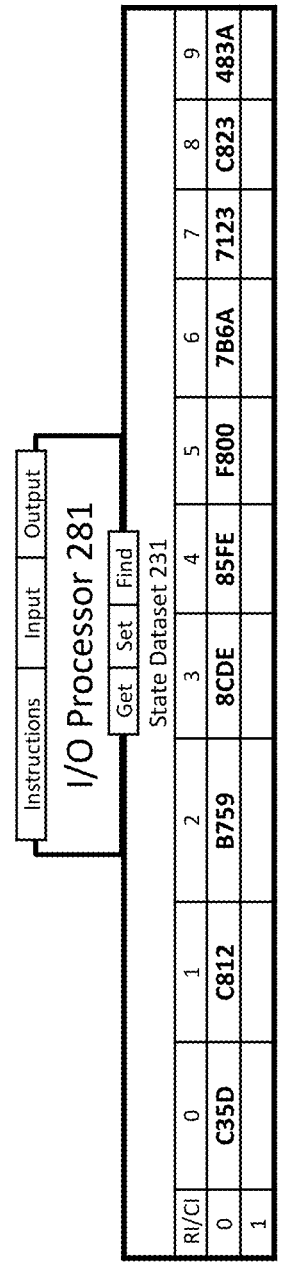

FIGS. 6-58 incorporate 4-digit hexadecimal values as a mechanism for naming objects identified within datasets, in accordance with one or more embodiments. Other embodiments may use alternative schemas for unique identifiers, including UUIDs. An object name (e.g., "Compute") appearing above a hexadecimal identifier (e.g., 0544) within a dataset element is not included in the implementation of the computing system. Further, a bracketed name appearing within a dataset element represents the name of a dataset that is nested in or referenced as the dataset element.

DETAILED DESCRIPTION

A digital message format, message broker (MB), I/O processor (TOP), and state dataset (OD) of a computing system are disclosed in various embodiments.

1. Glossary

For purposes of understanding the present disclosure, the following terms should be understood to include at least the following, illustrative, non-exhaustive definitions:

"Abstraction Layer": A way of hiding the implementation details of a particular set of functionality, allowing the separation of concerns to facilitate interoperability and platform independence. Software models that use layers of abstraction include the OSI 7-layer model for computer network protocols.

"Application": A computing system that applies the functionality of a particular Application Framework to a particular purpose. Examples of applications include, without limitation, machine control, business and/or accounting software, websites, etc.

"Application Framework": A computing system that forms a framework to implement the standard structure of an Application. A framework can include standard user interface elements and a rendering format. A framework manages and integrates a device's capabilities, but typically does not directly apply in the performance of tasks that benefit the user or device. An example of an Application Framework includes, without limitation, the Microsoft .NET Framework.

"Attribute": A data characteristic of a class. Every class has a minimal set of uniquely identifying attributes, including a unique identifier.

"Attribute Value": The value of an attribute of an object.

"Authentication": The verification of the credentials of a connection attempt. This process consists of, in at least one embodiment, sending the credentials from one device to another device in an either plaintext or encrypted form by using an authentication protocol.

"Class": A category of like things or objects which are each recognized as being capable of an independent existence and which can be uniquely identified. Non-limiting examples of a class include physical objects such as houses or cars, events such as house sales or car services, concepts such as customer transactions or orders, personal information such as contacts, messages, events, and tasks, and object schema including classes, reflectively.

"Command Parameter": A parameter property used to pass specific information to a command (i.e., operation) when it is executed. The type of the data is defined by the command. Some commands do not expect command parameters; for these commands, any command parameters passed are ignored.

"Communication Protocol": A system of digital message formats and rules for exchanging messages in or between computing systems (e.g., in telecommunications). Protocols may include signaling, authentication, error detection capabilities, and/or correction capabilities. Each message has an exact meaning intended to provoke a defined response by the receiver. The nature of the communication, the actual data exchanged, and any state-dependent behaviors are defined by a technical specification or communication protocol standard. Examples of conventional communication protocols include, without limitation, HTTP, HTTP Secure (HTTPS), Simple Mail Transfer Protocol (SMTP), Constrained Application Protocol (CoAP), etc.

"Computing State": The current processing state of a computing system, including in-memory applications, state variables and/or rendered views.

"Computing System": An integrated set of components for collecting, storing, and processing data and for providing information, knowledge, and digital products. Examples of computing systems include, without limitation, an application, application framework, database engine, microservice, display driver, voice driver, printer driver, actuator driver, device controller, and a I/O processor.

"Connection": An established agreement or authorization to exchange data between systems.

"Data Store": A repository for persistently storing and managing collections of data. A data store is a general concept that includes not just repositories like databases and event ledgers, but also simpler store types, such as datasets, flat files, firmware, or port pin collections of a microcontroller.

"Dataset": A collection of data represented in tabular form. Each column in a dataset may represent a particular variable. Each row in a dataset may correspond to a given member of the dataset in question. A dataset may comprise data for one or more members, corresponding to the number of rows. Example embodiments of a dataset include a table within a database, a file within a file system, a two-dimensional array, and a port pin collection within a microcontroller.

"Dataset Element": Any value in a dataset. A dataset element can be referenced by a combination of its column position ("column index" or "CI") and row position ("row index" or "RI") within the dataset. Elements within a dataset may be referenced using [x][y] notation, where [x] is the row index and [y] is the column index. A dataset element can represent an attribute value of an object. Examples of a dataset element include a field within a database table, an address within a file, an element within a two-dimensional array, and a port pin within a microcontroller.

"Device": An electronic machine capable of performing one or more computing processes, receiving data from one or more other electronic machines, and/or sending data to one or more other electronic machines. Examples of devices include, without limitation, a server, personal computer (PC), laptop computer, tablet, a media system, an entertainment system, a control system (e.g., an in-vehicle media, entertainment, and/or controls system), smart phone, appliance, mechanical controller, thermostat, etc.

"Digital Twin": A synchronized virtual representation of real-world entities, processes and their interactions.

"Event": A change in the state of an object, including, for a new object, the change from no state into an initial state. For example, when a consumer purchases a car, the car's state changes from "for sale" to "sold".

"Event Notification": A type of message (typically asynchronous) that is produced, published, propagated, detected, or consumed, and contains one or more events. For example, a car dealer's automated system may notify another system of a car object's state change from "for sale" to "sold".

"Event-defined Object": A digital representation of an object that can be compiled from a dataset of events.

"I/O Processor": A hardware or software processor that controls and manages input-output tasks by fetching and executing its own instructions and transferring data between computing systems and memory. A I/O Processor may be a CPU.

"MAC Address": A device address that uniquely identifies a node of a network. It is assigned by the device's manufacturer and saved to the device's memory. The first bytes of a MAC Address are known as the Organizationally Unique Identifier (OUI) and represents the device's manufacturer.

"Message Broker": A hardware or software component or module that facilitates the exchange of digital messages in or between computing systems. The message broker may also transform a message from one communication protocol to another.

"Metadata": There are two types of metadata. "Structural metadata" is data about the design and specification of data structures. Structural metadata cannot be data about data, since at design time, the application contains no data. Rather, structural metadata is data about the containers of data. "Descriptive metadata" is data about data content. This data content is the individual instances of application data.

"Nested Dataset": A dataset stored or referenced as a dataset element within another dataset. Nested datasets are one-to-many relationships embodied in a single parent dataset (e.g., memory store).

"Normalization": The process of reducing data and metadata to a canonical form to facilitate interoperability. For instance, dataset normalization is the process of organizing datasets and dataset elements within a data store to minimize redundancy and dependency.

"Object": A data representation of a unique instance of a class. Data characteristics ("attribute values") of an object can be stored as dataset elements within a row of a dataset.

"Object Identifier": An identifier mechanism for naming any object with a globally unambiguous persistent name (e.g., a UUID).

"Objects Dataset": A structured dataset wherein each row represents an object. A state dataset can be generated from object events.

"Payload": A structured dataset or string of characters that can be executed, in their entirety, by a compatible system to perform a computing process. Examples of computing processes which may be performed by executing a payload using a system include, without limitation, rendering a display or user interface, manipulating and/or retrieving data, printing a document, invoking an application programming interface (API), controlling a mechanism, transmitting an XML message to a web service, changing the state of a device or system, etc.

"Process Instance": A data structure that represents a specific occurrence or execution of a system process.

"Query": An encapsulated description of the characteristics of related objects used to retrieve a query resultset. Examples include a SQL script and a Queries dataset.

"Query Resultset": One or more datasets generated in response to a query that includes one or more attribute values from one or more objects.

"Rendered View": An encapsulated description of a fixed-layout flat document, including the text, fonts, graphics, and other information needed to display or print it. Examples include a Portable Document Format (PDF) file and View dataset.

"Remote Message Broker": A message broker on a remote device that can be invoked directly by a message broker on another device. For example, two or more devices may be separated by one or more networks, such as the Internet, rendering each of the devices remote from the other. An example of a remote message broker includes, without limitation, a web service and an API gateway.

"Request": A message sent to a system or remote message broker via a communication protocol that is intended to elicit a responding message. An example of a request includes, without limitation, a Hypertext Transfer Protocol (HTTP) request.

"Response": A message returned from a system or remote message broker via a communication protocol in response to a request (e.g., after processing the request). Examples of responses include, without limitation, an error message, UI event, SQL result set, etc.

"Scripting Language": A programming language that supports the writing of scripts. Scripts are programs written for a software environment that automate the execution of tasks which, alternatively, could be executed one-by-one by a human operator. Environments that can be automated through scripting include, without limitation, software applications, web pages within a web browser, shells of operating systems, and several general purpose and domain-specific languages, such as those for embedded systems. Examples of scripting languages include, without limitation, Structured Query Language (SQL), HTML, Printer Control Language (PCL), eXtensible Markup Language (XML), Computer Numeric Control (CNC), etc.

"Semantic Interoperability": Exhibited by two or more devices that are able to automatically interpret the information exchanged meaningfully and accurately in order to produce useful results as defined by the end users of the devices. Further, it represents interoperability at the highest level, which is the ability of two or more systems or elements to exchange information and to use the information that has been exchanged. Semantic interoperability takes advantage of both the structuring of the data exchange and the codification of the data including vocabulary so that the receiving information technology systems can interpret the data. This level of interoperability supports the electronic exchange of information among parties via potentially disparate systems.

"State Dataset": A read-write dataset that maintains computing state.

"Synchronization": The process of establishing consistency among data from a source to a target data store and vice versa and the continuous harmonization of the data over time.

"Syntactic Interoperability": Exhibited by two or more devices that are capable of communicating with each other using specified data formats, such as XML, SQL or array of arrays.

"Triggered Action": An action performed in response to an event that meets a defined condition, rule, or logical test.

"UUID": A universally unique identifier (UUID) is a unique reference number generated by an algorithm that is used as an identifier in computer software. Non-limiting examples of a UUID include alphanumerical text, a sequence of digits (e.g., decimal or hexadecimal digits), a MAC address and time, and may be stored as a 16-byte (128-bit) number. An example of a UUID is "D9A4F842-AF53-4A49-B752-CE58BE46C72D".

2. Overview

The disclosed components of a computing system include a digital message format, message broker, I/O processor, and state dataset. The computing system facilitates unified management, automation and interoperability of business and device systems on any device and/or across different devices. Such devices may range, for example, from a sensor and actuator (e.g., home thermostat) to a computer (e.g., smart phone, gateway, cloud server), and so on. The disclosed embodiments also facilitate the transport of portable applications (i.e., systems), computing state, data, events, and queries on one device (e.g., coffee maker) to another device (e.g., smart phone) via a novel message format for communications. The portable applications can be simple (e.g., an on/off switch) or complex (e.g., robotics or business solutions (e.g., enterprise resource planning (ERP), customer relationship management (CRM), etc.)).

For example, the disclosed components of a computing system can facilitate codeless, rapid development and on-demand delivery of data-centric applications on end-user devices, such as smart phones, tablets, PCs, and in-vehicle navigation systems. The data-centric application may be a control panel, web site, business solution, etc.

In an embodiment, the message format is an abstraction layer of a communication protocol that defines the data schema for sending and receiving one or more types of messages from one device to another, and/or from one system to another on a device.

In an embodiment, each of the one or more rows in a messages dataset comprises a message.

In an embodiment, each message within a messages dataset comprises a message type, a payload, an identification of a system or device to process the payload, and authentication credentials. In at least one such embodiment, an identification of a system or device can comprise an address type and an address string. In at least one such embodiment, a payload in a row can comprise a payload type and a payload string. In at least one such embodiment, authentication credentials in a row can comprise a credentials type and a credentials string.

In an embodiment, while processing a single payload within a messages dataset may only perform a portion of creating, reading, updating, and deleting objects within a data store (e.g., reading), the combined processing of all payloads, within the dataset schema of the messages dataset, perform all aspects of creating, reading, updating, and deleting objects within a data store.

In an embodiment, interoperable data exchange and synchronization among devices is facilitated by processing payloads within a plurality of messages datasets transported among devices.

In an embodiment, each of the one or more rows in the messages dataset comprises a payload type and a payload.

In an embodiment, the message format defines the data schema ("events dataset") for sending one or more events as a payload within a messages dataset to be processed by a type of system and stored within a data store (e.g., an event ledger).

In an embodiment, the message format defines the data schema ("queries dataset") for sending one or more queries as a payload within a messages dataset, to be processed by a type of system (i.e., a I/O processor).

In an embodiment, the message format defines the data schema ("credentials") for sending user authentication credentials within a messages dataset to be processed by a type of system.

Figure 1:
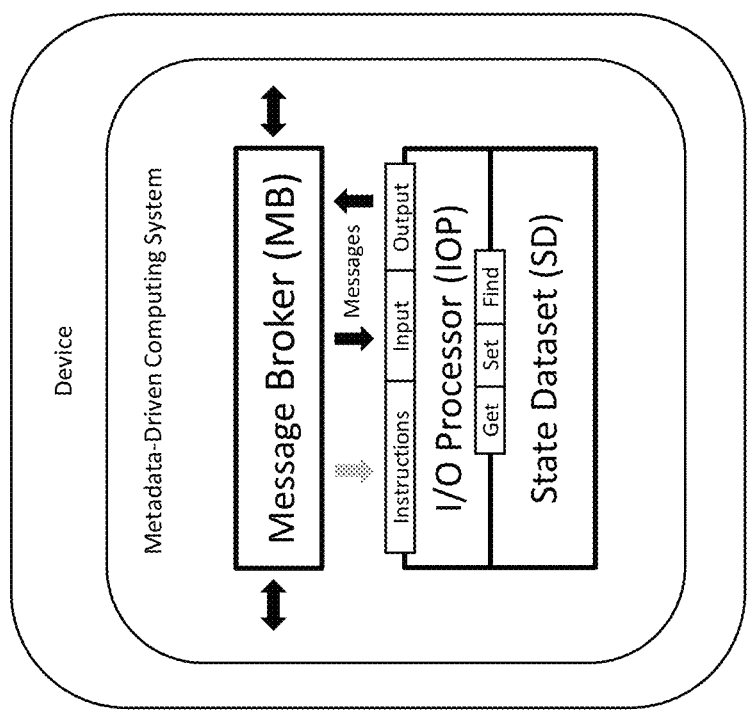
FIG. 1 illustrates components of a computing system, including a I/O processor, a state dataset, message format, and a message broker, according to at least one embodiment.

FIG. 1 illustrates the relationships between the computing system on a plurality of devices with at least some of the devices containing a message broker, I/O processor, and state dataset, according to an embodiment. It should be understood that not all of these devices may comprise all of these components, depending on the particular implementation and/or scenario.

The I/O processor (e.g., IOP 281) is a type of system that receives and processes an input dataset. In an embodiment, a messages dataset is a type of input dataset processed by the I/O processor. The I/O processor can reside on multiple devices (e.g., IOP 281 on device 200 and IOP 381 on device 300) and be a system available to a message broker specific to each device (e.g., message broker 210 on device 200 and message broker 310 on device 300).

In an embodiment, a message within the messages dataset may identify the system needed to process a payload. If the system identified in the message is on a remote device (e.g., device 100), then the messages dataset also identifies the remote device. For example, if message broker 210 on device 200 is processing a messages dataset that has a message identifying a needed system 180 on device 100, message broker 210 may forward the messages dataset or a new messages dataset (e.g., messages 410) to the remote message broker (e.g., message broker 110) for processing.

(1) If one or more messages in the messages dataset identifies a system on the same device as the message broker, the message broker (e.g., message broker 210) sends the one or more messages to the identified device system. For example, if message broker 210 processes a message pertaining to identified system 280, message broker 210 may send the message (e.g., messages 270) to system 280. The executing system may return a message (e.g., messages 260) to the invoking message broker.

(2) If one or more messages in the messages dataset identifies an I/O processor (e.g., IOP 281) on the same device as the message broker, the message broker may send the one or more messages (e.g., messages 270) to the I/O processor for processing. The I/O processor may create, update, or delete one or more rows within a state dataset (e.g., SD 231). The I/O processor may also generate one or more output datasets. In an embodiment, a messages dataset is a type of output dataset generated by the I/O processor. The I/O processor may submit an outputted messages dataset (e.g., messages 260) to the message broker to send to one or more computing systems for processing.

A message within a messages dataset may comprise an events dataset, a queries dataset, a query results dataset, or a system-compatible script in various scripting languages (e.g., HTML, XML, PCL, ZPL, SQL) which can be executed by a computing system to, without limitation, render a display or user interface, print a document, invoke an actuator, retrieve state from a data store, or change the state of a data store (e.g., data store 230).

3. Example Embodiments of a Message Format 3.1. Example Messages Dataset

The following description illustrates a non-limiting embodiment of a message format within a messages dataset. The messages dataset includes syntactically and semantically interoperable data and metadata content that a message broker (e.g., message broker 210) or computing system (e.g., system 280) can interpret and process.

The messages dataset may comprise one or more messages, which may be sent from a message broker (e.g., message broker 210) to a local computing system (e.g., system 280) or a remote message broker (e.g., message broker 110 or message broker 310) using one of a plurality of communication protocols.

In an embodiment, messages may be represented by a multi-row dataset (e.g., messages 271 in FIG. 24) with one or more of the defined columns illustrated in Table 1, wherein a row can represent a message:

TABLE 1

| ID | Description |
|---|---|
| 4C29 | Message ID |
| 91E7 | Message Type |

TABLE 1-continued

| ID | Description |
|---|---|
| E2F5 | Address Type |
| B903 | Address |
| 96C6 | Payload Type |
| 4F0A | Payload |
| 4BBF | Credentials Type |
| 85B7 | Credentials |

Figure 24:
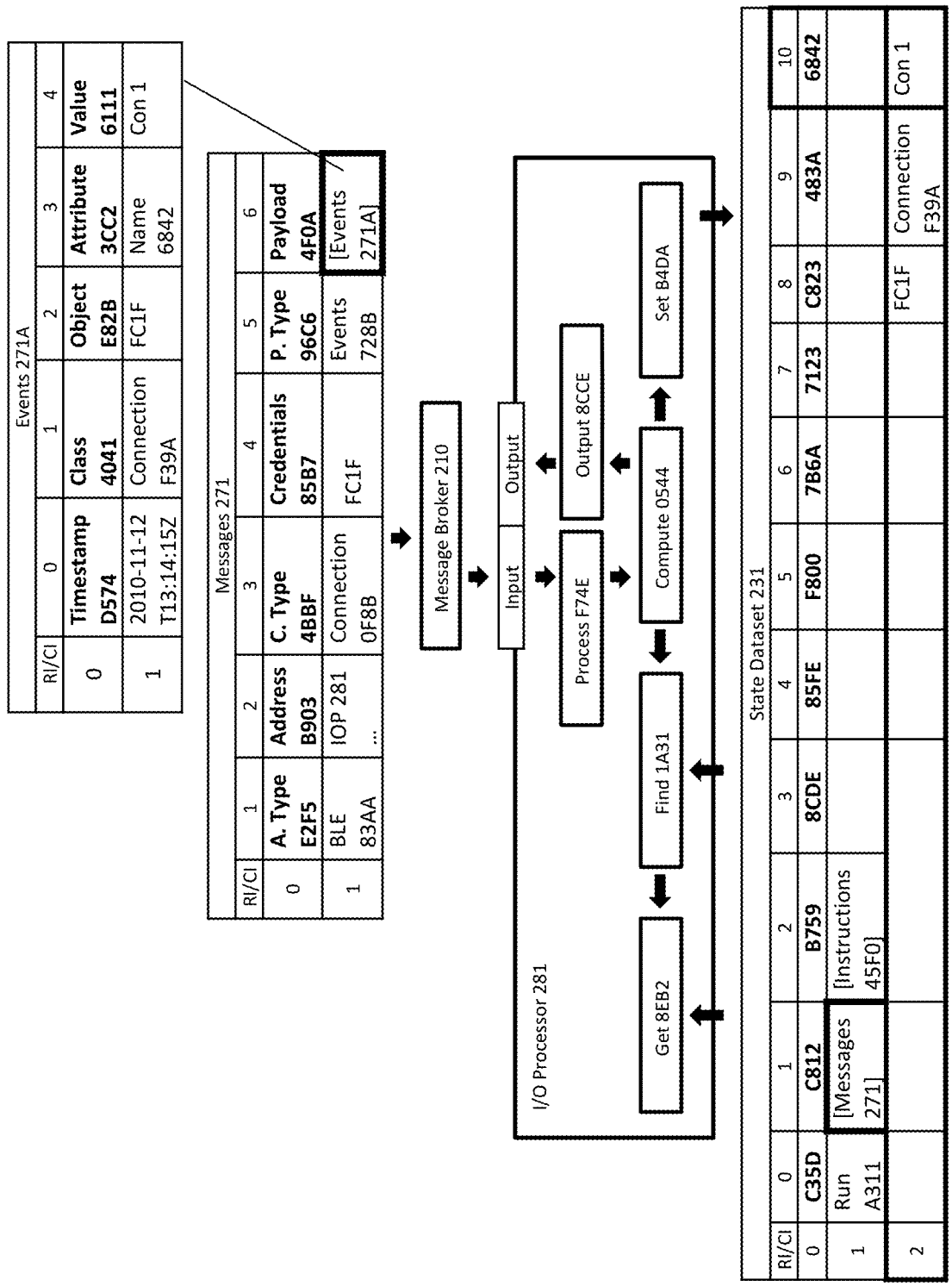

In an embodiment, a row in a messages dataset can comprise the identifiers of the dataset columns, as illustrated in messages 271 in FIG. 24.

Illustrative defined values for the Message Type element are illustrated in Table 2:

TABLE 2

| Value | Description |
|---|---|
| 79ED | Process Payload Asynchronously |
| D5B1 | Process Payload and Respond Synchronously |
| EB90 | Return State dataset |

Illustrative defined values for the Address Type element are illustrated in Table 3:

TABLE 3

| Value | Description |
|---|---|
| 2F9E | I2C |
| E912 | HTTP |
| DCA4 | HTTPS |
| 6D3E | Web Socket |
| FF4C | TCP/IP |
| 4C25 | MQTT |
| AC92 | AMQP |
| A1BB | CoAP |
| 83AA | BLE |
| 4E92 | NFC |
| B0D0 | File |

Illustrative defined values for the Payload Type element are illustrated in Table 4:

TABLE 4

| Value | Description |
|---|---|
| AE2D | Messages dataset |
| 728B | Events dataset |
| E94C | Queries dataset |
| D099 | Results dataset |
| 60CF | State dataset |
| 48F9 | SQL script |
| A6CA | PCL script |
| 603E | ZPL script |
| DE1C | XML script |
| F210 | HTML script |

In an embodiment, the value of the Payload element in a row within the messages dataset comprises a nested messages dataset when the Payload Type element value in the row is "AE2D".

In an embodiment, the value of the Payload element in a row within the messages dataset comprises an events dataset when the Payload Type element value in the row is "728B".

In an embodiment, the value of the Payload element in a row within the messages dataset comprises a queries dataset when the Payload Type element value in the row is "E94C".

In an embodiment, the value of the Payload element in a row within the messages dataset comprises a nested results dataset when the Payload Type element value in the row is "D099".

In an embodiment, the value of the Payload element in a row within the messages dataset comprises a nested state dataset when the Payload Type element value in the row is "60CF".

Illustrative defined values for the Credentials Type element are illustrated in Table 5:

TABLE 5

| Value | Description |
|-------|-------------|
| D878 | MAC Address |
| 45F7 | UID/Password |
| 0F8B | Connection ID |
| 9255 | Token |

In an embodiment, the value of the Message ID element in a row in the messages dataset (e.g., messages 425) will contain the Message ID of a row in a messages dataset (e.g., messages 415) that invoked a system to generate the row in the messages dataset.

In an embodiment, the messages dataset (e.g., messages 415) may be generated from a message broker (e.g., message broker 310) or a local system available to the message broker (e.g., IOP 381).

In an embodiment, a messages dataset can be converted to a serialized array of arrays for transport.

3.2. Example Events Dataset in a Message

The following description illustrates a non-limiting embodiment of one or more events within an events dataset. The events include syntactically and semantically interoperable data and metadata content that an I/O processor can interpret and process.

In an embodiment, an events dataset may be included in a payload of a message in a messages dataset. In an embodiment, events that have been processed by an IOP may be stored in a data store. In an embodiment, events may be represented by a multi-row dataset (e.g., events 271A in FIG. 24) with one or more of the defined columns illustrated in Table 6, wherein a row can represent an event:

TABLE 6

| ID | Name |
|------|-----------------|
| D574 | Time Stamp |
| 4041 | Object Class |
| E82B | Object |
| 3CC2 | Attribute |
| 6111 | Attribute Value |

In an embodiment, a row in an events dataset can comprise the identifiers of the defined columns, as illustrated in events 271A in FIG. 24.

In an embodiment, the "Time Stamp" column represents when the event in the row occurred.

In an embodiment, the "Object Class" column identifies a category of objects sharing the same attributes.

In an embodiment, the "Object" column identifies an object within the identified Object Class.

In an embodiment, the "Attribute" column identifies an attribute of the identified object.

In an embodiment, the "Attribute Value" column represents the value of the identified attribute of the identified object.

In an embodiment, an events dataset defines a state and characteristics of one or more objects at one or more points in time based on the timestamp within each row.

3.3. Example Queries Dataset in a Message

The following description illustrates a non-limiting embodiment of one or more object queries within a queries dataset. The queries include syntactically and semantically interoperable data and metadata content that a I/O processor can interpret and process.

In an embodiment, a queries dataset may be included in a payload of a message in the messages dataset. In an embodiment, an input dataset within a process instance of an I/O processor may comprise a queries dataset.

In an embodiment, queries may be represented by a multi-row dataset (e.g., input E549B in FIG. 57) with one or more of the defined columns illustrated in Table 7, wherein a row can represent a query:

TABLE 7

| ID | Name |
|------|------------------|
| 924D | Base Class |
| 5364 | State |
| 4284 | Parent Object |
| B74C | Child Attribute |
| 643E | Query Classes |
| 7B5D | Query Columns |
| 8136 | Query Conditions |

In an embodiment, a row in a queries dataset can comprise the identifiers of the defined columns, as illustrated in input E549B in FIG. 57.

In an embodiment, the Query Classes within an element in a row in a queries dataset may be represented by a multi-row dataset (e.g., classes 7FB7 in FIG. 57) with one or more of the defined columns illustrated in Table 8:

TABLE 8

| ID | Name |
|------|--------------------|
| 1DF7 | Base Class |
| 4DCE | Class |
| A47A | Relation Attribute |

In an embodiment, a row in a query classes dataset can comprise the identifiers of the defined columns, as illustrated in classes 7FB7 in FIG. 57.

In an embodiment, the Query Columns within an element in a row in a queries dataset may be represented by a multi-row dataset (e.g., columns 9A67B in FIG. 55) with one or more of the defined columns illustrated in Table 9:

TABLE 9

| ID | Name |
|------|---------------|
| 0F2B | Column ID |
| 4C62 | Related Class |
| B9C9 | Attribute |
| B9CB | Sortation |
| B1C9 | Hidden |

In an embodiment, a row in a query columns dataset can comprise the identifiers of the defined columns, as illustrated in columns 9A67B in FIG. 55.

In an embodiment, the Query Conditions within an element in a row in a queries dataset may be represented by a multi-row dataset (e.g., conditions 9A67B in FIG. 55) with one or more of the defined columns illustrated in Table 10:

TABLE 10

| ID | Name |
|---|---|
| CB57 | Query Column |
| B775 | Attribute |
| 9488 | Operator |
| F0ED | Comparison Attribute |
| 75A3 | Comparison Value |
| 2A30 | And/Or |

In an embodiment, a row in a query conditions dataset can comprise the identifiers of the defined columns, as illustrated in conditions 9A67B in FIG. 55.

4. Example Embodiment of a Message Broker

Figure 2:
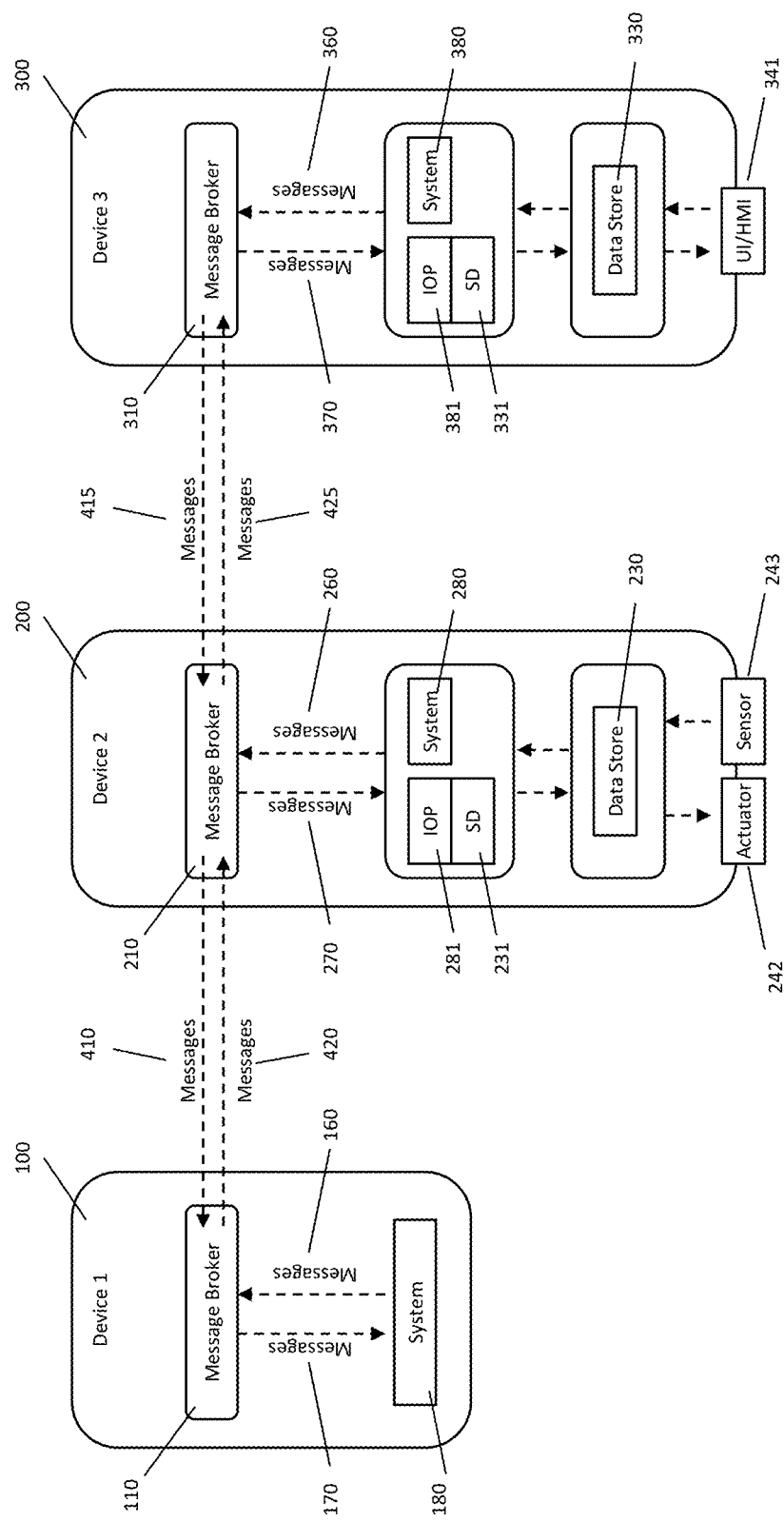
FIG. 2 illustrates a plurality of devices utilizing components of the computing system and interacting with other systems and data stores, according to at least one embodiment.

The following description illustrates a non-limiting embodiment of a message broker (e.g., message broker 110, 210, and/or 310). FIG. 2 illustrates the relationships between a message broker 210, a I/O processor 281, as a type of system, a system 280, as a type of system, a remote message broker 310 and a remote device 300, according to an embodiment.

In an embodiment, message broker 210 monitors incoming messages datasets from remote message brokers (e.g., remote message broker 310) and local systems (e.g., system 280). When a messages dataset is received (e.g., messages 415), message broker 210 may process one or more messages in the messages dataset and may generate one or more responses in a messages dataset (e.g., messages 425) that is returned to the remote message broker.

In an embodiment, a system (e.g., IOP 281) of device 200 may generate a messages dataset (e.g., messages 261) and invokes message broker 210 to route the messages within the messages dataset.

In an embodiment, for each message in a messages dataset (e.g., messages 415), message broker 210 may invoke a system (e.g., IOP 281 or system 280) of device 200 that is identified in a message within the messages dataset to process the message, which may generate a messages dataset in response.

Figure 31:
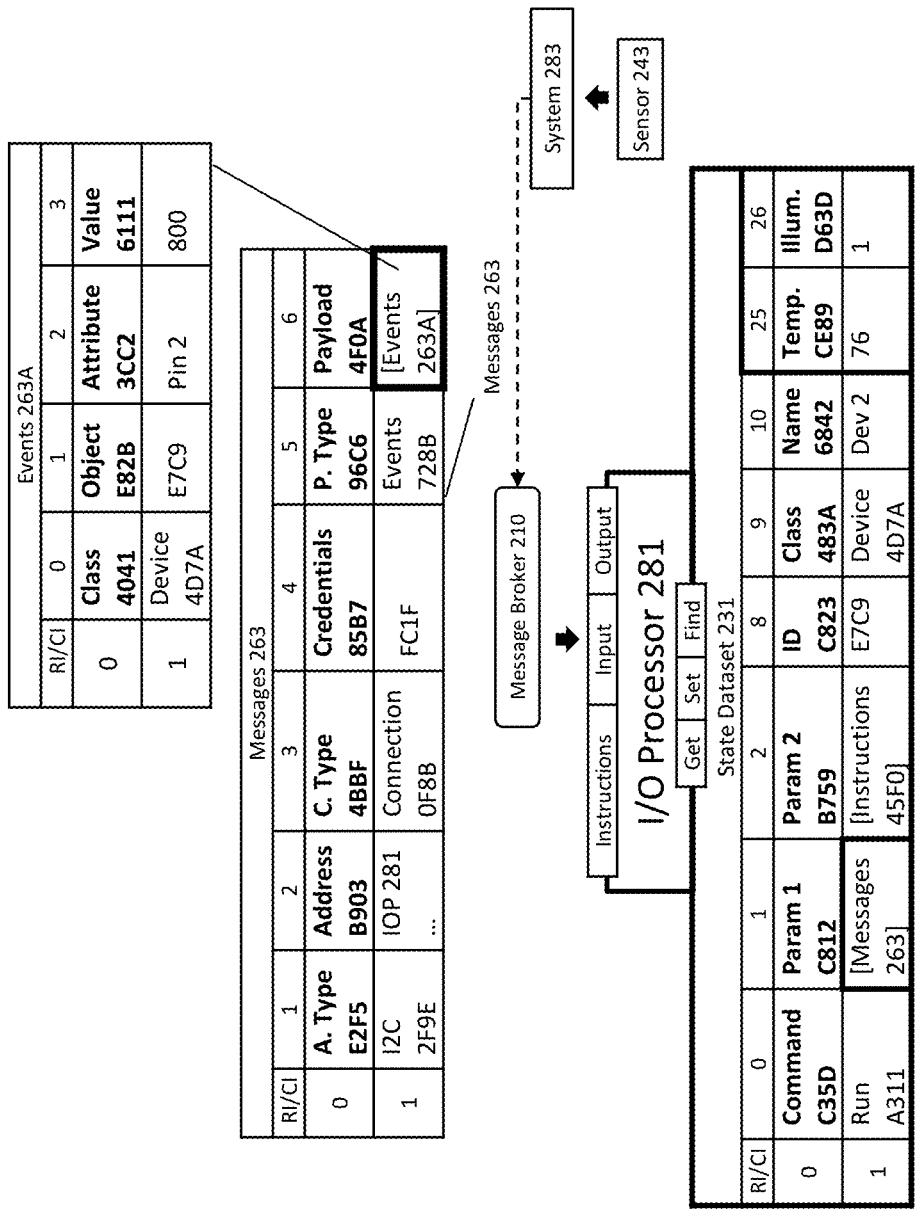

As illustrated in FIG. 31, the message broker (MB 210) receives a messages dataset (messages 263) from a computing system (system 283), wherein the "Address" element of the message (element [1][2] in messages 263) identifies another computing system (IOP 281) and the "Payload" element of the message within messages dataset (element [1][6] in messages 263) comprises an events dataset (events 263A). MB 210 converts the message in the messages dataset to a serialized array of arrays to send to IOP 281 for processing, wherein the serialized array of arrays is similar to:

[["E2F5","B903","4BBF","85B7","96C6","4F0A"], "2F9E"," . . . ","0F8B","FC1F","728B",[["4041","E82B", "3CC2","6111"],["4D7A","E7C9","Pin 2","800"]]]]

In an embodiment, a I/O processor (e.g., IOP 281) processes a serialized array of arrays as an input dataset.

In an embodiment, for a messages dataset (e.g., messages 425) returned to message broker 310, message broker 310 processes the one or more messages in the messages dataset.

In an embodiment, message broker 210 returns a messages dataset (e.g., messages 425) to a system (e.g., system 380) that generated the initiating messages dataset (e.g., message 415).

In an embodiment, a system (e.g., IOP 281) may generate a payload in a messages dataset (e.g., messages 425) that comprises a state dataset (e.g. SD 231).

In an embodiment, the message broker may invoke a second message broker, as a system, on the same device to process a payload. In at least one such embodiment, the second message broker is interfaced to a subsystem of the device, wherein the subsystem comprises a second set of components of the computing system. In at least one such embodiment, the subsystem within a device interacts with the message broker in a manner similar to a remote device. In at least one such embodiment, the payload submitted to the second message broker by the message broker comprises a messages dataset and a response returned by the second message broker to the message broker comprises a messages dataset.

In an embodiment, a system (e.g., system 282) can be invoked by a message broker (e.g., message broker 210) to convert a messages dataset (e.g., messages 272) to a format that can be processed by a display engine or print engine to display a user interface or print a document.

In an embodiment, a system (e.g., system 283) can be invoked by a message broker (e.g., message broker 210) to convert a messages dataset to a format that can be processed by a database engine or microcontroller to change the state of a data store or invoke an actuator.

In an embodiment, the data store can comprise the current state of a port pin collection of a microcontroller. In at least one such embodiment, a change in the state of the port pins corresponds to a change in the state of a data store, and vice versa.

In an embodiment, a change in the state of a data store can trigger a system to generate an events dataset that reflects the change. In at least one such embodiment, the system (e.g., system 280) can submit the events dataset (e.g., events 271) as a payload within a messages dataset to a message broker (e.g., message broker 210) for processing.

In an embodiment, the message broker may convert a message or its payload in a non-conforming format to a format conforming to the computing system prior to sending the message to a conforming system. In another embodiment, the message broker may convert a message or its payload to a non-conforming format from a format conforming to the computing system prior to sending a payload to a non-conforming system.

5. Example Embodiment of a I/O Processor

Figure 3:
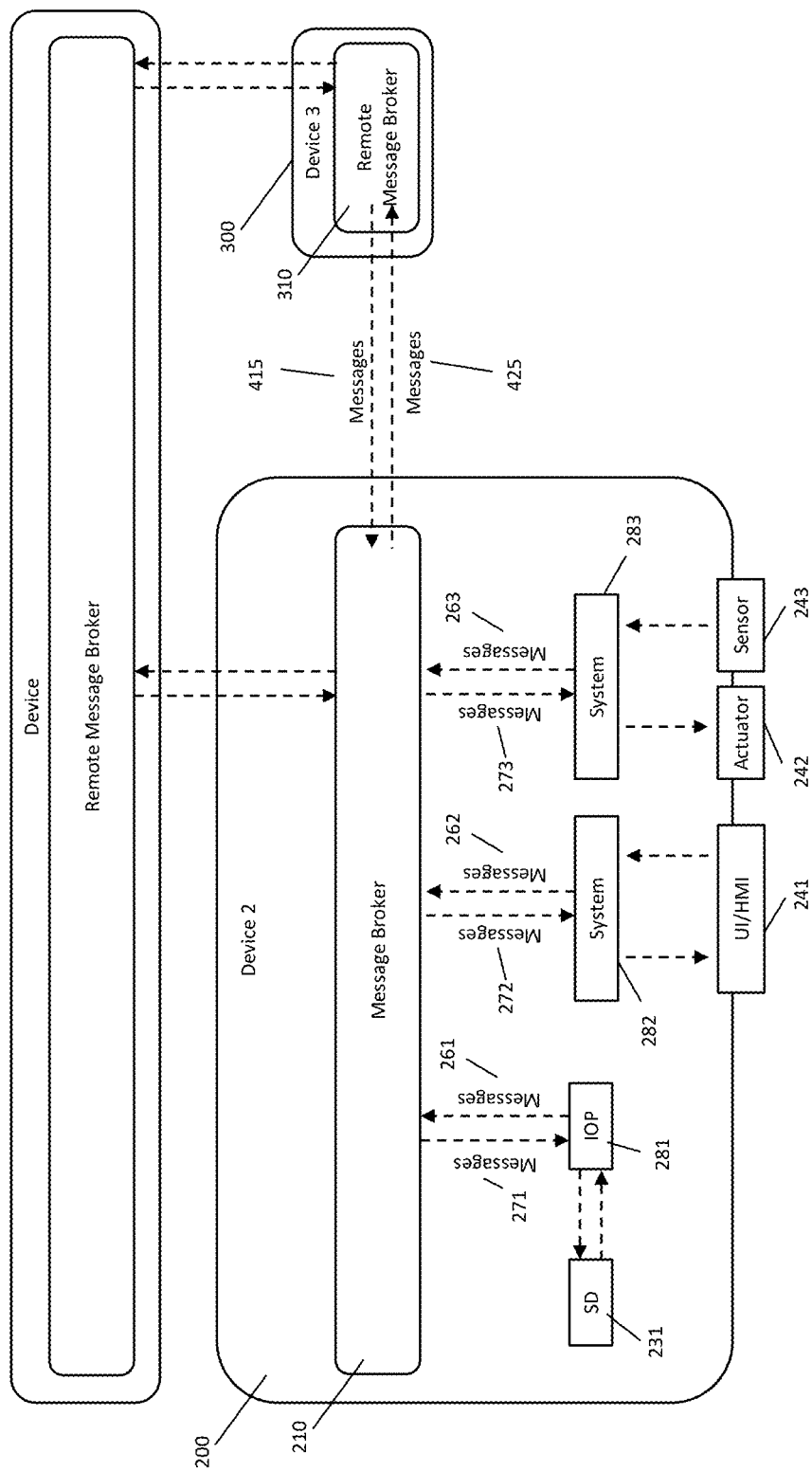
FIG. 3 illustrates a device utilizing components of the computing system, and interacting with other systems and data stores, according to at least one embodiment.

The following description illustrates non-limiting embodiments of a I/O processor (TOP), as a computing system of a device. FIG. 3 illustrates the relationships between an IOP 281, a message broker 210, and a state dataset 231, according to an embodiment.

Figure 5:
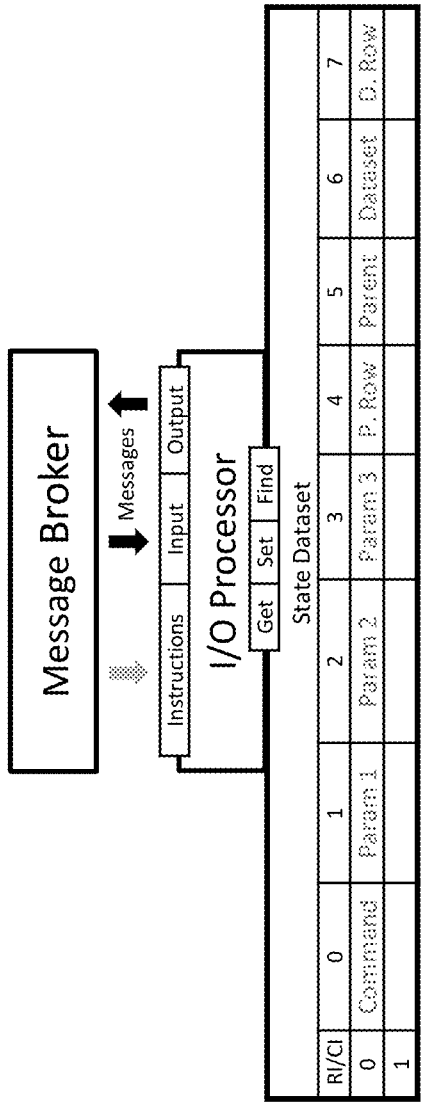

In an embodiment, a first row in a state dataset is reserved for unique identifiers of columns, as illustrated in RI [0] in SD 231 in FIG. 5.

In an embodiment, an instructions dataset and an input dataset can be received by the I/O processor (e.g., IOP 281) from one or more computing systems (e.g., message broker 210).

In an embodiment, the I/O processor (e.g., IOP 281) comprises a set of operations that each perform a value computation, manipulation, or retrieval within a state dataset (e.g., SD 231).

In an embodiment, an operation of an I/O processor can be identified by a command ID (i.e., operation code). Illustrative defined command IDs for operations and expected command parameters are illustrated in Table 44.

In an embodiment, a core set of operations within the I/O processor includes a PROCESS operation (command ID F74E), a COMPUTE operation (command ID 0544), a SET operation (command ID B4DA), a GET operation (command ID 8EB2), a FIND operation (command ID 1A31), a RUN operation (command ID A311), and an OUTPUT operation (command ID 8CCE), as illustrated in FIG. 24.

FIG. 43 illustrates an embodiment of the core set of operations within IOP 281 as JavaScript functions.

In an embodiment, an operation of an I/O processor may append one or more rows to a state dataset to represent an instance of a process or subprocess, wherein each process instance comprises an input dataset and an instructions dataset. In an embodiment, an operation within a I/O processor may delete one or more rows from a state dataset that represents a process instance after executing all instructions within its instructions dataset for all input within its input dataset.

In an embodiment, a I/O processor appends 2 rows to a state dataset to represent a process instance.

In an embodiment, the last process instance appended to a state dataset is the active process instance.

In an embodiment, an executing instruction comprises "Command ID", "Command Parameter 1", "Command Parameter 2", "Command Parameter 3", and "Process Row" elements of a row in the state dataset. In an embodiment, the row of the executing instruction is identified in the "Dataset Row" element of the second row in the state dataset (e.g., "3" in element [1][7] of SD 231 in FIG. 11).

In an embodiment, the executing instruction is comprised within the second row of the active process instance.

5.1. Example PROCESS Operation

In an embodiment, the PROCESS operation of an I/O processor can be invoked by an operation within the same I/O processor or by another computing system.

In an embodiment, the PROCESS operation receives one or more of: an input dataset, an instructions dataset, and a reference to a state dataset, wherein the referenced state dataset may be a nested dataset within a state dataset. In an embodiment, a PROCESS operation assigns a received input dataset to a first element within the referenced state dataset and assigns a received instructions dataset to a second element within the referenced state dataset.

In an embodiment, the PROCESS operation assigns an instructions dataset (e.g., instructions 45F0) received from a computing system (e.g., message broker 210) to a "Command Parameter 2" element within a second row of a state dataset (e.g., element [1][2] in SD 231 in FIG. 7).

In an embodiment, the PROCESS operation performs a first set of actions upon receipt of an input dataset, wherein the first set of actions comprises:

1.1) In an embodiment, the PROCESS operation performs a first action by assigning the input dataset received (e.g., messages 271) to a "Command Parameter 1" element within a second row of a state dataset (e.g., element [1][1] in SD 231 in FIG. 8);

1.2) In an embodiment, the PROCESS operation performs a second action by setting the value of a "Dataset Row" element within the second row of the state dataset (e.g., element [1][7] in SD 231 in FIG. 8) to the row index of the second row (e.g., 1);

1.3) In an embodiment, the PROCESS operation performs a third action by setting the value of a "Command ID" element within the second row of the state dataset (e.g., element [1][0] in SD 231 in FIG. 8) to an identifier of the "RUN" operation (e.g., "A311");

1.4) In an embodiment, the PROCESS operation performs a fourth action by invoking the RUN operation identified within the "Command ID" element of the second row (e.g., "A311" in element [1][0] in SD 231 in FIG. 8), wherein the RUN operation appends one or more rows to the state dataset representing a process instance; and 1.5) In an embodiment, the PROCESS operation performs a fifth action by repeating a second set of actions until all process instances appended to the state dataset by the RUN operation have been deleted by the PROCESS operation. In an embodiment, the second set of actions comprises:

2.1) In an embodiment, the PROCESS operation performs a first action by identifying the active process instance by referencing the "Dataset Row" element value within the second row of the state dataset that identifies the position of a second row of the active process instance within the state dataset.

2.2) In an embodiment, the PROCESS operation performs a second action by incrementing the value of the "Dataset Row" element within the first row of the active process instance (e.g., element [5][7] in SD 231 in FIG. 20), wherein the "Dataset Row" element can identify the active row within an input dataset within a process instance. The PROCESS operation further performs the second action by resetting the value of the "Dataset Row" element within a second row of the second process instance (e.g., element [5][7] in SD 231 in FIG. 20) to "1" when all instructions within the "Dataset" element within the second row (e.g., element [5][6] in SD 231 in FIG. 20) have been executed, wherein the "Dataset Row" can identify the active row within an instructions dataset within a process instance;

2.3) In an embodiment, the PROCESS operation performs a third action by deleting the rows from the state dataset that represents the active process instance (e.g., RI [4] and RI [5] within SD 231 in FIG. 20) after executing all instructions within an instructions dataset for all input within an input dataset, wherein the instructions dataset and the input dataset are associated with the active process instance. In an embodiment, the PROCESS operation deletes two rows from a state dataset that represent the active process instance when the "Dataset Row" element value within the first row of the active process (e.g., "2" in element [4][7] within SD 231 in FIG. 20) instance exceeds the number of rows within the input dataset associated with the "Dataset" element within the same row (e.g., input 2369 associated with element [4][6] within SD 231 in FIG. 20). In an embodiment, the PROCESS operation further performs the third action by setting the "Dataset Row" element within the second row of the state dataset (e.g., element [1][7] in SD 231 in FIG. 21) to the "Parent Row" element value of the first row of the active process instance being deleted (e.g., "3" in element [4][5] within SD 231 in FIG. 20). In an embodiment, the PROCESS operation further performs the third action by setting the "Dataset Row" element value within the second row of the state dataset (e.g., element [1][7] in SD 231 in FIG. 23) to "0" when all process instances within the state dataset are deleted;

2.4) In an embodiment, the PROCESS operation performs a fourth action by copying instruction element values contained within the active row of the instructions dataset within the active process instance (e.g., RI [1] within instructions 45F0 in FIG. 47) to elements within the second row of the active process instance (e.g., elements [3][0] through [3][4] within SD 231 in FIG. 10) that represent the executing instruction;

2.5) In an embodiment, the PROCESS operation performs a fifth action by incrementing the "Dataset Row" element value in the second row of the active process instance (e.g., "2" in element [3][7] in FIG. 12);

2.6) In an embodiment, the PROCESS operation performs a sixth action by setting the "Process Row" element value within the first row of the active process instance (e.g., element [2][4] of SD 231 in FIG. 11) based on the "Process Row" element value within the second row of the active process instance (e.g., "9D86" in element [3][4] of SD 231 in FIG. 11), wherein the "Process Row" element value within the second row identifies one of a plurality of process row types:
  (1) If the identified process row type matches a first identifier (e.g., "0EC0"), the PROCESS operation sets the "Process Row" element value of the first row of the active process instance to the row index of the second row in the state dataset (e.g., "1" in SD 231 in FIG. 11);
  (2) If the identified process row type matches a second identifier (e.g., "9D86"), the PROCESS operation sets the "Process Row" element value of the first row of the active process instance to the row index of the first row within the active process instance (e.g., "2" in SD 231 in FIG. 11);
  (3) If the identified process row type matches a third identifier (e.g., "EA8E"), the PROCESS operation sets the "Process Row" element value of the first row of the active process instance to the "Parent Row" element value of the first row within the active process instance (e.g., "1" in element [2][5] in SD 231 in FIG. 11); and
  (4) If the identified process row type matches a fourth identifier (e.g., "7756"), the PROCESS operation sets the "Process Row" element value of the first row within the active process instance to the "Process Row" element value (e.g., " " in element [1][4] within SD 231 in FIG. 11) of the row identified by the row index (e.g., "1" in element [2][5] within SD 231 in FIG. 11) in the "Parent Row" element of the first row within the active process instance; and 2.7) In an embodiment, the PROCESS operation performs a seventh action by invoking the operation (e.g., SET) identified within the executing instruction. In an embodiment, the PROCESS operation invokes the operation identified within the "Command ID" element within the second row of the active process instance (e.g., "B4DA" in element [3][0] within SD 231 in FIG. 11). In an embodiment, the PROCESS operation invokes itself when the "Command ID" element value within the executing instruction represents the PROCESS operation (e.g., "F74E"), wherein the "Command Parameter 1" element value within the executing instruction represents an input dataset received by the PROCESS operation, the "Command Parameter 2" element value within the executing instruction represents an instructions dataset received by the PROCESS operation, and the "Command Parameter 3" element value within the executing instruction represents a reference to a state dataset received by the PROCESS operation.

5.2. Example RUN Operation

In an embodiment, the RUN operation of an I/O processor appends one or more rows to a state dataset to represent a process instance, wherein the process instance comprises an input dataset and an instructions dataset.

In an embodiment, the RUN operation performs a set of actions, wherein the set of actions comprises:
1) In an embodiment, the RUN operation performs a first action by appending 2 rows to a state dataset that together represent a new process instance (e.g., RI [4] and RI [5] within SD 231 in FIG. 17).
2) In an embodiment, the RUN operation performs a second action by setting the "Parent Row" element value within the first row of the new process instance (e.g., element [4][5] within SD 231) to the row index (e.g., "3") of the second row (e.g., RI [3]) within the active process instance within the state dataset that invoked the RUN operation, as illustrated in FIG. 17.
3) In an embodiment, the RUN operation performs a third action by setting the "Dataset" element value within the first row of the new process instance (e.g., element [4][6] of SD 231) to the "Command Parameter 1" element value of the executing instruction (e.g., nested input 67EC in element [3][1] within SD 231), as illustrated in FIG. 17.
4) In an embodiment, the RUN operation performs a fourth action by setting the "Parent Row" element value within the second row of the new process instance (e.g., element [5][5] within SD 231) to the row index (e.g., "4") of the first row (RI [4]) of the new process instance within the state dataset, as illustrated in FIG. 17.
5) In an embodiment, the RUN operation performs a fifth action by setting the value of the "Dataset" element within the second row of the new process instance (e.g., element [5][6] within SD 231) to the "Command Parameter 2" element value of the executing instruction (e.g., nested instructions 67EC in element [3][2] within SD 231), as illustrated in FIG. 17.
6) In an embodiment, the RUN operation performs a sixth action by setting the value of the "Dataset Row" element within the first and second rows of the new process instance (e.g., elements [4][7] and [5][7] of SD 231) to "1", as illustrated in FIG. 17.
7) In an embodiment, the RUN operation performs a seventh action by setting the "Dataset Row" element value of the second row in the state dataset (e.g., element [1][7] within SD 231) to the row index (e.g., "5") of the second row (RI [5]) of the new process instance, wherein the seventh action designates the new process instance as the active process instance, as illustrated in FIG. 17.

5.3. Example COMPUTE Operation

In an embodiment, the COMPUTE operation of an I/O processor copies element values within a first row of the active process instance (e.g., elements [2][0], [2][1], [2][2], and [2][3] in SD 231 in FIG. 16) to the same elements within a second row of the active process instance that represent an instruction (e.g., elements [3][0], [3][1], [3][2], and [3][3] in SD 231 in FIG. 17). The COMPUTE operation invokes the operation identified in the "Command ID" element within the second row (e.g., RUN) of the active process instance to execute the instruction, as illustrated in FIG. 17.

5.4. Example FIND Operation

In an embodiment, the FIND operation of an I/O processor computes a value comprising an array of row indices within a state dataset, where each row identified in the array comprises element values that satisfy one or more conditions within a conditions dataset (e.g., conditions AA7B in FIG. 58).

In an embodiment, the FIND operation sets an element value within the state dataset to the computed value.

In an embodiment, a condition can comprise the element value that is set to the computed value from a previous execution of the FIND operation.

In an embodiment, a condition is represented by element values within a row of a conditions dataset (e.g., conditions AA7B in FIG. 58).

Figure 46:
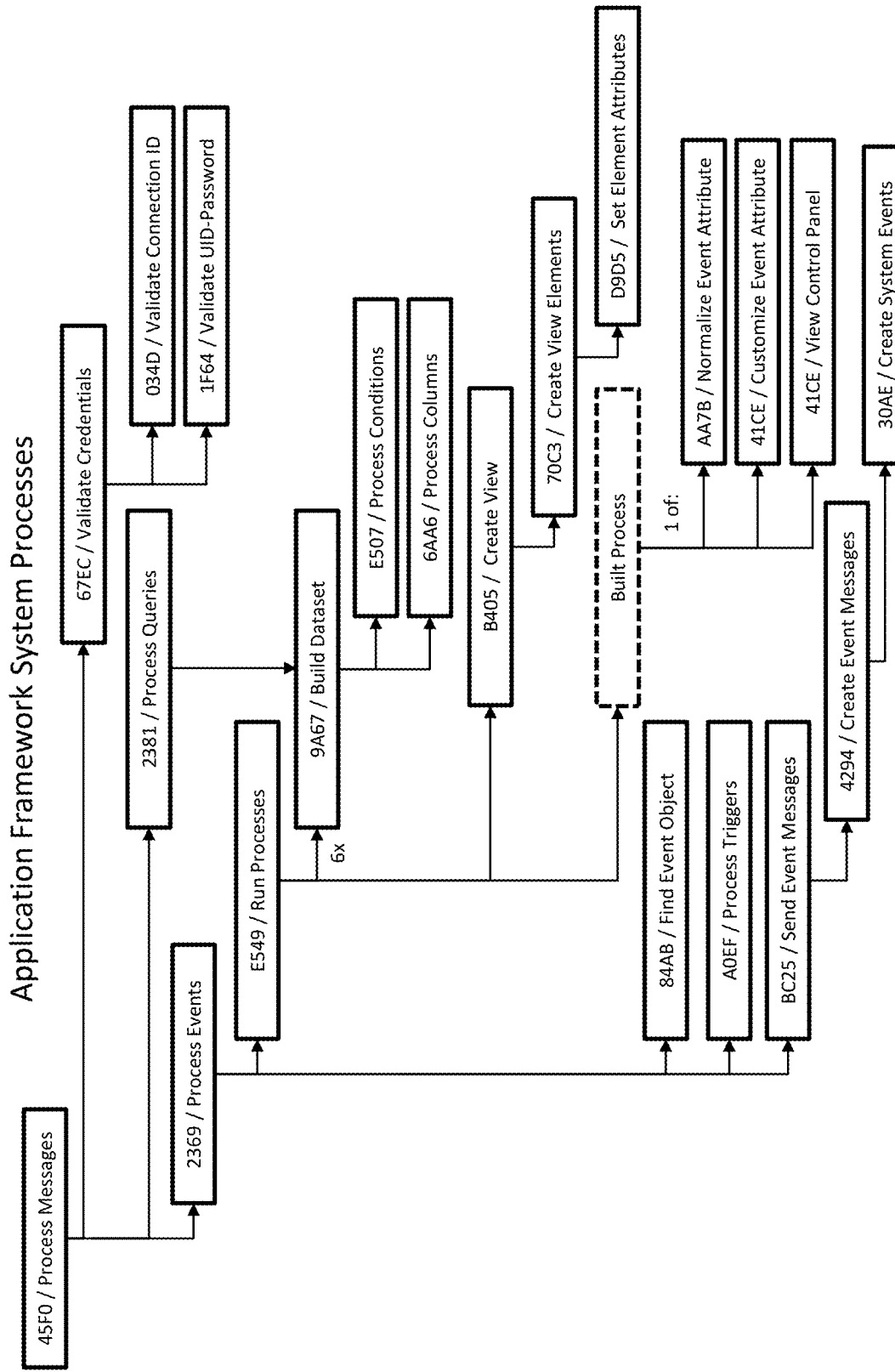

In an embodiment, a conditions dataset may be derived from element values in one or more rows within the state dataset (e.g., RI [30] and RI [31] within SD 231 in FIG. 28) that represent one or more conditions of a process (e.g., "Normalize Event Attribute" process in FIG. 46).

In an embodiment, a conditions dataset may be derived from element values in one or more rows within a query conditions dataset within a queries dataset (e.g., conditions 7FB7 within input E549B in FIG. 57).

In an embodiment, the FIND operation sets the "Command Parameter 1" element value within the first row of the active process instance (e.g., element [4][4] within SD 231) to the computed value (e.g., "6") based on a conditions dataset assigned to the "Command Parameter 1" element (e.g., element [5][4] within SD 231) within the executing instruction of the active process instance, as illustrated in FIG. 19.

In an embodiment, the FIND operation clears the "Command Parameter 1" element value within the first row of the active process instance when no rows within the state dataset meet all conditions within the conditions dataset.

In an embodiment, the FIND operation invokes the "GET" operation to retrieve one or more element values within the state dataset, wherein each retrieved value represents an operand in a comparison of values defined within a condition. In an embodiment, one or more element values within a condition each comprise an identifier of a column within the state dataset, wherein the "GET" operation utilizes each column identifier to derive a column index of an element value to retrieve.

5.5. Example GET Operation

In an embodiment, the GET operation of an I/O processor sets a first element value within a process instance within a state dataset to a second element value within a source dataset, wherein the second element is referenced within the source dataset by a derived column index from a column identifier and a derived row index, wherein the source dataset is the state dataset or an input dataset referenced within the state dataset.

In an embodiment, when the "Command Parameter 1" element value within the executing instruction is populated, the source dataset is the state dataset, the column identifier is the "Command Parameter 1" element value, and the derived row index is the "Process Row" element value within the first row of the active process instance.

In an embodiment, when the "Command Parameter 2" element value within the executing instruction is populated, the source dataset is the input dataset assigned to the "Dataset" element within a source row, the column identifier is the "Command Parameter 2" element value, and the derived row index is the "Dataset Row" element value within the source row, wherein the source row is identified by the row index within the "Process Row" element within the first row of the active process instance.

In an embodiment, the derived column index is derived from the index position of a unique identifier within a first row of the source dataset that matches the column identifier.

In an embodiment, the GET operation sets the "Command Parameter 1" element value within the first row of the active process instance to an element value referenced by the derived column and row indices within the source dataset.

In an embodiment, the GET operation clears the "Command Parameter 1" element value within the first row of the active process instance when an element referenced by the derived column and row indices does not exist within the source dataset.

5.6. Example SET Operation

In an embodiment, the SET operation of an I/O processor sets a first element value within a destination dataset to a second element value within a process instance within a state dataset, wherein the first element is referenced within the destination dataset by a derived column index from a column identifier and a derived row index, wherein the destination dataset is the state dataset or an input dataset referenced within the state dataset.

In an embodiment, when the "Command Parameter 1" element value within the executing instruction is populated (e.g., "C35D" in element [3][1] within SD 231), the destination dataset is the state dataset, the column identifier is the "Command Parameter 1" element value, and the derived row index is the "Process Row" element value within the first row of the active process instance (e.g., "2" in element [2][4] of SD 231), as illustrated in FIG. 11.

In an embodiment, when the "Command Parameter 2" element value within the executing instruction is populated (e.g., "6111" in element [22][2] within SD 231), the destination dataset is the input dataset assigned to the "Dataset" element within a destination row (e.g., events 263A in element [22][6] within SD 231), the column identifier is the "Command Parameter 2" element value, and the derived row index is the "Dataset Row" element value within the destination row (e.g., "22" in element [22][7] within SD 231), wherein the destination row is identified by the row index within the "Process Row" element within the first row of the active process instance (e.g., "22" in element [22][4] within SD 231), as illustrated in FIG. 32.

In an embodiment, when the destination dataset comprises no elements (e.g., empty string), the SET operation adds an element to the destination dataset and sets the new element value to the column identifier, wherein the new element is within a first column and first row of the destination dataset.

In an embodiment, the derived column index is derived from the index position (e.g., 0) of a unique identifier within a first row of the destination dataset (e.g., "C35D" in element [0][0] within SD 231 in FIG. 11) that matches the column identifier (e.g., "C35D").

In an embodiment, when no unique identifier within a first row of the destination dataset matches the column identifier, the SET operation appends a column to the destination dataset (e.g., CI [10] within SD 231), sets the unique identifier in the first row of the new column to the column identifier (e.g., "6842" in element [0][10] in SD 231), and sets the derived column index to the column index of the new column (e.g., 10), as illustrated in FIG. 19.

In an embodiment, when the derived row index is derived from a dataset element that is not populated (i.e., empty string), the SET operation appends a row to the destination dataset (e.g., RI [6] within SD 231) and sets both the "Process Row" element value of the first row within the active process instance (element [4][4] in SD 231) and the derived row index to the row index of the new row (e.g., 6), as illustrated in FIG. 19.

In an embodiment, the SET operation sets an element value referenced by the derived column and row indices within the destination dataset (e.g., element [6][10] within SD 231) to the "Command Parameter 3" element value within the executing instruction (e.g., "Con 1" in element [5][3] of SD 231), as illustrated in FIG. 19.

5.7. Example OUTPUT Operation

In an embodiment, the OUTPUT operation of an I/O processor outputs an output dataset (e.g., messages 261) to a computing system (e.g. message broker 210). In an embodiment, the contents of the output dataset are represented by element values within a state dataset (e.g., SD 231). In an embodiment, the contents of the output dataset are derived from the "Command Parameter 1" element within the executing instruction (e.g., messages 261 referenced in element [29][1] within SD 231 in FIG. 34).

6. Example Embodiment of a State Dataset

The following description illustrates non-limiting embodiments of a state dataset (SD). FIG. 3 illustrates the relationships between an SD 231 and an IOP 281, according to an embodiment.

In an embodiment, a state dataset represents a two-dimensional structure having one or more rows and a plurality of columns.

In an embodiment, a state dataset initially comprises the elements that are referenceable by a I/O processor, as illustrated in FIG. 5.

In an embodiment, the state dataset initially comprises 8 defined columns, as illustrated in Table 11. Each of the defined columns are referenceable by a I/O processor, as illustrated by the JavaScript functions in FIG. 43.

TABLE 11

| CI | Name |
|---|---|
| 0 | Command ID ("opcode") |
| 1 | Command Parameter 1 |
| 2 | Command Parameter 2 |
| 3 | Command Parameter 3 |
| 4 | Process Row |
| 5 | Parent Row |
| 6 | Dataset |
| 7 | Dataset Row |

Figure 9:
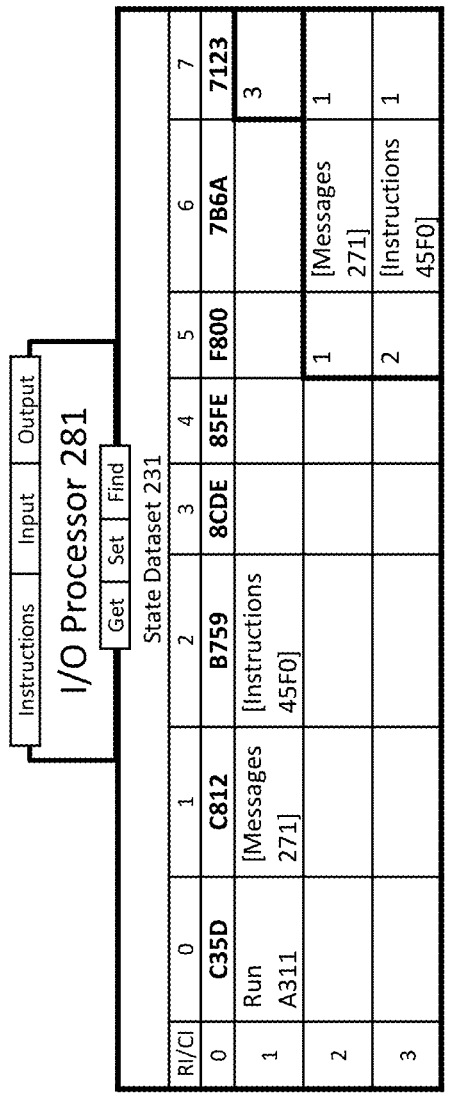

In an embodiment, an element value within the "Command ID" column of a state dataset represents the code of an operation to be performed by an I/O processor (e.g., "A311" in element [1][0] in SD 231 in FIG. 9).

In an embodiment, defined values for the Command ID element are illustrated in FIG. 44.

In an embodiment, element values within the "Command Parameter 1", "Command Parameter 2", "Command Parameter 3", and "Process Row" columns of a state dataset comprise one or more command parameters specific to the operation identified in the "Command ID" column for a row in the state dataset, as illustrated in elements [3][1], [3][2], [3][3], and [3][4] in SD 231 in FIG. 10.

In an embodiment, an instruction processed by an I/O processor comprises element values within the "Command ID", "Command Parameter 1", "Command Parameter 2", "Command Parameter 3", and "Process Row" columns of a row, as illustrated in elements [3][0], [3][1], [3][2], [3], and [3][4] in SD 231 in FIG. 10.

In an embodiment, a process instance comprises two rows appended to a state dataset, as illustrated in RI [4] and RI [5] in SD 231 in FIG. 17.

In an embodiment, an element value within the "Parent Row" column of the first appended row of a process instance (e.g., "2" in element [4][5] in SD 231 in FIG. 17) comprises the row index of the second row of the parent process instance (e.g. RI [2]).

In an embodiment, an element value within the "Parent Row" column of the second appended row of a process instance (e.g., "4" in element [5][5] in SD 231 in FIG. 17) comprises the row index of the first row of the process instance (e.g. RI [4]).

In an embodiment, an element value within the "Dataset" column of the first appended row of a process instance comprises a nested input dataset, (e.g., input 67EC), as illustrated in element [4][6] in SD 231 in FIG. 17.

In an embodiment, an element value within the "Dataset" column of the second appended row of a process instance comprises a nested instructions dataset (e.g., instructions 67EC), as illustrated in element [5][6] in SD 231 in FIG. 17.

In an embodiment, an element value within the "Dataset Row" column (e.g., "4" in element [3][7] in SD 231 in FIG. 17) comprises a row index associated with the "Dataset" element value of the same row (e.g., element [3][6] in SD 231 in FIG. 17), wherein the "Dataset" element value comprises a nested dataset (e.g., instructions 45F0).

In an embodiment, a first row in a state dataset is reserved for unique identifiers of columns, as illustrated in RI [0] in SD 231 in FIG. 5.

In an embodiment, a second row in the state dataset is reserved for processing parameters as illustrated in RI [1] in SD 231 in FIG. 5.

In an embodiment, the initial processing parameters comprise an identifier of a command within the "Command ID" element (e.g., element [1][0]), an input dataset within the "Command Parameter 1" element (e.g., element [1][1]), an instructions dataset within the "Command Parameter 2" element (e.g., element [1][2]), and the row index of the executing instruction within the "Dataset Row" element (e.g., element [1][7]) as illustrated in FIG. 8.

In an embodiment, a device is provisioned with an initial state dataset that comprises two rows and ten columns, wherein the first row comprises a unique identifier for each column, as illustrated in SD 231 in FIG. 6.

In an embodiment, a I/O processor assigns an input dataset (e.g., messages 271) received from a computing system (e.g., message broker 210) to the "Command Parameter 2" element within the second row of the state dataset (e.g., element [1][1] in SD 231 in FIG. 8), and invokes the command (e.g., RUN) identified within the "Command Parameter 1" element of the same row.

In an embodiment, rows and columns are appended to a state dataset by a I/O processor, as illustrated in FIG. 19.

In an embodiment, the state dataset may comprise one or more nested state datasets wherein each of the nested state datasets represents a computing state of one or more connected computing systems, wherein a computing system may comprise one or more applications.

In an embodiment, within a state dataset, each column represents an attribute, each row represents an object of an object class, and each element value represents an attribute value of an object.

In an embodiment, an attribute value within a state dataset may be set to an array with two elements, wherein the first and second elements of the array are set from the "Timestamp" and "Value" element values from an event within an events dataset.

7. Example Utility

An implementation of a sample utility which utilizes an embodiment of the disclosed metadata-driven computing system for unified commerce, edge computing, and the internet of things will now be described.

FIGS. 6-30 illustrate the creation and provisioning of a state dataset with properties from connected systems, including a display system, a sensor/actuator system, and an application and digital twin system managed by a remote I/O processor, according to at least one embodiment.

As illustrated in FIG. 6, an initial SD 231 comprises two rows and ten columns, wherein the first row comprises a unique identifier for each column.

As illustrated in FIG. 7, IOP 281 receives a first instructions dataset (instructions 45F0) that it copies into the "Command Parameter 2" element (CI [2]) within the second row (RI [1]) of SD 231, wherein the first instructions dataset represents an application framework.

As illustrated in FIG. 8, IOP 281 receives a first input dataset (messages 271) that it copies into the "Command Parameter 1" element (CI [1]) within the second row (RI [1]) of SD 231 (element [1][1]).

As illustrated in FIG. 9, IOP 281 further processes the first input dataset by executing the first instruction represented by the "Command ID" element value (A311), the "Command Parameter 1" element value (nested messages 271) and the "Command Parameter 2" element value (nested instructions 45F0) in the second row of SD 231.

As illustrated in FIG. 9, IOP 281 executes the first instruction by appending two rows to SD 231 that represent a first process instance (RI [2] and RI [3] of SD 231). IOP 281 sets the value of the "Parent Row" element within the first row of the process instance (element [2][5] of SD 231) to the row index of the executing instruction (1) that is maintained in the "Dataset Row" element of the second row (element [1][7] of SD 231). IOP 281 sets the value of the "Parent Row" element within the second row of the process instance (element [3][5] of SD 231) to the row index of the first row of the process instance (2). IOP 281 sets the value of the "Dataset Row" element of the second row (element [1][7] of SD 231) to the row index ("3") of the second row of the process instance.

As illustrated in FIG. 9, IOP 281 further executes the first instruction by setting the value of the "Dataset" element within the first row of the process instance (element [2][6] of SD 231) to the "Command Parameter 1" element value of the executing instruction (nested messages 271). IOP 281 sets the value of the "Dataset" element within the second row of the process instance (element [3][6] of SD 231) to the "Command Parameter 2" element value of the executing instruction (nested instructions 45F0). IOP 281 sets the value of the "Dataset Row" element within the first and second rows of the process instance (elements [2][7] and [3][7] of SD 231) to 1.

As illustrated in FIG. 10, IOP 281 copies the values of the instruction elements contained within the second row of the nested instructions 45F0 (RI [1] in FIG. 47) to the second row of the process instance (elements [3][0] through [3][4] of SD 231).

As illustrated in FIG. 11, IOP 281 executes the instruction in the second row (RI [3]) of the process instance (i.e., the second instruction) by setting the "Process Row" element value of the first row of the process instance (element [2][4] of SD 231) to the "Parent Row" element value of the second row of the process instance ("2" in element [3][5] of SD 231). IOP 281 derives the column index (0) of the unique identifier ("C35D") in the first row of SD 231 that matches the "Command Parameter 1" element value ("C35D") of the executing instruction. IOP 281 derives a row index from the "Process Row" element value of the first row of the process instance ("2" in element [2][4] of SD 231). IOP 281 sets the element value referenced by the derived column and row indices (element [2][0] of SD 231) to the "Command Parameter 3" element value in the executing instruction ("A311" in element [3][3] of SD 231).

As illustrated in FIG. 12, IOP 281 increments the "Dataset Row" element value in the second row of the process instance ("2" in element [3][7]). IOP 281 copies the values of the instruction elements contained within the third row of the nested instructions 45F0 (RI [2] in FIG. 47) to the second row of the process instance (elements [3][0] through [3][4] of SD 231), wherein the value of the "Command Parameter 3" element of the instruction (element [2][3] in instructions 45F0) comprises an input dataset (input 67EC).

As illustrated in FIG. 13, IOP 281 executes the instruction in the second row of the process instance (i.e., the third instruction) in a manner similar to the execution of the second instruction.

As illustrated in FIGS. 14 and 15, IOP 281 copies and executes a fourth instruction from the fourth row of the nested instructions 45F0 (RI [3] in FIG. 47) in a manner similar to the copying and execution of the third instruction, wherein the value of the "Command Parameter 3" element of the fourth instruction (element [3][3] in instructions 45F0) comprises an instructions dataset (instructions 67EC).

As illustrated in FIG. 16, IOP 281 copies a fifth instruction from the fifth row of the nested instructions 45F0 (RI [4] in FIG. 47) in a manner similar to the copying of the fourth instruction.

As illustrated in FIG. 17, IOP 281 executes the instruction in the second row of the process instance by copying element values within the first row of the process instance (elements [2][0], [2][1], [2][2], and [2][3] in SD 231) to the same elements within the second row of the process instance that represent an instruction (elements [3][0], [3][1], [3][2], and [3][3] in SD 231). IOP 281 executes the copied instruction in the second row of the process instance in a manner similar to executing the first instruction.

IOP 281 copies and executes the remaining instructions of the nested instructions 45F0 (RI [5] through RI [10] in FIG. 47) in a manner similar to the copying and execution of the previous instructions. During the execution of one or more instructions, IOP 281 appends rows to SD 231 representing process instances of other processes illustrated in FIG. 46, including processes 2381, 2369, and E549, wherein an instruction (RI [3] in FIG. 48) within the instructions dataset (instructions 2369 in FIG. 48) of the parent process (process 2369 in FIG. 46) comprises the instructions dataset (instructions E549 in FIG. 49) of a subprocess (process E549 in FIG. 46).

Figure 18:
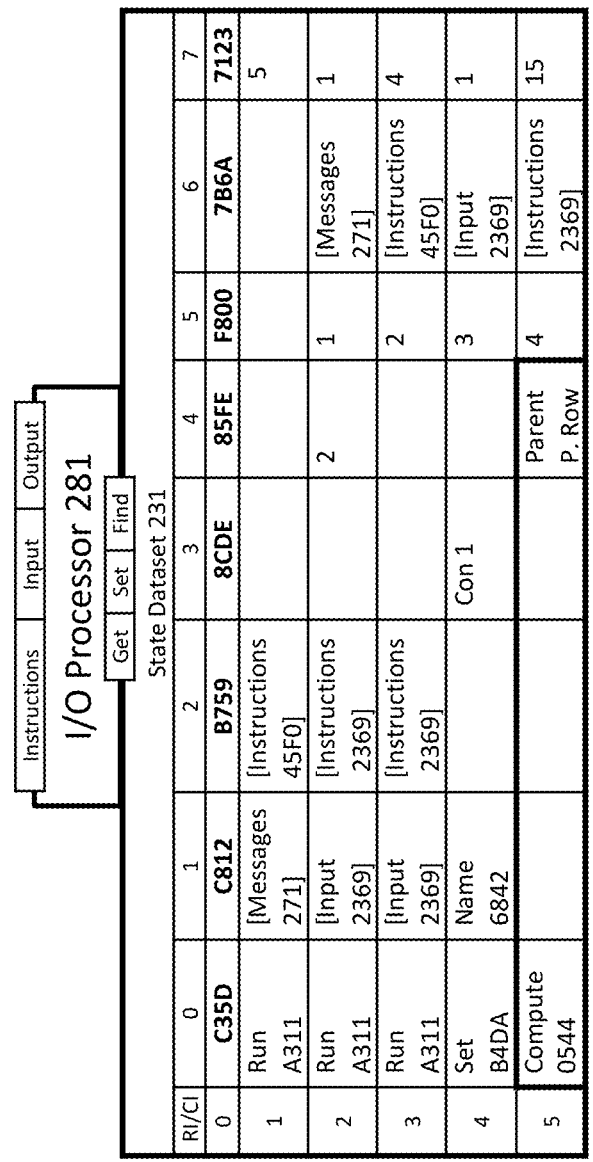

FIG. 18 illustrates a computing state of the metadata-driven computing system, wherein IOP 281 is executing the fifteenth instruction within an instructions dataset (RI [15] in instructions 2369 in FIG. 48).

As illustrated in FIG. 19, IOP 281 executes the fifteenth instruction by appending a row (RI [6]) to SD 231 representing a new object, appending a column (CI [10]) representing a new attribute, copying the "Command Parameter 1" element value in the second row of the process instance ("6842" in element [5][1] in SD 231) to the first row of the appended column (element [0][10] in SD 231) and copying the "Command Parameter 3" element value in the second row of the process instance ("Con 1" in element [5][3] in SD 231) to the element within the appended row and column (element [6][10] in SD 231), wherein the new attribute can be identified by the value of the element of the first row of the appended column ("6842" in element [0][10] in SD 231).

Figure 20:
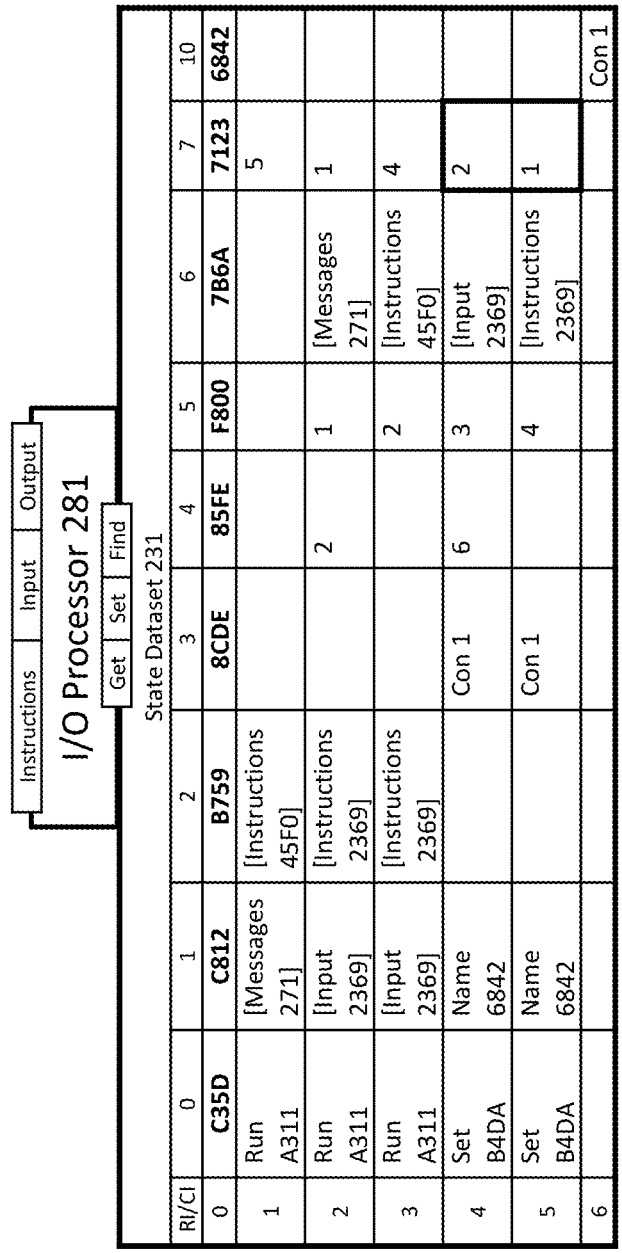

As illustrated in FIG. 20, IOP 281 resets the value of the "Dataset Row" element within the second row of the second process instance (element [5][7] in SD 231) to 1 when all instructions within the "Dataset" element within the same row (element [5][6] in SD 231) have been executed. Additionally, IOP 281 increments the value of the "Dataset Row" element within the first row of the second process instance.

Figure 21:
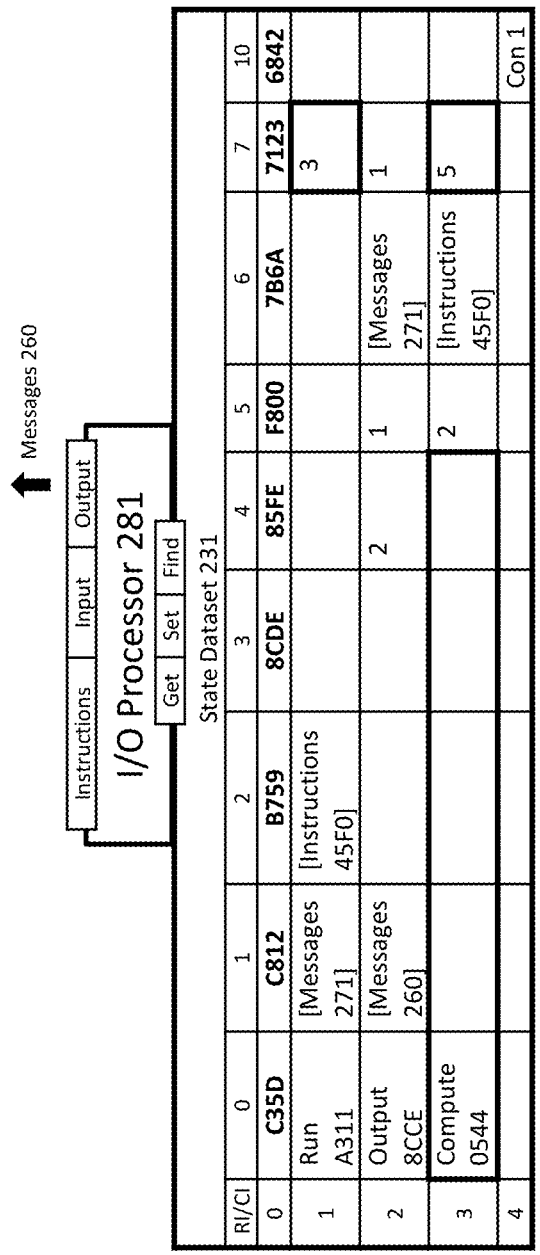

As illustrated in FIG. 21, IOP 281 deletes the two rows representing the second process instance when the value of the "Dataset Row" element within the first row of the second process instance exceeds the number of rows within the "Dataset" element within the same row. IOP 281 sets the value of the "Dataset Row" element of the second row (element [1][7] of SD 231) to the row index of the second row of the first process instance (3). Additionally, IOP 281 executes the fifth and last instruction in the instructions dataset within the "Dataset" element of the second row of the first process instance. The instruction execution outputs a messages dataset (messages 260).

As illustrated in FIG. 22, IOP 281 updates the "Dataset Row" element values in the first and second row of the first process instance.

As illustrated in FIG. 23, IOP 281 deletes both rows representing the first process instance in a manner similar to the deletion of the second process instance.

As illustrated in FIG. 24, MB 210 receives messages 271 from MB 210, wherein the "Address" element of the message identifies IOP 281 and the "Payload" element of the message within messages 271 comprises an events dataset (events 271A). MB 210 converts the message in the messages dataset to a serialized array of arrays to send to IOP 281 for processing. IOP 281 processes the serialized array of arrays as an input dataset in a manner previously described in this example utility.

As further illustrated in FIG. 24, IOP 281 processing the input dataset comprises:
1) executing the instructions within instructions 45F0 illustrated in FIG. 47 that are associated with a "Process Messages" process, wherein the execution of the instructions creates additional process instances within SD 231 that are associated with a "Validate Credentials" process, a "Process Queries" process, and a "Process Events" process as illustrated in FIG. 46;
2) executing the instructions within instructions 2369 in FIG. 48 that are associated with the "Process Events" process, wherein the operations within the instructions comprise:
   A) appending a row (RI [2]) to SD 231 in FIG. 24 representing a new object, wherein the object is identified by the value of the "Object" element ("FC1F" in element [1][2]) of the event within events 271A;
   B) setting the "ID" attribute value of the new object (element [2][8] in SD 231 in FIG. 24) to the value of the "Object" element ("FC1F" in element [1][2]) of the event;
   C) setting the "Class" attribute value of the new object (element [2][9] in SD 231 in FIG. 24) to the value of the "Class" element ("FC1F" in element [1][1]) of the event;
   D) appending a column (CI [10]) to SD 231 in FIG. 24 representing a new attribute, wherein the attribute is identified by the value of the "Attribute" element ("6842" in element [1][3]) of the event within events 271A;
   E) setting the element value within the first row of the appended column (element [0][10] in SD 231 in FIG. 24) to the value of the "Attribute" element ("6842" in element [1][3]) of the event within events 271A; and
   F) setting the "Name" attribute value of the new object (element [2][10] in SD 231 in FIG. 24) to the value of the "Value" element ("Con 1" in element [1][4]) of the event within events 271A.

Figure 25:
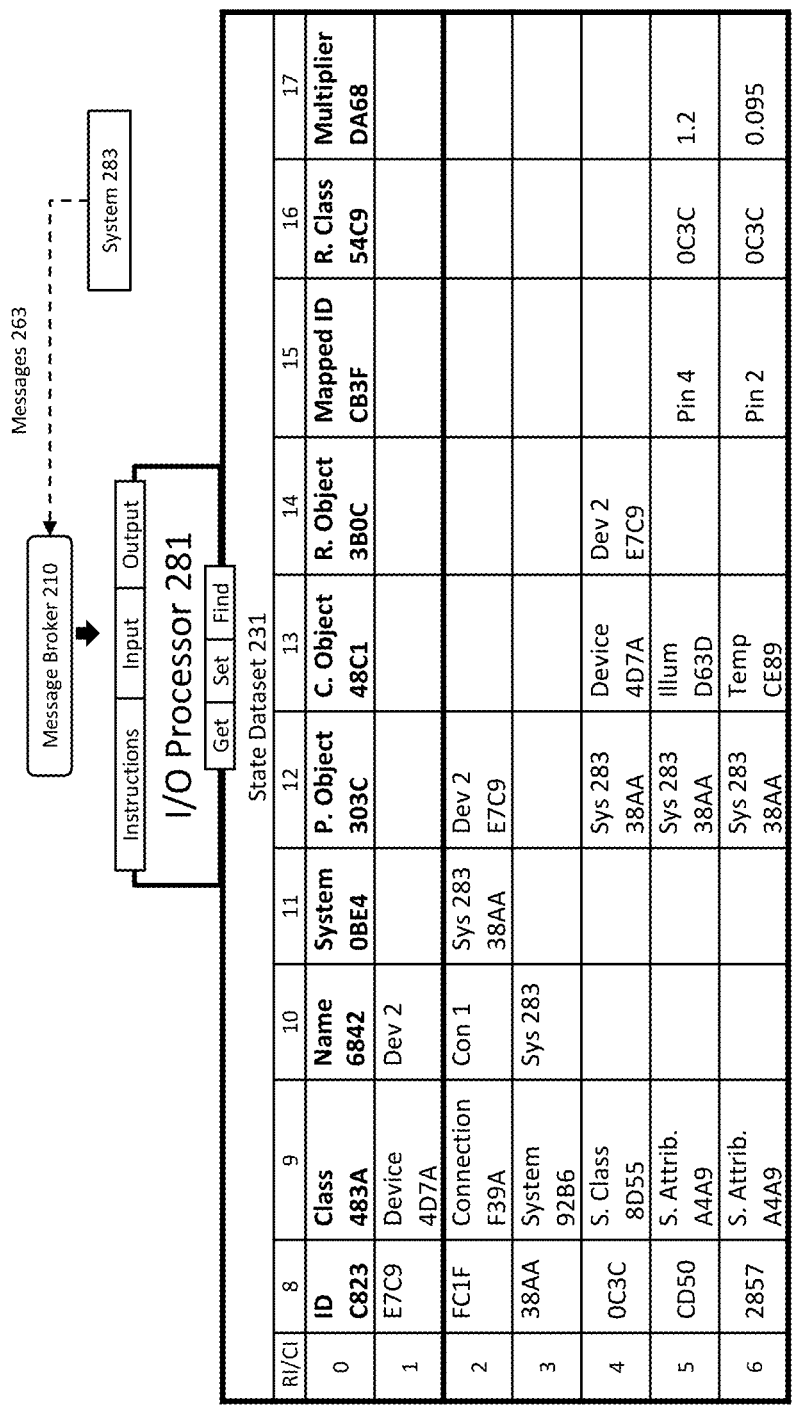

As illustrated in FIG. 25, MB 210 sends messages 263 received from system 283 to IOP 281 for processing, wherein the payload of the message within messages 263 comprises an events dataset. IOP 281 processes messages 263, as an input dataset, by appending rows and columns within SD 231 and setting element values within the appended rows and columns to element values within the events dataset within messages 263, wherein each appended row represents an object, each appended column represents an attribute of an object class, wherein the classes of objects within the appended rows include "Connection", "System", "System Class" and "System Attributes", wherein the appended objects represent a model of system 283 which comprises a sensor and an actuator, each assigned to a port pin within a microcontroller.

Figure 26:
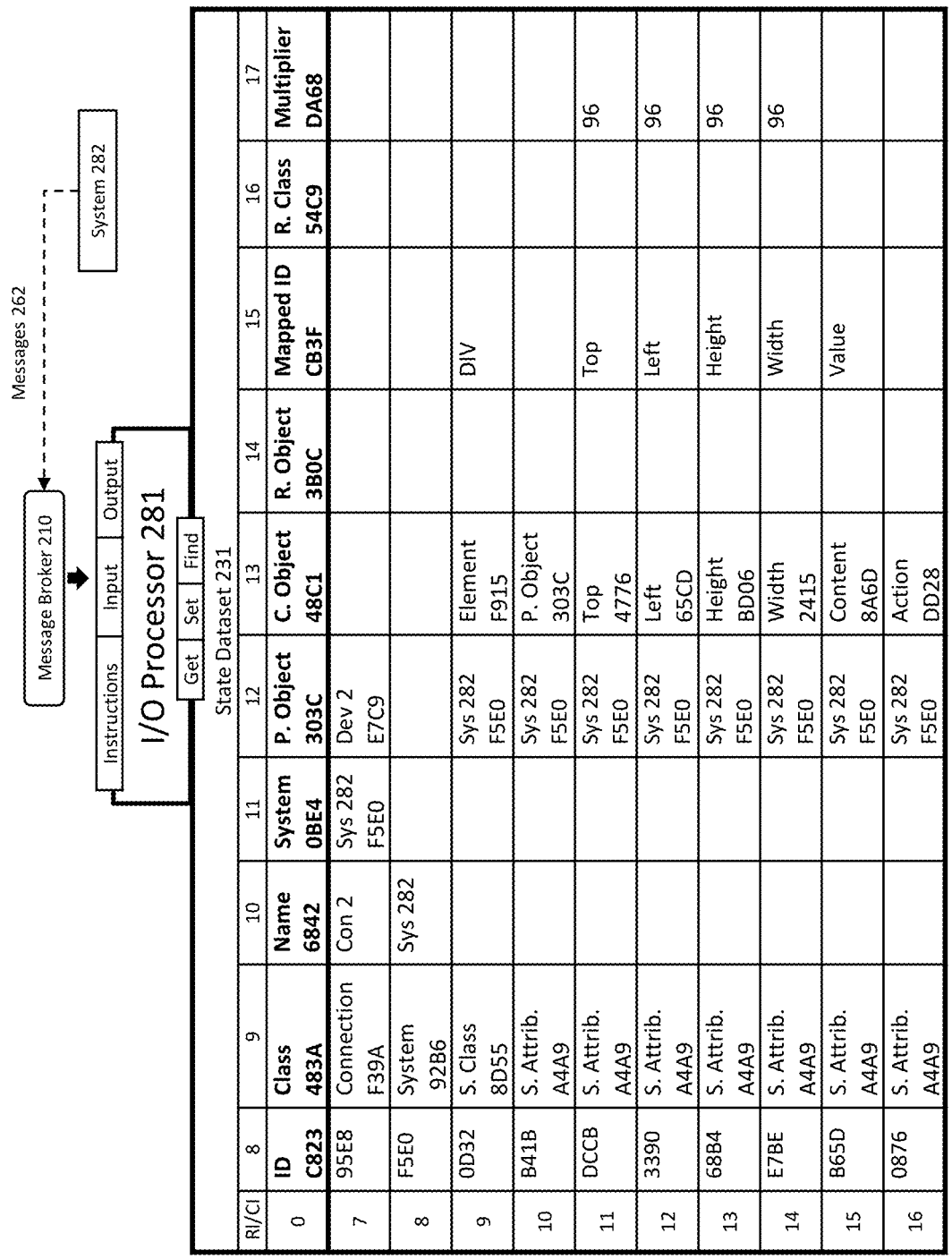

As illustrated in FIG. 26, MB 210 sends messages 262 received from system 282 to IOP 281 for processing, wherein the payload of the message within messages 262 comprises an events dataset. IOP 281 processes messages 262, as an input dataset, by appending rows and columns within SD 231 and setting element values within SD 231 to element values within the events dataset within messages 262, wherein each appended row represents an object, each appended column represents an attribute of an object class, wherein the classes of objects within the appended rows include "Connection", "System", "System Class" and "System Attributes", wherein the appended objects represent a model of system 282 which comprises an HTML document object model.

Figure 27:
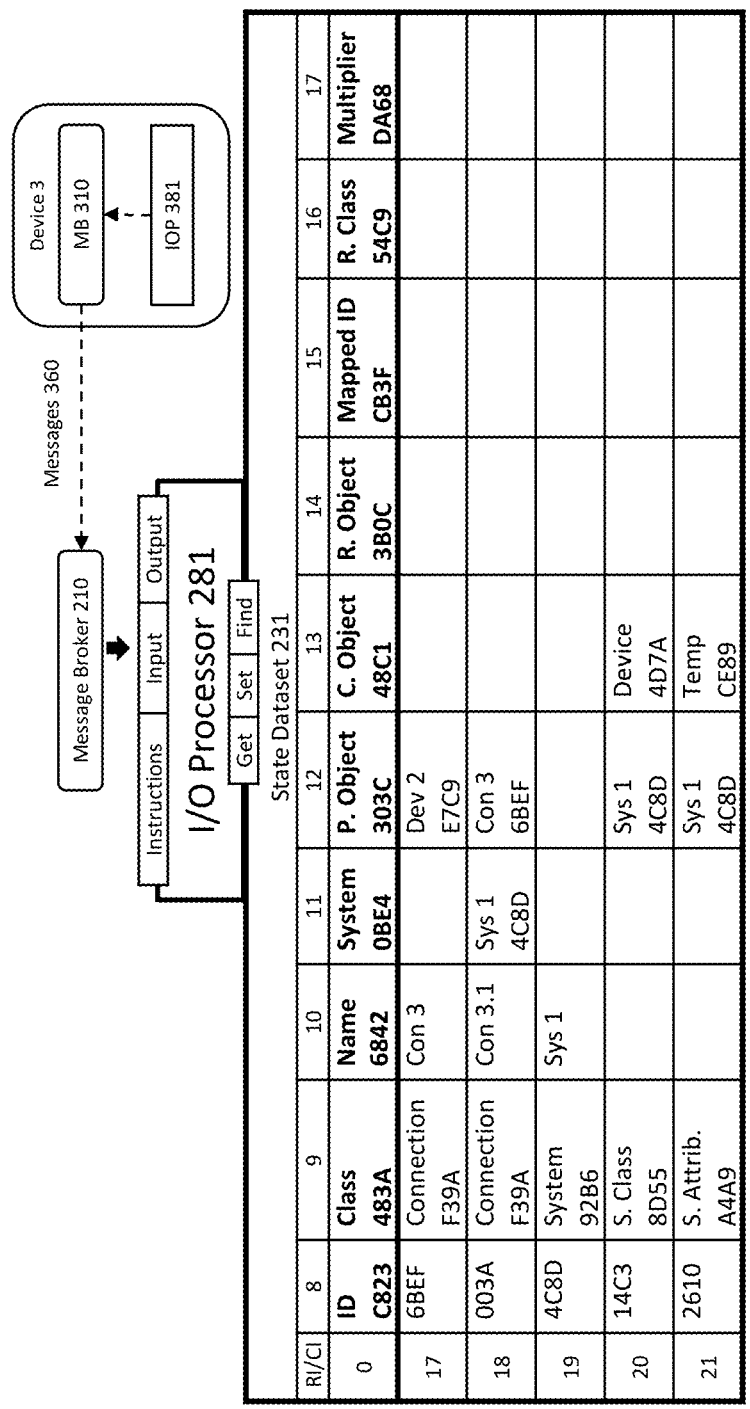

As illustrated in FIG. 27, MB 210 sends messages 360 received from IOP 381 through MB 310 on device 3 to IOP 281 for processing, wherein the payload of a first message and a second message within messages 360 each comprises an events dataset. IOP 281 processes messages 360, as an input dataset, by appending rows and columns within SD 231 and setting element values within SD 231 to element values within the events dataset of the first message within messages 360, wherein each appended row represents an object, each appended column represents an attribute of an object class, wherein the classes of objects within the appended rows include "Connection", "System", "System Class" and "System Attributes", wherein the appended objects represent a model of a first system ("Sys 1") that is managed by IOP 381, wherein the modeled system represents a digital twin of a device with "temperature" and "illumination" attributes. A first appended Connection object (RI [18] in SD 231 in FIG. 27 and FIG. 30) represents a connection between IOP 281 and IOP 381 through a connection between IOP 281 and device 3 which is represented by a second appended Connection object (RI [17] in SD 231 in FIG. 27 and FIG. 30). The first appended Connection object enables the exchange of information related to the first system.

Figure 28:
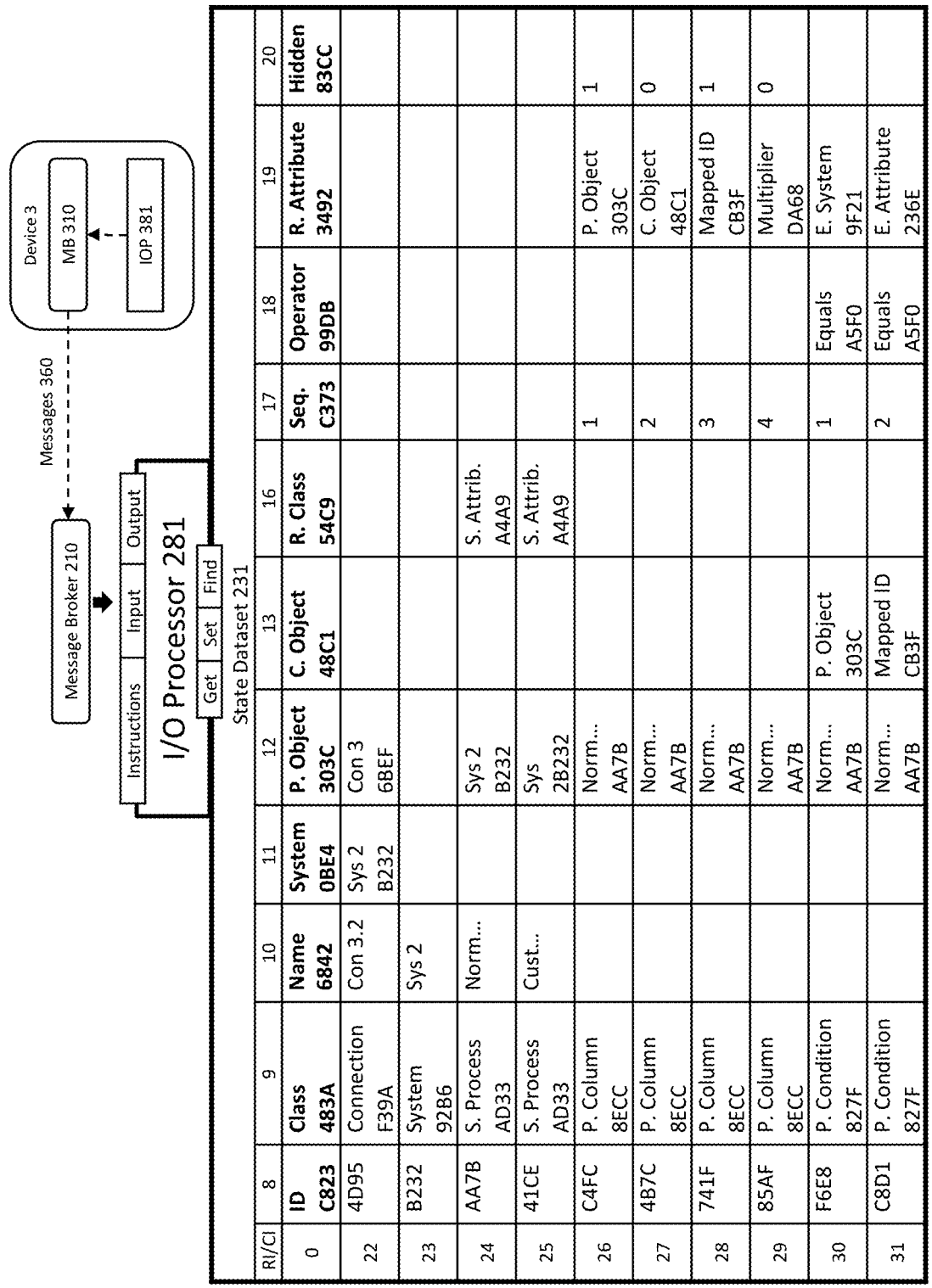
Figure 29:
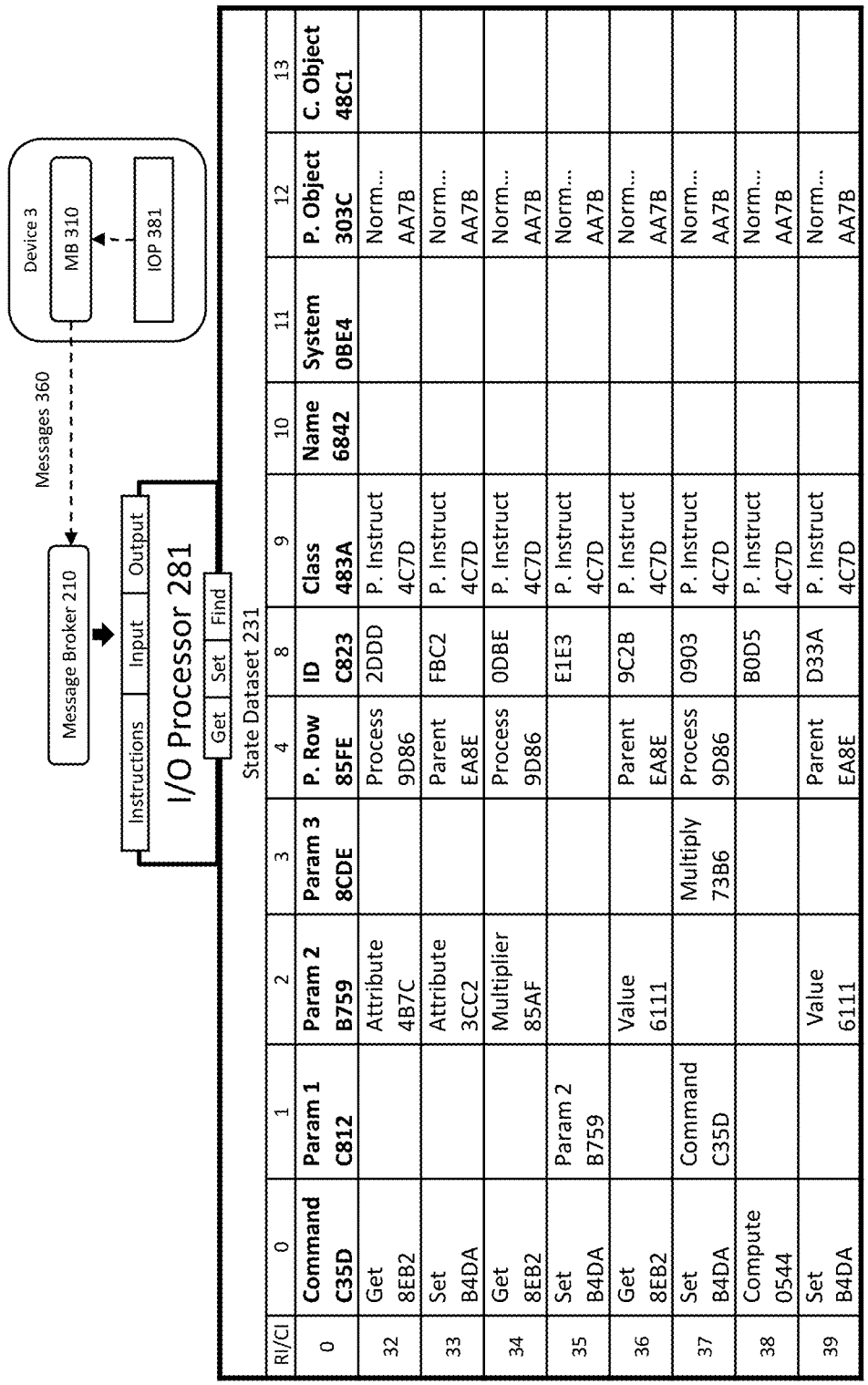

As illustrated in FIG. 28 and FIG. 29, IOP 281 continues to process messages 360 by appending rows and columns within SD 231 and setting element values within SD 231 to element values within the events dataset of the second message within messages 360, wherein each appended row represents an object, each appended column represents an attribute of an object class, wherein the classes of objects within the appended rows include "Connection", "System", "System Process", "Process Column", "Process Condition", and "Process Instruction". A collection of appended objects represents a model of a second system ("Sys 2") that is managed by IOP 381, wherein the modeled system represents an application, wherein a collection of appended objects represents a "Normalize Event Attribute" process of the modeled system. A third appended Connection object (RI [22] in SD 231 in FIG. 28 and FIG. 30) represents a connection between IOP 281 and IOP 381 through the connection between IOP 281 and device 3. The third appended Connection object enables the exchange of information related to the second system.

As illustrated in FIG. 31, MB 210 sends messages 263 received from system 283 to IOP 281 for processing, wherein the payload of the message within messages 263 comprises an events dataset (events 263A), wherein the event within events 263A represents a temperature reading from sensor 243, wherein sensor 243 is assigned to port pin 2 of a microcontroller within system 283.

As illustrated in FIG. 31, IOP 281 processes messages 263, as an input dataset, by creating process instances and executing the instructions within instructions datasets associated with processes illustrated in FIG. 46, wherein executing the instructions comprises:

1) Building an input dataset (input 034D) within a "Validate Connection ID" process instance by executing instructions in instructions 034D, wherein element values within input 034D are derived from attribute values within a "Connection" object within SD 231 where the "ID" attribute value of the "Connection" object ("FC1F" in element [2][8] within SD 231 in FIG. 30) matches the "Credentials" element value ("FC1F" in element [1][4]) of the message (RI [1]) within messages 263 in FIG. 31, and setting an attribute value within SD 231 that prevents further processing of messages 263, when no "Connection" objects within SD 231 match the condition;
2) Setting element values within an input dataset (input E549A in FIG. 58) within a "Run Process" process instance by executing instructions in instructions E549A in FIG. 50, wherein the "Classes" element within the second row (RI [1]) of input E549A is set to a query classes dataset (classes AA7B in FIG. 58), the "Columns" element within the same row is set to a query columns dataset (columns AA7B in FIG. 58), and the "Conditions" element within the same row is set to a query conditions dataset (conditions AA7B), wherein the element values of rows (RI [1] through RI [4]) within columns AA7B are retrieved from "Process Column" objects (RI [26] through RI [29]) within SD 231 in FIG. 28 and the element values of conditions (RI [1] and RI [2]) within conditions AA7B are retrieved from "Process Condition" objects (RI [30] and RI [31]) within SD 231 in FIG. 28, wherein columns AA7B is built by executing instructions within instructions 9A67 in FIG. 50 based on columns 9A67B and conditions 9A67B within FIG. 55 and conditions AA7B is built by executing instructions within instructions 9A67 based on columns 9A67A and conditions 9A67A within FIG. 54;
3) Building an input dataset (input AA7B in FIG. 58) within a "Build Dataset" process instance by executing instructions within instructions 9A67 in FIG. 50, instructions 6AA6 in FIG. 51, and instructions E507 in FIG. 51, wherein element values within input AA7B are retrieved from the "Child Object" attribute (CI [13]) and the "Multiplier" attribute (CI [17]) of the "System Attribute" object (RI [6]) within SD 231 in FIG. 58 based on the query definition within input E549A;
4) Building an instructions dataset (instructions AA7B in FIG. 52) within a "Build Dataset" process by executing instructions within instructions 9A67 in FIG. 50, wherein element values within instructions AA7B are derived from "Process Instruction" objects within SD 231 that are associated with the "Normalize Event Attribute" process (RI [32] through RI [39] in SD 231 in FIG. 29);
5) Converting the "Attribute" element value ("Pin 2") in the event (RI [1]) within events 263A in FIG. 31, as an input dataset, to the value ("CE89") of the "Attribute" element (CI [1] in the second row (RI [1]) of input AA7B in FIG. 58, by executing instructions within instructions AA7B in FIG. 52 associated with the "Normalize Event Attribute" process;
6) Converting the "Value" element value ("800") in the same event to the value ("76") based on a multiplication operation within the same instructions that includes the value ("0.095") of the "Multiplier" element (CI [2]) in the second row (RI [1]) of input AA7B as a command parameter for the operation;
7) Deriving the row index ("1") within SD 231 where the row's "ID" attribute value matches the "Object" element value ("E7C9") of the event (RI [1]) within events 263A in FIG. 32, by executing instructions within instructions 84AB in FIG. 52;
8) Setting the "Temperature" attribute of the "Device" object (element [1][25] in SD 231 in FIG. 31), referenced by the derived row index, to the "Value" element value ("76") of the same event, wherein the "Temperature" attribute is identified by the "Attribute" element value within the same event ("CE89" in element [1][2] within events 263A);
9) Appending a row (RI [2]) within events 263A in FIG. 32, as an input dataset within a "Process Triggers" process instance in FIG. 46, setting the value of the "Attribute" element (CI [2]) within the appended row to the identifier ("D63D") of the "Illumination" attribute, and setting the value of the "Value" element (CI [3]) within the appended row to "1";

10) Setting the "Illumination" attribute of the "Device" object (element [1][26] in SD 231 in FIG. 31) to "1" based on the element values within the appended row (RI [2]) within events 263A in FIG. 32;
11) Setting element values within an input dataset (input E549B in FIG. 57) within a "Run Process" process instance by executing instructions within instructions E549 in FIG. 49, wherein the "Classes" element within the second row (RI [1]) of input E549B is set to a query classes dataset (classes 7FB7 in FIG. 57), the "Columns" element within the same row is set to a query columns dataset (columns 7FB7 in FIG. 57), and the "Conditions" element within the same row is set to a query conditions dataset (conditions 7FB7);
12) Building an input dataset (input 7FB7 in FIG. 57) within a "Build Dataset" process instance, wherein element values within input 7FB7 are retrieved from the "ID" attribute (CI [8]), the "Name" attribute (CI [10]), the "Temperature" attribute (CI [26]), and the "Illumination" attribute (CI [27]) of the "Device" object (RI [0]) within SD 231 in FIG. 57 based on the query definition within input E549B;
13) Setting values of the "Content" element (e.g., element [1][7]) within an input dataset (input 70C3 in FIG. 56) to values within the second row (e.g., "Dev 2" in element [1][1]) of input 7FB7 in FIG. 57 where values of the "Child Attribute" element (e.g., "29C7" in element [1][2]) within input 70C3 match the values of element identifiers in the first row of input 7FB7 (e.g., "29C7" in element [0][1]);
14) Appending rows within events 263A (RI [3]-[46] in events 263A partially illustrated in FIG. 32), as an input dataset within a process instance (element [22][6] within SD 231 in FIG. 32), setting the values of the "Attribute" element (CI [2]) within the appended rows (e.g., element [6][2]) to the values from the "Related Attribute" element (CI [2]) within rows (e.g., "303C" in element [1][2]) of columns 70C3 in FIG. 56, and setting the values of the "Value" element (CI [3]) within the appended rows (e.g., element [6][3]) to element values within rows (e.g., "9845" in element [1][0]) of input 70C3 in FIG. 56), where the "ID" element value (e.g., "C564" in element [1][0]) within columns 70C3 matches the column identifier in the first row (e.g., "C564" in element [0][0]) within input 70C3;
15) Appending rows (RI [22] through RI [27]) and columns (CI [26] through-CI [30]) within SD 231 in FIG. 33 and setting values of elements (e.g., element [24][30]) in the appended rows in SD 231 based on element values (e.g., "Temperature" in element [22][3]) in the appended rows within events 263A in FIG. 32;
16) Building an input dataset (input 30AE), within a "Build Dataset" process instance, for each row within events 263A (RI [1]-[46] in events 263A partially illustrated in FIG. 32), wherein each input 30AE comprises element values from the row in events 263A and attribute values of "System Attribute" objects within SD 231 (RI [10] through RI [16] in SD 231 in FIG. 26 and RI [21] in SD 231 in FIG. 27) where the "Child Object" attribute of a "System Attribute" object (e.g., "65CD" in element [12][13] in SD 231 in FIG. 26) matches the "Attribute" element of the row within events 263A (e.g., "65CD" in element [10][2] in events 263A in FIG. 32), wherein the "Attribute" element of the input 30AE row is set to the "Attribute" element value (e.g., "65CD") of the row within events 263A or to the "Mapped ID" attribute value within the matching "System Attribute" object (e.g., "Left" in element [12] [15] in SD 231 in FIG. 26), if populated, wherein the "Value" element of the input 30AE row is set to the result of a multiplication of the "Value" element value of the row within events 263A (e.g., "2" in element [10][3] in events 263A in FIG. 32) and the "Multiplier" attribute value within the matching "System Attribute" object (e.g., "96" in element [12][17] in SD 231 in FIG. 26).
17) Building an events dataset (events 261A in FIG. 41), as an input dataset within a "Create System Events" process instance, based on element values within each input 30AE where the "Parent Object" element value within a row of an input 30AE matches the identifier ("38AA") of the model of system 283;
18) Building an events dataset (events 261B in FIG. 36), as an input dataset within a "Create System Events" process instance, based on element values within each input 30AE where the "Parent Object" element value within a row of an input 30AE matches the identifier ("F5E0") of the model of system 282;
19) Building an events dataset (events 261C in FIG. 38), as an input dataset within a "Create System Events" process instance, based on element values within each input 30AE where the "Parent Object" element value within a row of an input 30AE matches the identifier ("4C8D") of the "Sys 1" system;
20) Building a messages dataset (messages 261C in FIG. 37), as an input dataset within a "Create Event Messages" process instance, by executing instructions within instructions 4294 in FIG. 53, wherein element values within messages 261C are set to attribute values of the "Connection" object (RI [18]) within SD 231 in FIG. 30 where the "System" attribute value ("4C8D" in element [18][11]) of the "Connection" object matches the identifier ("4C8D") of the "Sys 1" system, wherein the value of the "Payload" element (element [1][6]) in the message within messages 261C is set to events 261C; and
21) Building a messages dataset, as an input dataset (messages 261 in element [29][1] within SD 231 in FIG. 34) within a "Create Event Messages" process instance, by executing instructions within instructions 4294 in FIG. 53, wherein element values within messages 261 are derived from attribute values of "Connection" objects within SD 231 in FIG. 30. The values of the "Address Type", "Address", "Connection Type" and "Credentials" elements in a first, second, and third message (RI [1] through RI [3]) within messages 261 are set to the values of the "Address Type", "Address", "Connection Type" and "Credentials" attributes of the "Connection" objects representing connections to system 283 (RI [2]), system 282 (RI [7]), and MB 310 (RI [17]), respectively.
22) Setting the value of the "Payload" element (CI [6]) within the first, second, and third message (RI [1] through RI [3]) of messages 261 in FIG. 34 to events 261A, events 261B and messages 261C; and
23) Outputting messages 261 to MB 210 by executing instructions within instructions BC25 in FIG. 53.

Figure 34:
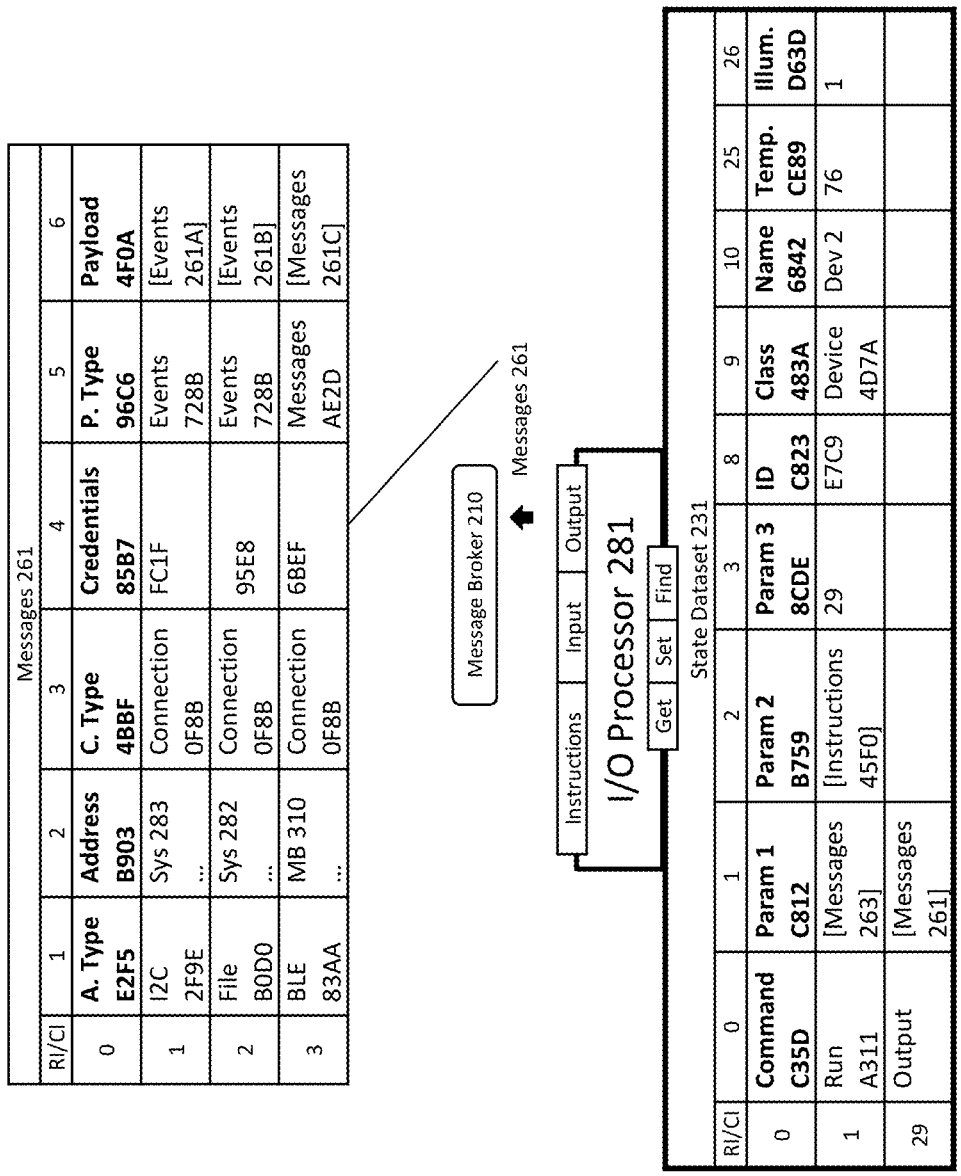
Figure 35:
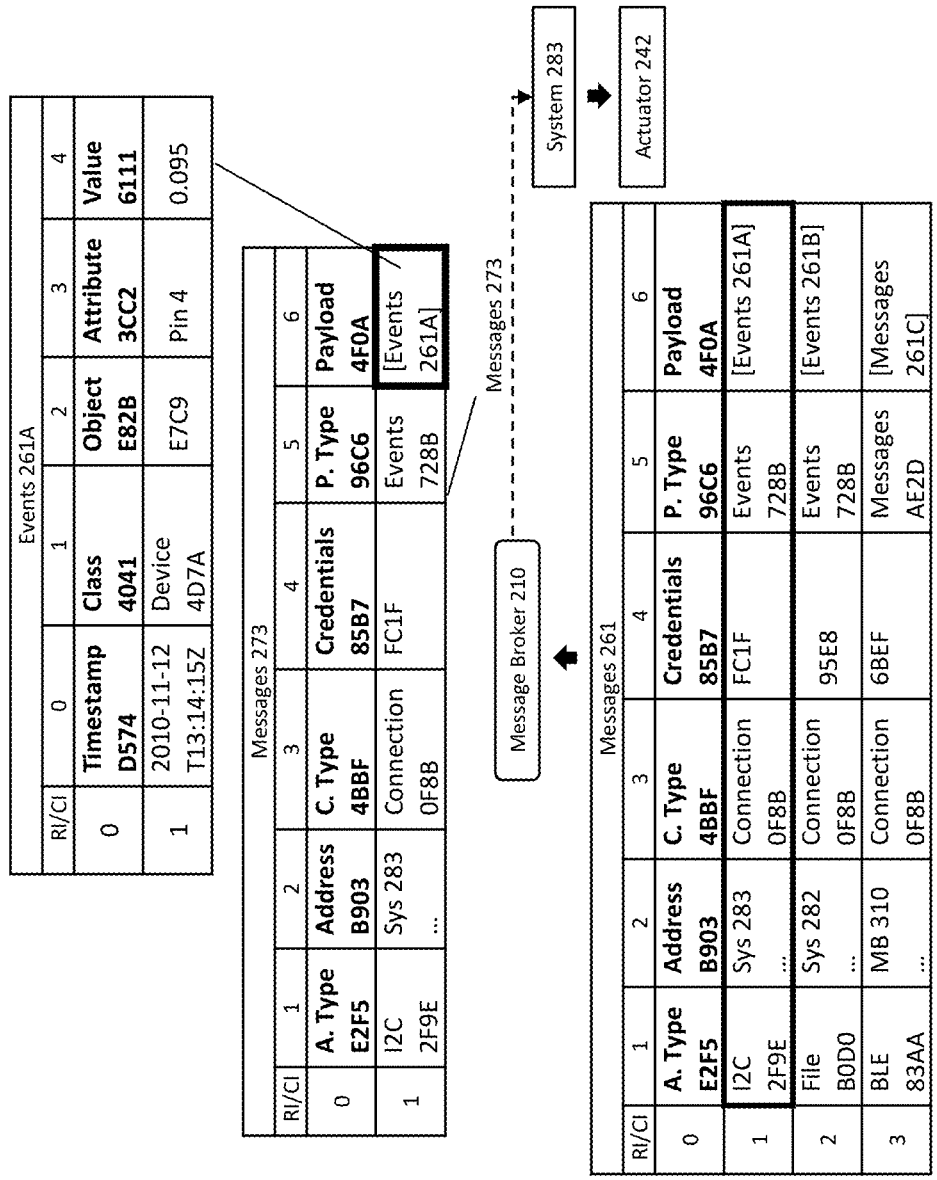
Figure 36:
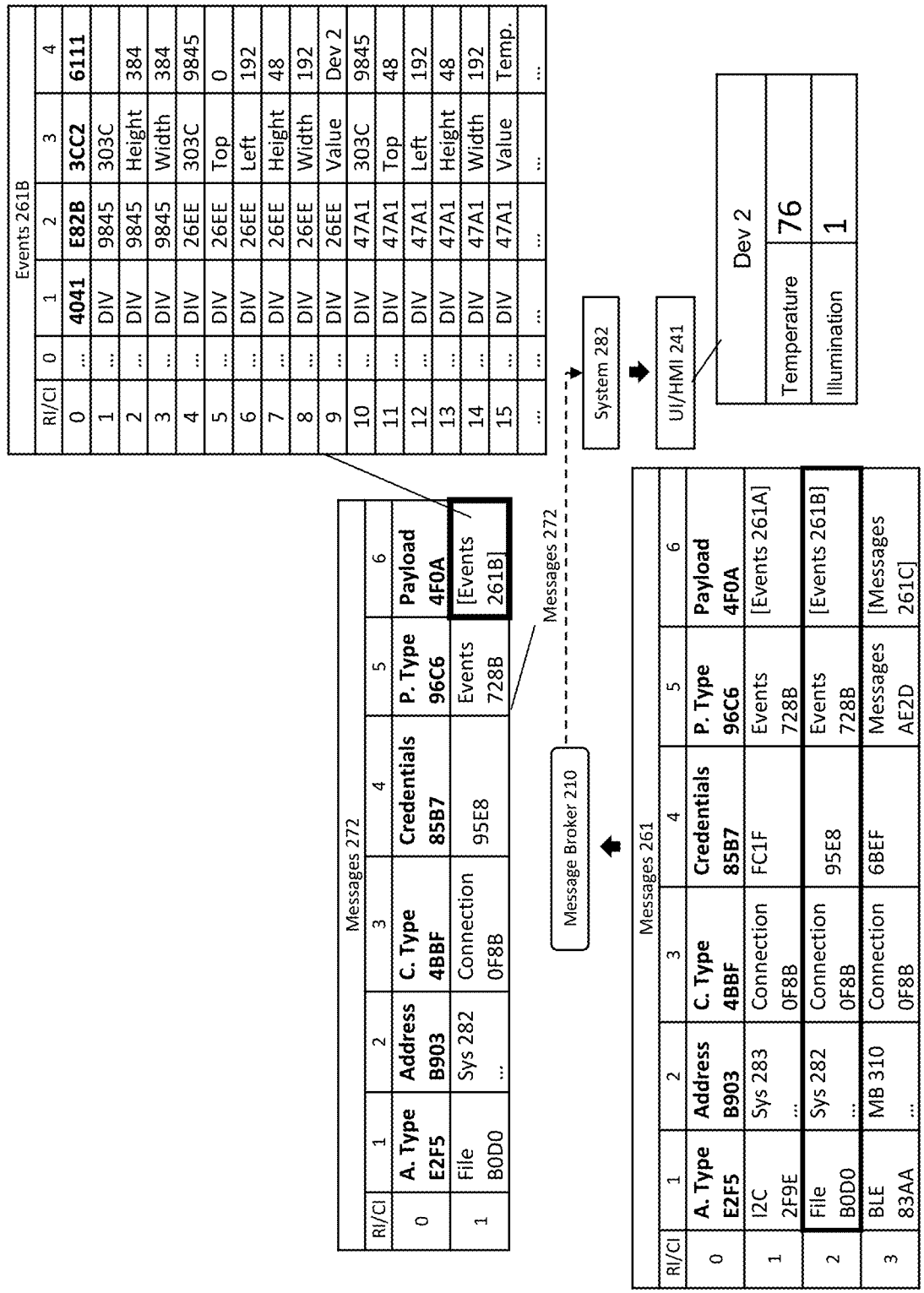
Figure 37:
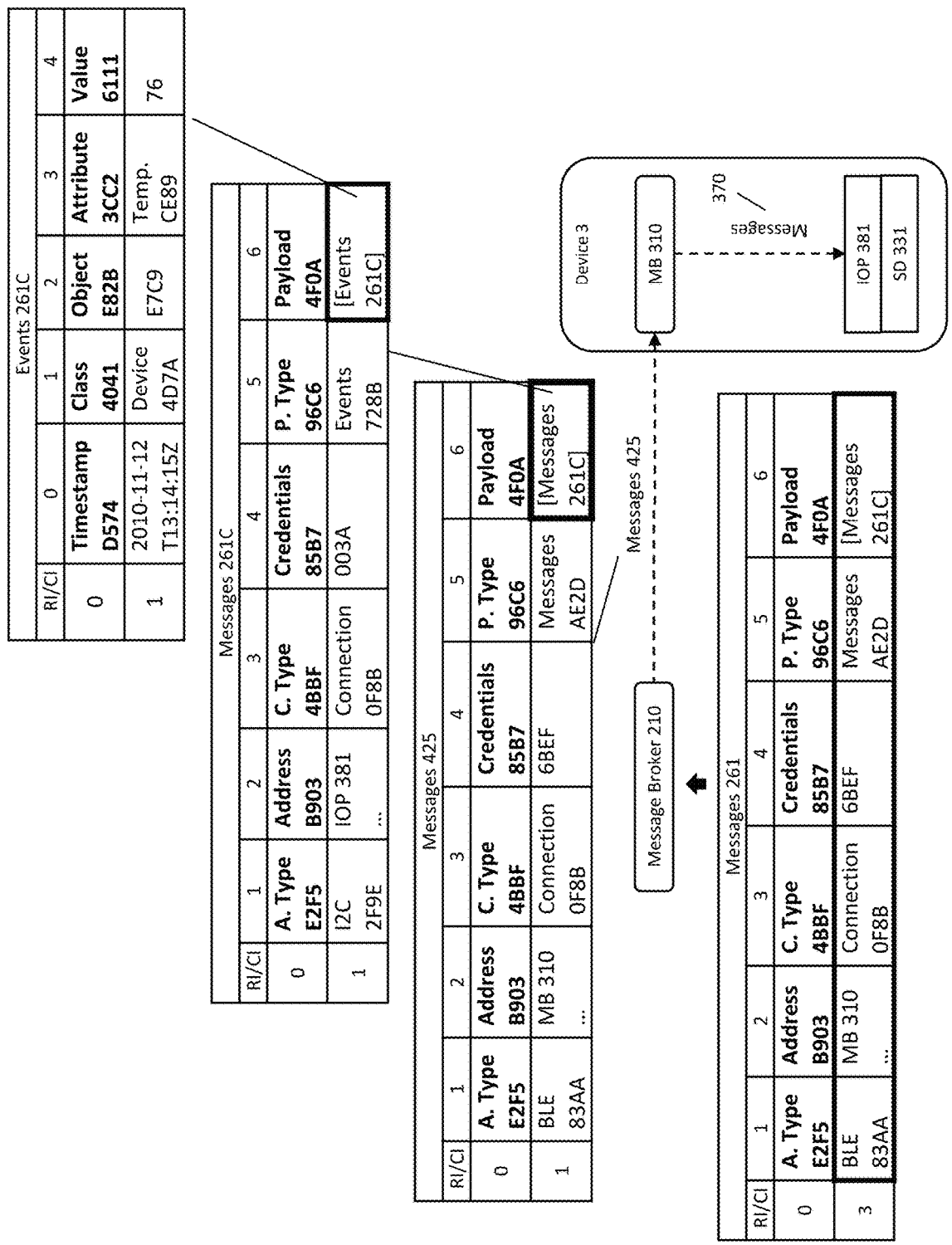

MB 210 processes messages 261 received by IOP 281 by:
1) Sending messages 273 in FIG. 35 to system 283, wherein the message (RI [1]) within messages 273 comprises the first message (RI [1]) within messages 261 in FIG. 34;

2) Sending messages 272 in FIG. 36 to system 282, wherein the message (RI [1]) within messages 272 comprises the second message (RI [2]) within messages 261 in FIG. 34; and
3) Sending messages 425 in FIG. 37 to MB 310 on device 3, wherein the message (RI [1]) within messages 425 comprises the third message (RI [3]) within messages 261 in FIG. 34.

As illustrated in FIG. 35, system 283 processes messages 273 received from MB 210 by sending a control signal to actuator 242 through port pin 4 (identified in the "Attribute" element [1][3] within events 261A within messages 273) that increases its electric current to 0.095 (specified in the "Value" element [1][4] within events 261A within messages 273).

As illustrated in FIG. 36, system 282 processes messages 272 received from MB 210 by generating an HTML Document Object Model (DOM) of a web page representing a user interface, wherein the DOM is derived from element values within events 261B within messages 272, wherein processing of messages 272 by system 282 comprises executing a JavaScript function similar to ProcessEvents 282A in FIG. 45.

Figure 38:
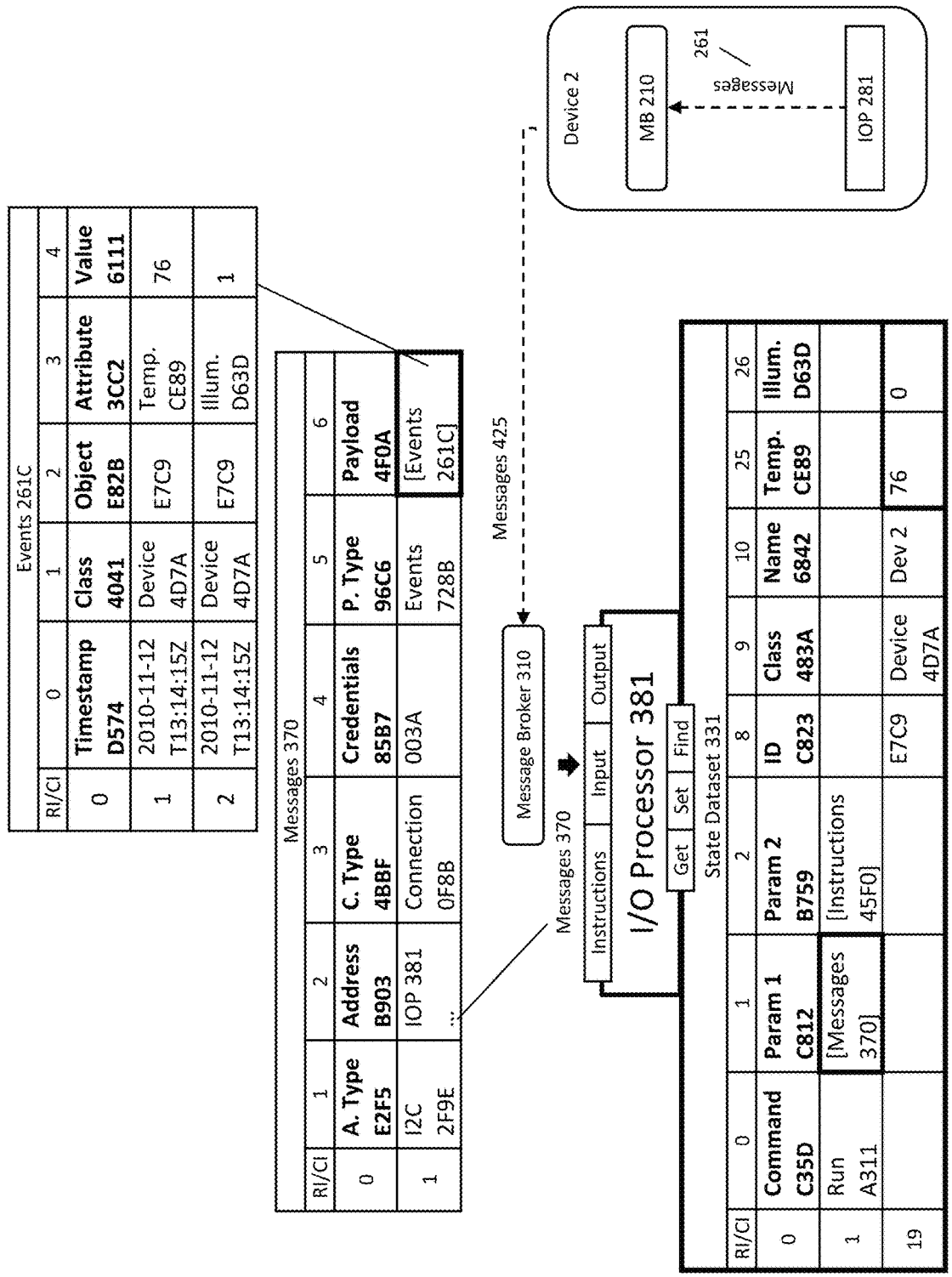

As illustrated in FIG. 38, MB 310 processes messages 425 received from MB 210 by sending messages 370 to IOP 381, wherein the message (RI [1]) within messages 370 comprises the message (RI [1]) within messages 261C within messages 425 in FIG. 37.

IOP 381 processes messages 370 received from MP 310, as an input dataset, by:
1) Setting the "Temperature" attribute of the "Device" object (element [19][25] in SD 331 in FIG. 38) that is identified by the "Object" element value of the first event (RI [1]) within events 261C ("E7C9" in element [1][2] within events 261C in FIG. 38) to the "Value" element value of the same event ("76" in element [1][4] within events 261C), wherein the "Temperature" attribute is identified by the "Attribute" element value within the same event ("CE89" in element [1][3] within events 261C); and
2) Setting the "Illumination" attribute of the same "Device" object (element [19][26] in SD 331 in FIG. 38) in a similar manner based on the element values within the second event (RI [2]) within events 261C.

Figure 39:
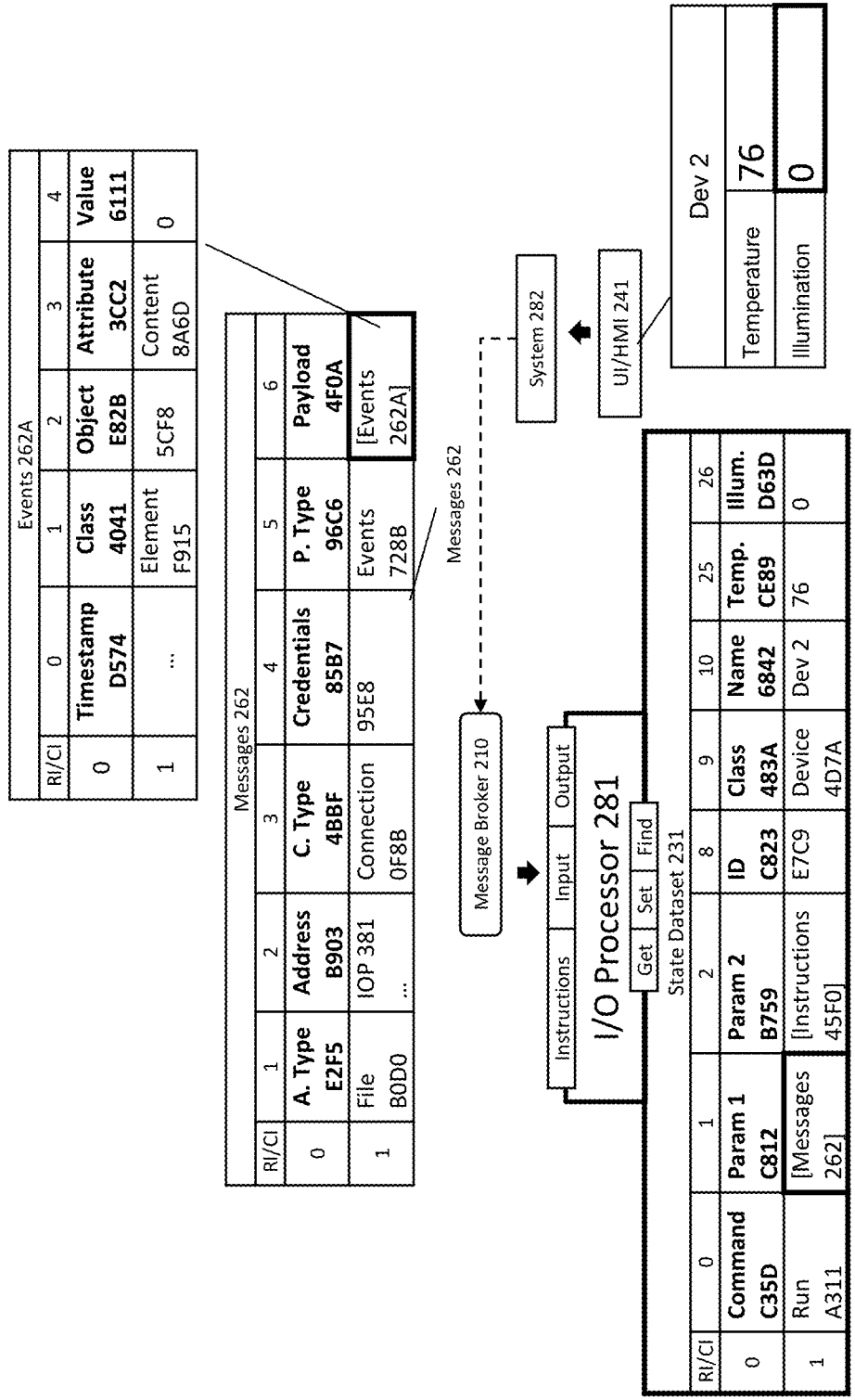
Figure 40:
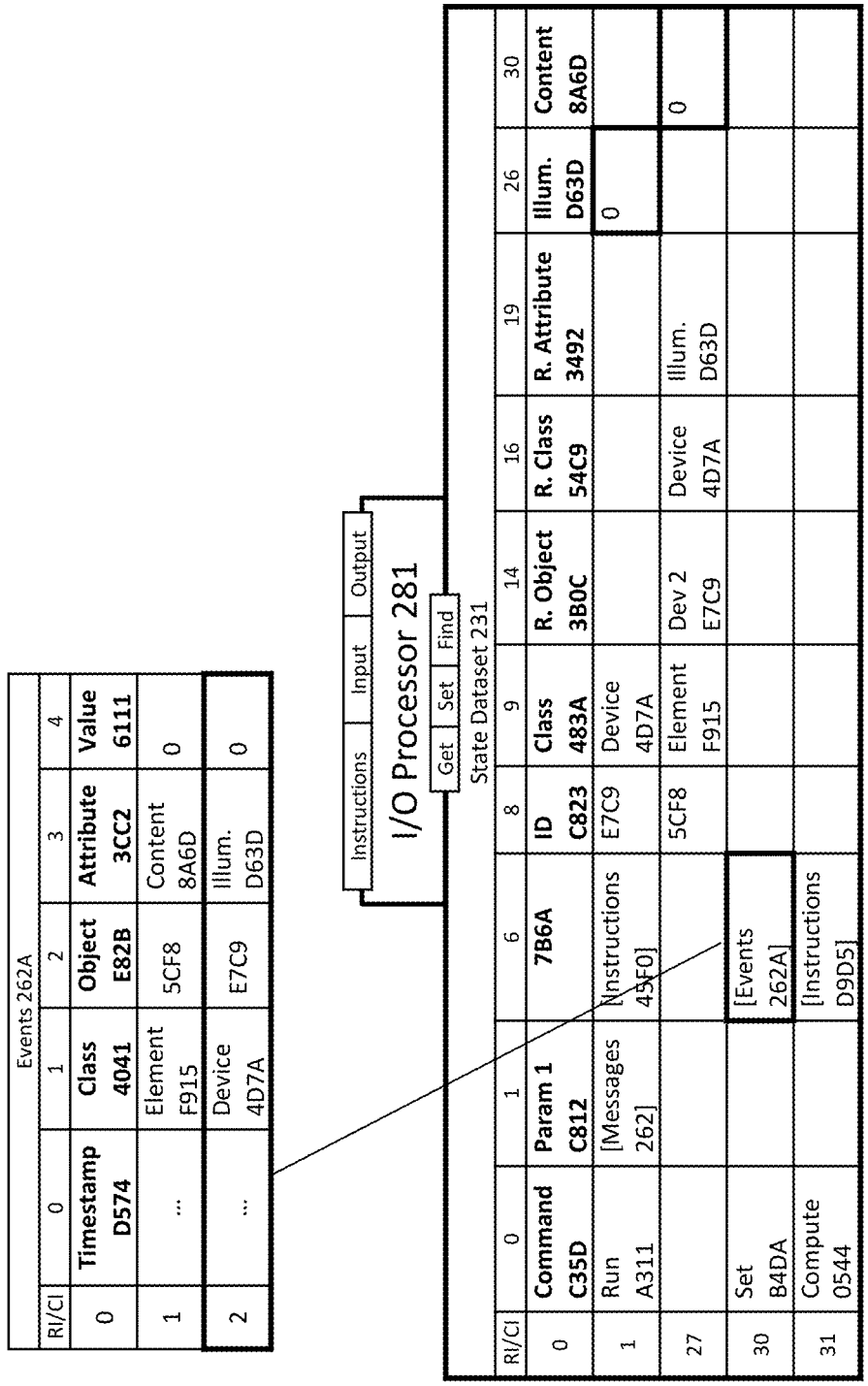
Figure 41:
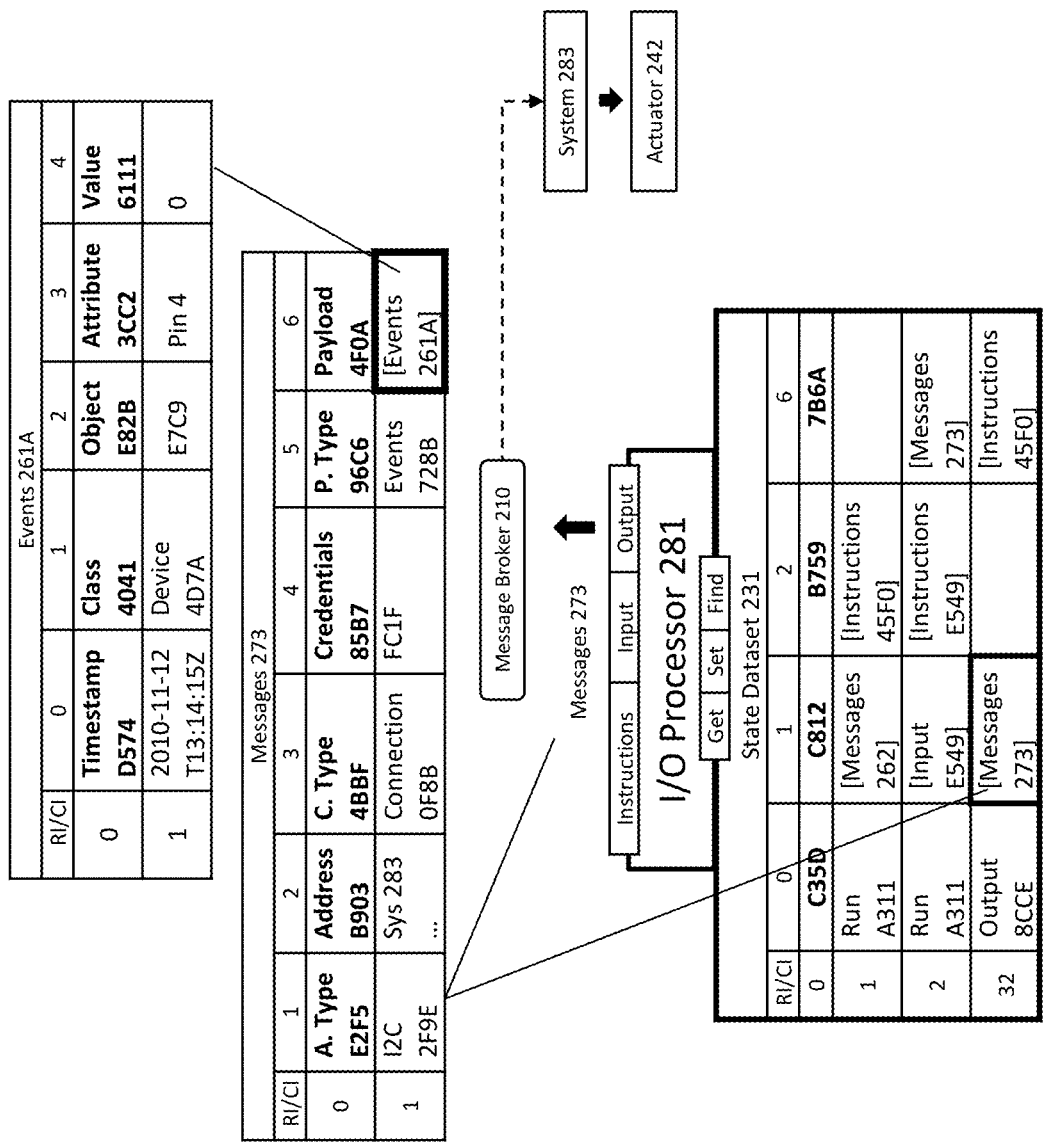

As illustrated in FIG. 39, MB 210 sends messages 262 received from system 282 to IOP 281 for processing, wherein the payload of the message within messages 262 comprises an events dataset (events 262A), wherein the event within events 262A represents a user (i.e., human) interaction with a user interface (i.e., human machine interface) within system 282, wherein the interaction changes a view element value from 1 to 0. IOP 281 processes messages 262, as an input dataset, by creating process instances and executing the instructions within instructions datasets associated with processes illustrated in FIG. 46, wherein executing the instructions comprises:
1) Setting the "Content" attribute of the "Element" object (element [27][30] in SD 231 in FIG. 40) that is identified by the "Object" element value of the event within events 262A ("5CF8" in element [1][2] within events 262A in FIG. 39) to the "Value" element value of the same event ("0" in element [1][4] within events 262A);
2) Appending a row within events 262A (RI [2]), as an input dataset within a process instance (element [30][6] within SD 231 in FIG. 40), and setting the values of the "Class", "Object", "Attribute", and "Value" elements of the appended row (elements [2][1], [2], [2][3], and [2][4] within events 262A in FIG. 40) to the values of the "Related Class", "Related Object", "Related Attribute", and "Content" elements, respectively, of the identified "Element" object (elements [27][16], [27][14], [27][19], and [27][30]);
3) Setting the "Illumination" attribute of the "Device" object (element [1][26] in SD 231 in FIG. 40) that is identified by the "Object" element value of the appended event within events 262A ("E7C9" in element [2][2] within events 262A in FIG. 40) to the "Value" element value of the same event ("0" in element [2][4] within events 262A) by executing instructions within instructions 2369 in FIG. 48;
4) Building an input dataset (input 30AE), within a "Build Dataset" process instance, based on the appended row within events 262A (RI [2]) in FIG. 40, wherein the input 30AE comprises element values from the appended row in events 262A and attribute values of the "System Attribute" object within SD 231 (RI [5] in SD 231 in FIG. 25) where the "Child Object" attribute of a "System Attribute" object ("D63D" in element [5][13] in SD 231 in FIG. 26) matches the "Attribute" element of the appended row within events 262A ("D63D" in element [2][3] in events 262A), wherein the "Attribute" element of the input 30AE row is set to the populated "Mapped ID" attribute value within the matching "System Attribute" object (e.g., "Pin 4" in element [5][15] in SD 231 in FIG. 25), wherein the "Value" element of the input 30AE row is set to the result of a multiplication of the "Value" element value of the row within events 262A (e.g., "0" in element [2][4] in events 262A in FIG. 40) and the "Multiplier" attribute value within the matching "System Attribute" object (e.g., "1.2" in element [5][17] in SD 231 in FIG. 25).
5) Building an events dataset (events 261A in FIG. 41), as an input dataset within a "Create System Events" process instance, comprising element values within input 30AE;
6) Building a messages dataset (messages 273 in FIG. 41) as an input dataset within a "Create Event Messages" process instance by executing instructions within instructions 4294 in FIG. 53, wherein the "Payload" element value in the message (element [1][6] within messages 273 is set to events 261A; and
7) Outputting messages 273 to MB 210 by executing instructions within instructions BC25 in FIG. 53. In response, MB 210 sends messages 273 to system 283. In response, system 283 processes the event within messages 273 by sending a control signal to actuator 242 through port pin 4 (identified in the "Attribute" element [1][3] within events 261A) that reduces its electric current to 0 (specified in the "Value" element [1][4] within events 261A).

Figure 42:
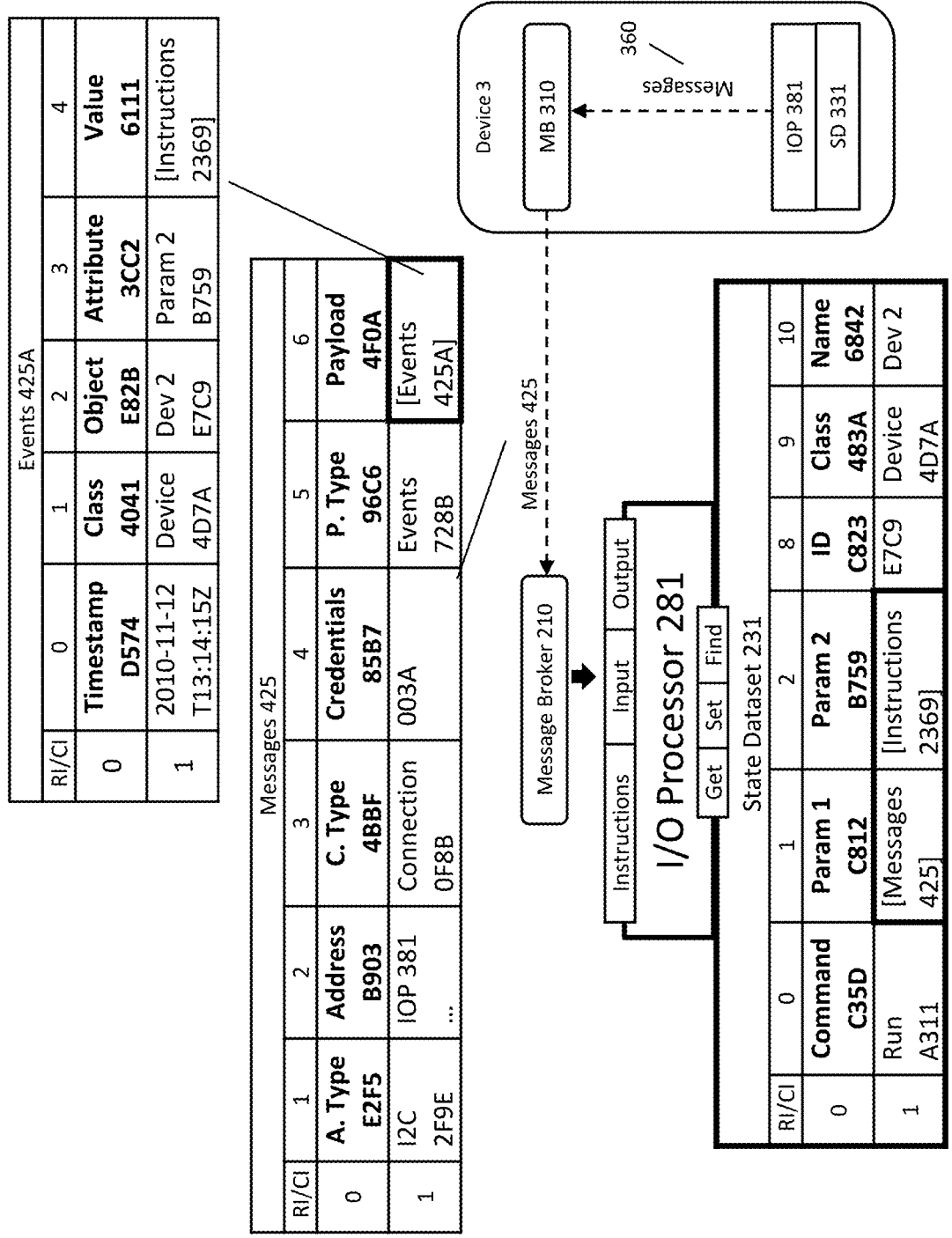

As illustrated in FIG. 42, MB 210 sends messages 425 received from IOP 381 through MB 310 on device 3 to IOP 281 for processing, wherein the payload of the message within messages 425 comprises an events dataset (events 425A), wherein the event within events 425A represents a change in the value of the "Param 2" attribute of the "Device" object representing device 2, wherein the value comprises an instructions dataset (instructions 2369). IOP 281 processes messages 425, as an input dataset, by creating process instances and executing instructions within instructions datasets associated with processes illustrated in FIG. 46. Executing instructions sets the value of the "Param 2" element within the second row of SD 231 to a reference to instructions 2369. IOP 281 processes subsequent input datasets received by executing the instructions within instructions 2369.

8. Example Processing Device

Figure 4:
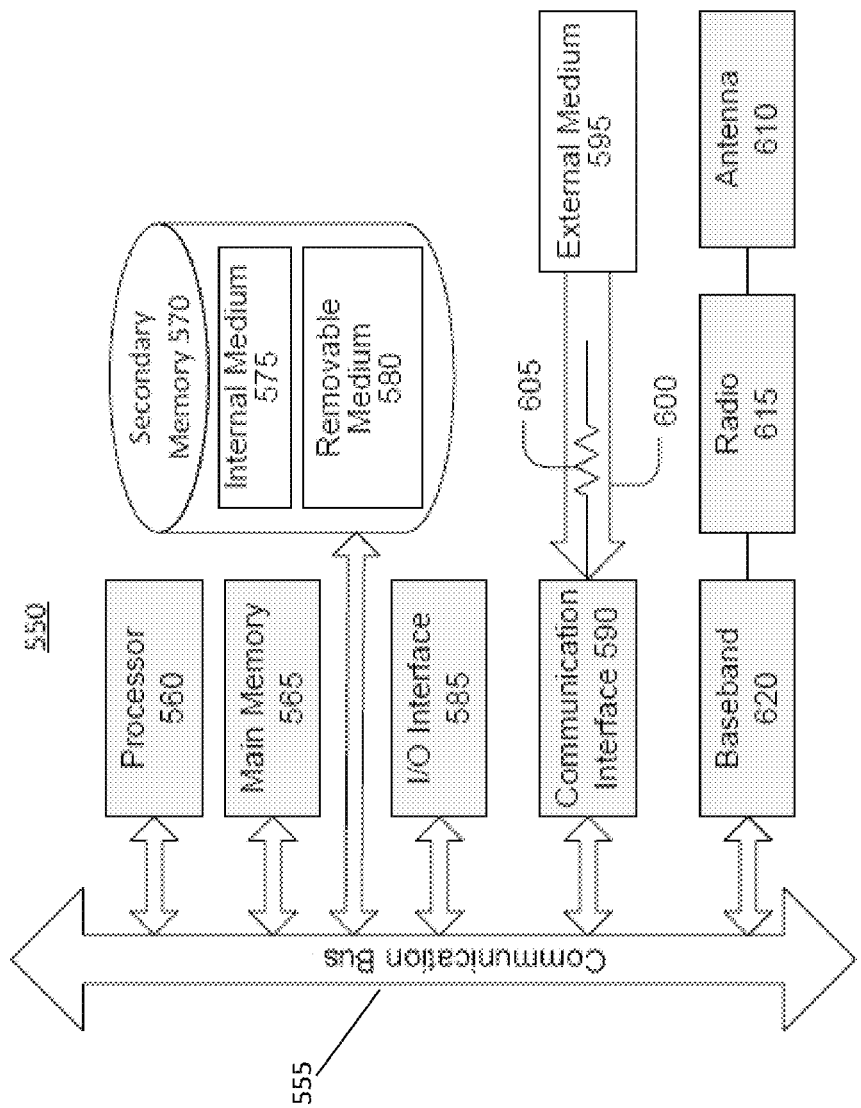
FIG. 4 illustrates a processing system on which one or more of the processes described herein may be executed, according to at least one embodiment.

FIG. 4 is a block diagram illustrating an example wired or wireless system 550 that may be used in connection with various embodiments described herein. For example the system 550 may be used as or in conjunction with one or more of the mechanisms, processes, methods, or functions (e.g., to store and/or execute the application or one or more software modules of the application) described above, and may represent components of server(s), user system(s), and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, California The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPM), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer-executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g., printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs or software, such as the disclosed application) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the disclosed embodiments as previously described.

In this description, the term "computer-readable medium" is used to refer to any non-transitory computer-readable storage media used to provide computer-executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer-readable mediums are means for providing executable code, programming instructions, and software to the system 550.

In an embodiment that is implemented using software, the software may be stored on a computer-readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615, and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the disclosed embodiments as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for processing an input dataset within a state dataset, the method comprising the steps of, using at least one hardware processor:
    the processor receiving a first input dataset from a computing system, wherein the first input dataset comprises one or more of:
        a first instruction dataset comprising a two-dimensional data structure having at least one row and a plurality of columns, wherein each of the at least one row represents a sequential instruction associated with a first process, and wherein each sequential instruction comprises an identifier of a command and one or more command parameter values;
        a first message dataset comprising a two-dimensional data structure having at least one row and a plurality of columns, wherein each of the at least one row represents a message; and
        a first state dataset comprising a two-dimensional data structure having at least one row and a plurality of columns, wherein each of the at least one row represents an entity;
    the processor processing the first input dataset by performing one or more of:
        assigning the first state dataset to an active state dataset,
        assigning the first instruction dataset to a second element within the active state dataset for processing, and
        assigning the first message dataset to a first element within the active state dataset for processing;
    the processor processing each row within the first message dataset within the active state dataset by:
        accessing the first instruction dataset from the second element within the active state dataset; and
        executing each of the one or more sequential instructions by one or more of:
            copying one or more command parameter values to one or more elements within the row of the first message dataset;
            copying one or more command parameter values to one or more elements within the active state dataset;
            copying an element value within the row of the first message dataset to an element within the active state dataset;
            computing an element value within the active state dataset from one or more element values within the active state dataset;
            appending one or more rows to the first message dataset for processing;
            appending one or more rows to the active state dataset;
            deleting one or more rows within the active state dataset;
            appending one or more columns to the first message dataset;
            appending one or more columns to the active state dataset;
            creating one or more additional message datasets within the active state dataset for processing from element values within the active state dataset;
            processing one or more additional message datasets within the active state dataset using one or more instruction datasets within the active state dataset; and
            sending one or more output datasets to one or more computing systems for processing;
    wherein one or more instruction datasets within the active state dataset is generated by processing one or more message datasets received from one or more computing systems.

2. The method of claim 1, wherein each of the active state dataset, one or more output datasets, and one or more instruction datasets comprises a representation of a two-dimensional array of element values configured to be referenced by row and column indices.

3. The method of claim 2, wherein a first row in each of the active state dataset, one or more input datasets, and one or more instruction datasets comprises unique identifiers of the dataset columns.

4. The method of claim 1, wherein the first input dataset is a first message dataset received from a message broker, and wherein sending an output dataset to a computing system comprises sending a second message dataset to the message broker to send to the computing system for processing, wherein each message within the second message dataset comprises a payload and an identification of a computing system to process the payload.

5. The method of claim 4, wherein one or more messages in the first message dataset comprises an event dataset, wherein each event in each event dataset comprises one or more of a time stamp, an identifier of an object class, an identifier of an object within the object class, an identifier of an attribute of the object class, and a value of the attribute.

6. The method of claim 5, wherein processing the event dataset within the first message dataset comprises one or more of: appending a row to the active state dataset, wherein the appended row represents an object identified within an event within the event dataset, appending a column to the active state dataset, wherein the appended column represents an attribute identified within the event, and setting an element value within the active state dataset to the attribute value within the event.

7. The method of claim 4, wherein one or more messages in the first message dataset comprises a query dataset, and wherein one or more messages within the second message dataset comprises a query results dataset.

8. The method of claim 1, wherein the active state dataset comprises properties of computing systems capable of one or more of: sending input datasets to the hardware processor and receiving output datasets from the hardware processor, wherein the properties of the computing systems within the active state dataset originated from one or more input datasets received and processed by the hardware processor.

9. The method of claim 1, wherein processing the one or more output datasets by one or more computing systems comprises one or more of: rendering a user interface, printing a document, invoking an actuator, retrieving state from a data store, and changing the state of a data store.

10. The method of claim 1, wherein the active state dataset comprises one or more nested state datasets wherein each of the nested state datasets represents a computing state of one or more connected computing systems.

11. A system for processing an input dataset within a state dataset, the system comprising:
an at least one hardware processor configured for:
receiving a first input dataset from a computing system, wherein the first input dataset comprises one or more of:
a first instruction dataset comprising a two-dimensional data structure having at least one row and a plurality of columns, wherein each of the at least one row represents a sequential instruction associated with a first process, and wherein each sequential instruction comprises an identifier of a command and one or more command parameter values;
a first message dataset comprising a two-dimensional data structure having at least one row and a plurality of columns, wherein each of the at least one row represents a message; and
a first state dataset comprising a two-dimensional data structure having at least one row and a plurality of columns, wherein each of the at least one row represents an entity;

processing the first input dataset by performing one or more of:
assigning the first state dataset to an active state dataset,
assigning the first instruction dataset to a second element within the active state dataset for processing, and
assigning the first message dataset to a first element within the active state dataset for processing;
processing each row within the first message dataset within the active state dataset by:
accessing the first instruction dataset from the second element within the active state dataset; and
executing each of the one or more sequential instructions by one or more of:
copying one or more command parameter values to one or more elements within the row of the first message dataset;
copying one or more command parameter values to one or more elements within the active state dataset;
copying an element value within the row of the first message dataset to an element within the active state dataset;
computing an element value within the active state dataset from one or more element values within the active state dataset;
appending one or more rows to the first message dataset for processing;
appending one or more rows to the active state dataset;
deleting one or more rows within the active state dataset;
appending one or more columns to the first message dataset;
appending one or more columns to the active state dataset;
creating one or more additional message datasets within the active state dataset for processing from element values within the active state dataset;
processing one or more additional message datasets within the active state dataset using one or more instruction datasets within the active state dataset; and
sending one or more output datasets to one or more computing systems for processing;
wherein one or more instruction datasets within the active state dataset is generated by processing one or more message datasets received from one or more computing systems.

12. A non-transitory computer readable medium containing program instructions for causing at least one hardware processor of an at least one computing device to perform a method for processing an input dataset within a state dataset, the method comprising the steps of:
the processor receiving a first input dataset from a computing system, wherein the first input dataset comprises one or more of:
a first instruction dataset comprising a two-dimensional data structure having at least one row and a plurality of columns, wherein each of the at least one row represents a sequential instruction associated with a first process, and wherein each sequential instruction comprises an identifier of a command and one or more command parameter values;

a first message dataset comprising a two-dimensional data structure having at least one row and a plurality of columns, wherein each of the at least one row represents a message; and a first state dataset comprising a two-dimensional data structure having at least one row and a plurality of columns, wherein each of the at least one row represents an entity;

the processor processing the first input dataset by performing one or more of:

assigning the first state dataset to an active state dataset, assigning the first instruction dataset to a second element within the active state dataset for processing, and assigning the first message dataset to a first element within the active state dataset for processing;

the processor processing each row within the first message dataset within the active state dataset by:

accessing the first instruction dataset from the second element within the active state dataset; and executing each of the one or more sequential instructions by one or more of:

copying one or more command parameter values to one or more elements within the row of the first message dataset;

copying one or more command parameter values to one or more elements within the active state dataset;

copying an element value within the row of the first message dataset to an element within the active state dataset;

computing an element value within the active state dataset from one or more element values within the active state dataset;

appending one or more rows to the first message dataset for processing;

appending one or more rows to the active state dataset;

deleting one or more rows within the active state dataset;

appending one or more columns to the first message dataset;

appending one or more columns to the active state dataset;

creating one or more additional message datasets within the active state dataset for processing from element values within the active state dataset;

processing one or more additional message datasets within the active state dataset using one or more instruction datasets within the active state dataset; and sending one or more output datasets to one or more computing systems for processing;

wherein one or more instruction datasets within the active state dataset is generated by processing one or more message datasets received from one or more computing systems.

* * * * *